(12) United States Patent
LaCross et al.

(10) Patent No.: US 11,292,389 B2
(45) Date of Patent: Apr. 5, 2022

(54) VEHICULAR IN INTERIOR REARVIEW MIRROR ASSEMBLY WITH DISPLAY AND TILT MECHANISM

(71) Applicant: Magna Mirrors of America, Inc., Holland, MI (US)

(72) Inventors: Anthony J. LaCross, Hastings, MI (US); Darryl P. De Wind, Canton, MI (US); Mark L. Larson, Grand Haven, MI (US); Rodney K. Blank, Zeeland, MI (US); Christopher R. Koetje, Zeeland, MI (US); Eric Peterson, West Olive, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/949,635

(22) Filed: Nov. 9, 2020

(65) Prior Publication Data
US 2021/0053493 A1 Feb. 25, 2021

Related U.S. Application Data

(63) Continuation of application No. 16/600,661, filed on Oct. 14, 2019, now Pat. No. 10,829,051, which is a (Continued)

(51) Int. Cl.
*B60R 1/12* (2006.01)
*B60R 1/04* (2006.01)
(Continued)

(52) U.S. Cl.
CPC .................. *B60R 1/12* (2013.01); *B60R 1/04* (2013.01); *H04N 5/2251* (2013.01);
(Continued)

(58) Field of Classification Search
CPC ..... B60R 1/04; B60R 1/12; B60R 2001/1215; B60R 2001/1253; B60R 2300/207;
(Continued)

(56) References Cited

U.S. PATENT DOCUMENTS

| 2,263,382 | A | 11/1941 | Gotzinger |
| 2,580,014 | A | 12/1951 | Gazda |

(Continued)

FOREIGN PATENT DOCUMENTS

| EP | 0356099 A2 | 2/1990 |
| EP | 1176056 A2 | 1/2002 |

(Continued)

OTHER PUBLICATIONS

Hicks et al., "Panoramic Electronic Rear Vision for Automotive Applications" SAE Technical Paper Series 1999-01-0655, Detroit, MI Mar. 1-4, 1999.

*Primary Examiner* — Francis Geroleo
(74) *Attorney, Agent, or Firm* — Honigman LLP

(57) ABSTRACT

A vehicular interior rearview mirror assembly includes a mirror head that is pivotally attached via a pivot joint at a mounting structure and that accommodates a reflective element. A display device is disposed within the mirror head. An actuator is disposed within the mirror head and includes an actuator base attached at a rear portion of the reflective element, an actuator body that is pivotally attached at the actuator base, and an electrically operable motor. When the motor is electrically operated, the actuator body pivots relative to the actuator base to pivot the mirror head relative to a socket element of the pivot joint. Pivotal movement of the mirror head relative to the socket element adjusts the reflective element between a mirror mode orientation and a
(Continued)

display mode orientation. When the reflective element is in the display mode orientation, the display device is actuated to display video images.

30 Claims, 58 Drawing Sheets

Related U.S. Application Data continuation of application No. 15/910,084, filed on Mar. 2, 2018, now Pat. No. 10,442,360.

(60) Provisional application No. 62/587,145, filed on Nov. 16, 2017, provisional application No. 62/501,263, filed on May 4, 2017, provisional application No. 62/476,951, filed on Mar. 27, 2017, provisional application No. 62/471,492, filed on Mar. 15, 2017, provisional application No. 62/466,090, filed on Mar. 2, 2017.

(51) Int. Cl.
*H04N 5/232* (2006.01)
*H04N 7/18* (2006.01)
*H04N 5/262* (2006.01)
*H04N 5/225* (2006.01)

(52) U.S. Cl.
CPC ......... *H04N 5/232* (2013.01); *H04N 5/23293* (2013.01); *H04N 5/2628* (2013.01); *H04N 7/183* (2013.01); *B60R 2001/1215* (2013.01); *B60R 2001/1253* (2013.01); *B60R 2300/207* (2013.01)

(58) Field of Classification Search
CPC .. H04N 5/2251; H04N 5/232; H04N 5/23293; H04N 5/2628; H04N 7/183
See application file for complete search history.

(56) References Cited

U.S. PATENT DOCUMENTS

| | | | |
|---|---|---|---|
| 3,266,016 A | 8/1966 | Maru | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,906,085 A | 3/1990 | Sugihara et al. | |
| 5,313,335 A | 5/1994 | Gray et al. | |
| 5,355,284 A | 10/1994 | Roberts | |
| 5,436,741 A | 7/1995 | Crandall | |
| 5,481,409 A | 1/1996 | Roberts | |
| 5,530,240 A | 6/1996 | Larson et al. | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,724,187 A | 3/1998 | Varaprasad et al. | |
| 5,786,772 A | 7/1998 | Schofield et al. | |
| 5,788,357 A | 8/1998 | Muth et al. | |
| 5,938,166 A * | 8/1999 | Seichter ................. B60R 1/072 248/479 |
| 5,938,320 A | 8/1999 | Crandall | |
| 5,956,181 A | 9/1999 | Lin | |
| 6,005,724 A | 12/1999 | Todd | |
| 6,045,243 A | 4/2000 | Muth et al. | |
| 6,111,683 A | 8/2000 | Cammenga et al. | |
| 6,257,746 B1 | 7/2001 | Todd et al. | |
| 6,264,353 B1 | 7/2001 | Caraher et al. | |
| 6,329,925 B1 | 12/2001 | Skiver et al. | |
| 6,356,376 B1 | 3/2002 | Tonar et al. | |
| 6,428,172 B1 | 8/2002 | Hutzel et al. | |
| 6,512,624 B2 | 1/2003 | Tonar et al. | |
| 6,642,840 B2 | 11/2003 | Lang et al. | |
| 6,690,268 B2 | 2/2004 | Schofield et al. | |
| 6,700,692 B2 | 3/2004 | Tonar et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,446,924 B2 | 11/2008 | Schofield et al. | |
| 7,488,080 B2 | 2/2009 | Skiver et al. | |
| 7,581,859 B2 | 9/2009 | Lynam | |
| 7,626,749 B2 | 12/2009 | Baur et al. | |
| 7,777,611 B2 | 8/2010 | Desai | |
| 7,855,755 B2 | 12/2010 | Weller et al. | |
| 8,154,418 B2 | 4/2012 | Peterson et al. | |
| 8,960,629 B2 | 2/2015 | Rizk et al. | |
| 10,442,360 B2 | 10/2019 | LaCross et al. | |
| 10,829,051 B2 | 11/2020 | LaCross et al. | |
| 2004/0027694 A1 | 2/2004 | Lin | |
| 2004/0027695 A1 | 2/2004 | Lin | |
| 2006/0050018 A1 | 3/2006 | Hutzel et al. | |
| 2008/0073477 A1 | 3/2008 | Lang et al. | |
| 2012/0038964 A1 | 2/2012 | De Wind et al. | |
| 2012/0236388 A1 | 9/2012 | De Wind et al. | |
| 2014/0022390 A1 | 1/2014 | Blank et al. | |
| 2014/0097320 A1* | 4/2014 | Rizk ..................... F16M 13/02 248/475.1 |
| 2014/0268355 A1 | 9/2014 | Lee et al. | |
| 2014/0285666 A1 | 9/2014 | O'Connell et al. | |
| 2014/0293169 A1 | 10/2014 | Uken et al. | |
| 2015/0085337 A1* | 3/2015 | Lee .......... B60R 1/088 359/267 |
| 2015/0097955 A1 | 4/2015 | De Wind et al. | |
| 2016/0082890 A1 | 3/2016 | Habibi et al. | |
| 2016/0129842 A1* | 5/2016 | Kuester ............. B60K 35/00 348/148 |
| 2016/0250970 A1 | 9/2016 | Kuester et al. | |
| 2016/0250972 A1 | 9/2016 | Kuester et al. | |
| 2016/0250974 A1 | 9/2016 | Kuester et al. | |
| 2016/0275833 A1 | 9/2016 | Forbes et al. | |
| 2016/0341963 A1 | 11/2016 | Minikey, Jr. et al. | |
| 2017/0088055 A1 | 3/2017 | Cammenga et al. | |
| 2017/0248787 A1 | 8/2017 | Lee et al. | |
| 2017/0297498 A1 | 10/2017 | Larson et al. | |
| 2017/0327044 A1 | 11/2017 | Baur | |
| 2017/0355312 A1 | 12/2017 | Habibi et al. | |
| 2018/0134217 A1 | 5/2018 | Peterson et al. | |
| 2018/0244204 A1 | 8/2018 | Boehm | |
| 2018/0329210 A1 | 11/2018 | Lee et al. | |

FOREIGN PATENT DOCUMENTS

| | | |
|---|---|---|
| EP | 2789505 A1 | 10/2014 |
| JP | 62075619 | 4/1987 |
| JP | 2002120649 A | 4/2002 |
| JP | 2010143250 A | 7/2010 |
| JP | 2010163104 A | 7/2010 |
| WO | 2003084780 A2 | 10/2003 |
| WO | 2004012963 A1 | 2/2004 |
| WO | 2004098953 A2 | 11/2004 |
| WO | 2017191558 A1 | 11/2017 |

* cited by examiner

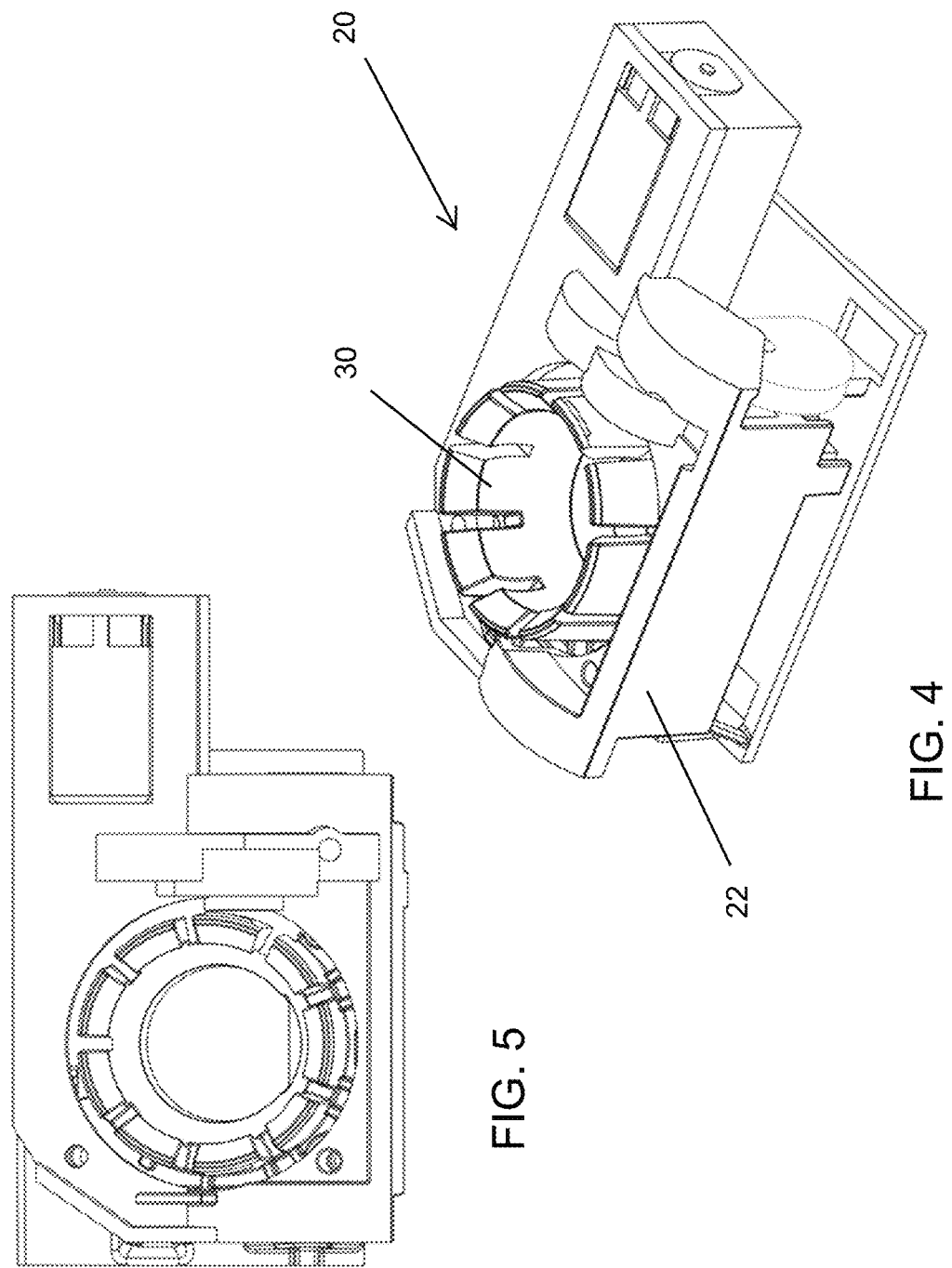

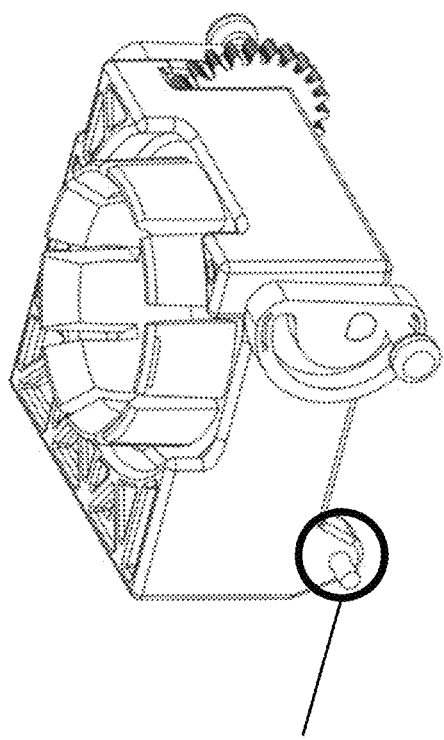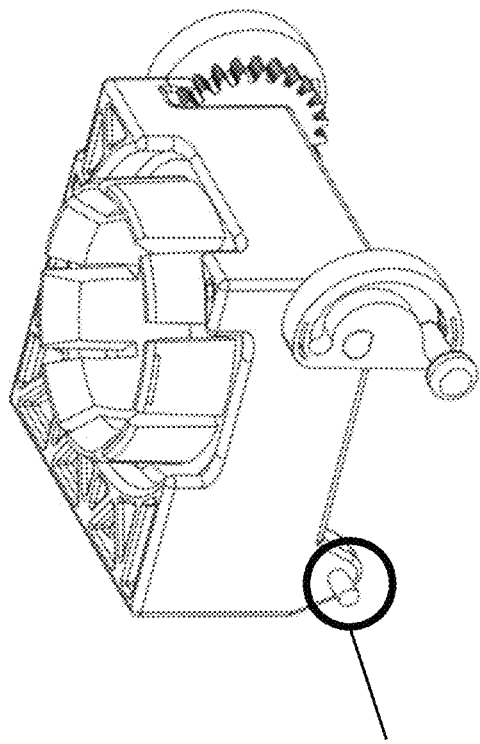
FIG. 8
FIG. 9
Fixed axis of rotation

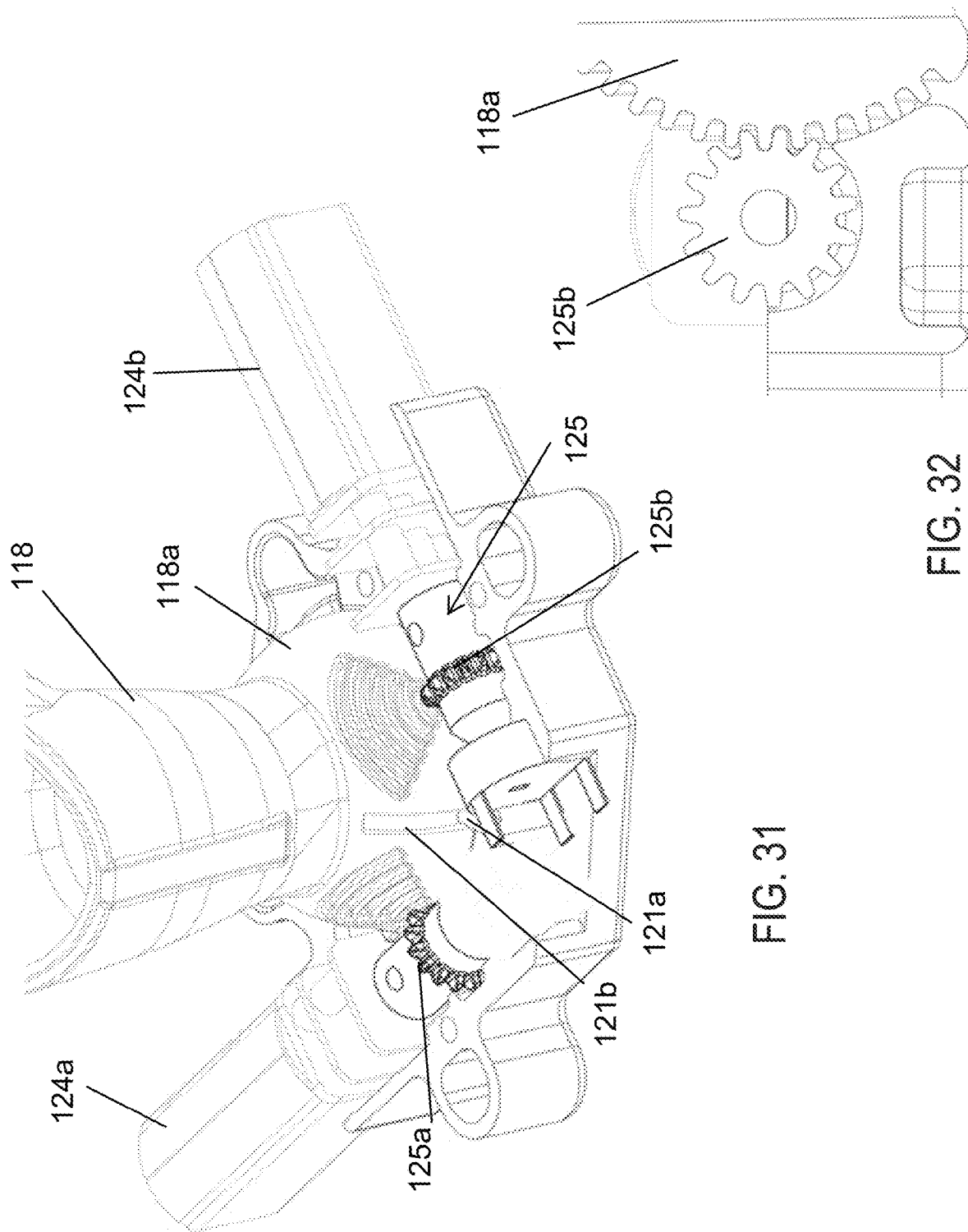

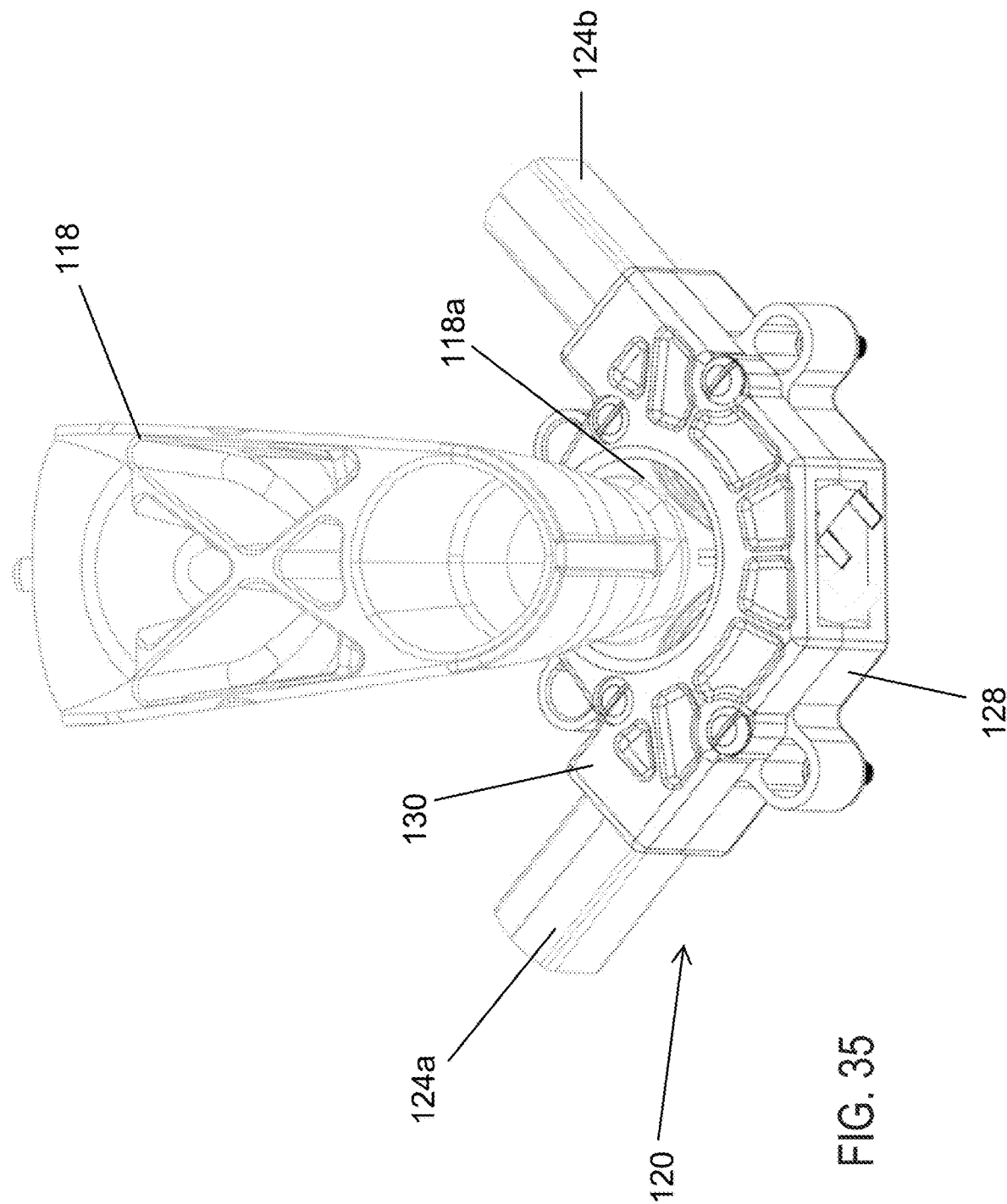

Anti Rotation Feature

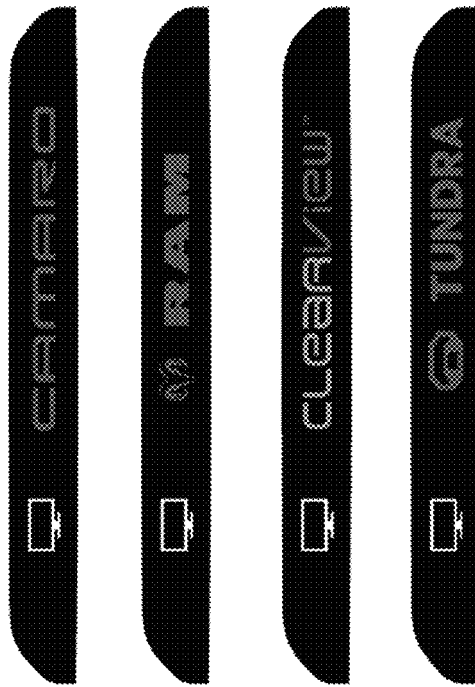
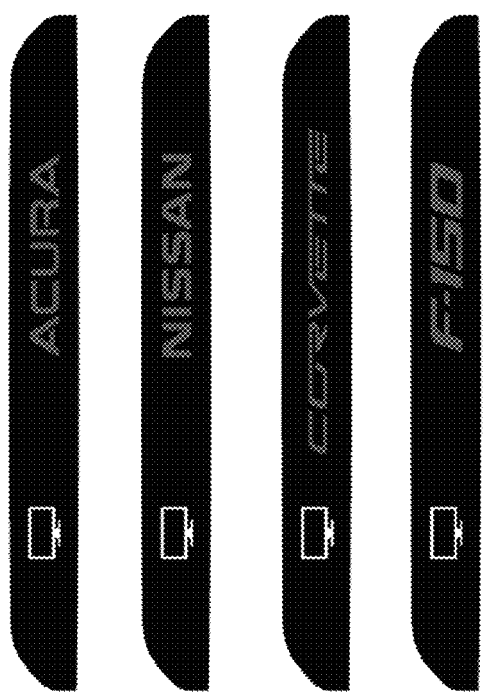
Interchangeable Graphical Applique
FIG. 70

Reconfigurable Menu Options

VEHICULAR IN INTERIOR REARVIEW MIRROR ASSEMBLY WITH DISPLAY AND TILT MECHANISM

CROSS REFERENCE TO RELATED APPLICATIONS

The present application is a continuation of U.S. patent application Ser. No. 16/600,661, filed Oct. 14, 2019, now U.S. Pat. No. 10,829,051, which is a continuation of U.S. patent application Ser. No. 15/910,084, filed Mar. 2, 2018, now U.S. Pat. No. 10,442,360, which claims the filing benefits of U.S. provisional applications, Ser. No. 62/587,145, filed Nov. 16, 2017, Ser. No. 62/501,263, filed May 4, 2017, Ser. No. 62/476,951, filed Mar. 27, 2017, Ser. No. 62/471,492, filed Mar. 15, 2017, and Ser. No. 62/466,090, filed Mar. 2, 2017, which are hereby incorporated herein by reference in their entireties.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly. A variety of interior and exterior mirror assemblies with indicators and/or displays are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of captured images for viewing by the driver of the vehicle. A video display screen is disposed in the vehicle cabin and is viewable at the interior rearview mirror assembly. The mirror head and reflective element of the mirror assembly can be adjusted or flipped between a mirror mode orientation, where the driver of the vehicle views rearward of the vehicle via the mirror reflective element, and a display mode orientation, where the driver of the vehicle views images displayed by the display device via the mirror reflective element. The adjustment or flipping function is performed by an actuator of the mirror head that operates to pivot the mirror head relative to the pivot joint attachment that attaches the mirror head to a mirror mount affixed at an interior portion of the vehicle (such as at a headliner or at an in-cabin surface of the vehicle windshield or the like). The actuator is actuated via a user input or may automatically actuate to pivot the mirror head to a display orientation responsive to the driver shifting the vehicle transmission into a reverse gear (whereby the display screen may be activated to display video images derived from image data captured by a rear backup camera of the vehicle).

The mirror head may include a socket element that pivotally attaches at a ball element of the mirror mount, and the ball element may comprise a plurality of grooves established at a surface thereof. The actuator comprises a motor that, when actuated, rotatably drives a gear that engages the grooves on the ball element of the mirror mount, such that, when the gear rotates, the gear imparts pivotal movement of the socket element relative to the ball element. The actuator may include two motors and the ball element may include two sets of arcuate grooves at respective quadrants thereof, such that the actuator can pivot the mirror head upward, downward and/or sideward relative to the mirror mount.

These and other objects, advantages, purposes and features of the present invention will become apparent upon review of the following specification in conjunction with the drawings.

BRIEF DESCRIPTION OF THE DRAWINGS

FIG. 4 is a perspective view of the actuator;

FIG. 5 is a plan view of the actuator;

FIGS. 8 and 9 are perspective views of the actuator showing the pivotal movement of the cam elements;

FIG. 31 is another perspective view of the actuator of FIG. 30;

FIG. 32 is an enlarged view of a gear engagement of the actuator;

FIGS. 35-40 are perspective views of the actuator, showing different adjustments of the actuator;

FIG. 70 shows a plurality of optional graphical appliques for use with a mirror assembly of the present invention;

DESCRIPTION OF THE PREFERRED EMBODIMENTS

Figure 1:
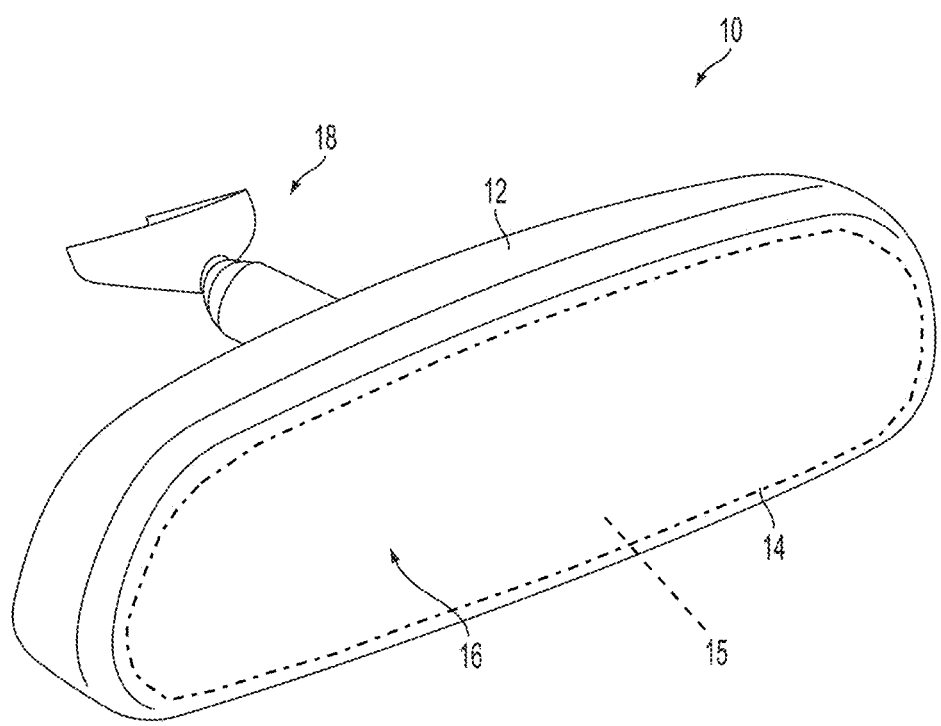
FIG. 1 is a perspective view of an interior rearview mirror assembly suitable for use with the display system of the present invention.
Figure 2:
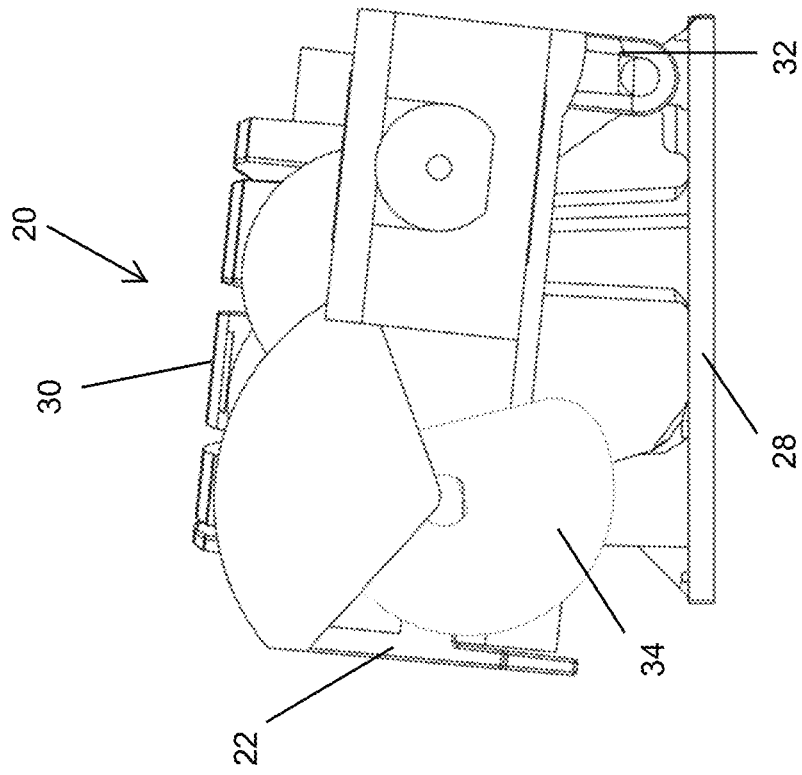
FIG. 2 is a side elevation of an actuator operable to pivot the mirror head of the mirror assembly between a display mode orientation and a mirror mode orientation in accordance with the present invention.
Figure 3:
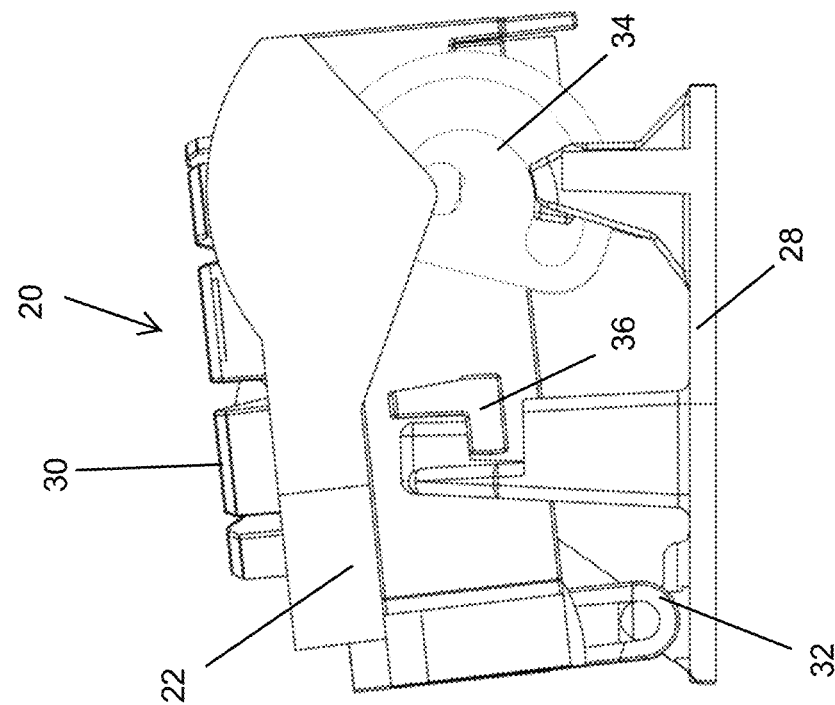
FIG. 3 is an opposite side elevation of the actuator of FIG. 2.

Referring now to the drawings and the illustrative embodiments depicted therein, an interior rearview mirror assembly 10 for a vehicle includes a casing 12 that houses a reflective element 14 and a display device, which provides a display area 16 visible to the driver of the vehicle through the reflective element 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

The mirror head is tiltable or pivotable between a mirror mode orientation, where the reflective element is positioned to provide the desired driver's rearward field of view, and a display mode orientation, where the mirror head is tilted upward or downward relative to the mirror mode orientation, such that the display is viewable by the driver while the reflective element reflects light from rearward of the vehicle and incident thereon upward or downward away from the driver's eyes. The mirror head is tiltable or pivotable between the mirror mode orientation and the display mode orientation via an actuator 20 (FIGS. 2-25) that is electrically powered to impart a pivotal movement or flipping of the mirror head about a generally horizontal pivot axis.

The interior mirror thus can be used as a traditional mirror assembly, but can also be changed to a video monitor, such as through a use of a transflective surface and a high intensity display transposed behind the transflective surface, such as by utilizing aspects of the mirror assemblies described in U.S. Publication Nos. US-2017-0355312; US-2017-0327044; US-2017-0297498 and/or US-2016-0375833, which are all hereby incorporated herein by reference in their entireties.

In the illustrated embodiment, the actuator 20 comprises a body 22 that houses a motor 24 and gear elements 26, with the body pivotally mounted at a mounting plate 28 (FIGS. 2 and 3) of the mirror reflective element. The mounting plate 28 may comprise the backing plate of the mirror reflective element or may comprise a separate mounting plate of the actuator, such that the mounting plate is attachable at the mirror head or backing plate to mount the actuator and mounting plate as a unit in the mirror head. In the illustrated embodiment, and such as shown in FIGS. 20-25, the actuator is attached at a back plate or chassis 28 that is disposed at the rear of the LED board 8 and reflector 7 and film stack 65 and foam 5 and thin film transistor (TFT) 4 of the display screen. The display device is disposed at a frame 3 and attached at the rear of the EC cell 14 via tape 2. The motherboard or circuit board 13 is disposed at the chassis 28 and an EMC shield 15 and garage door opening device 38 (such as a HOMELINK® device or the like) are disposed in the mirror head at the circuit board and chassis.

The body 22 includes a pivot element 30 (such as a socket element) for pivotally mounting or attaching to a pivot element of a mirror mount (such as to a ball member of a mirror mount or mirror stay that is attached at the headliner of the vehicle or at an in-cabin surface of the vehicle windshield). The actuator includes a pivot mount 32 at each side for pivotally mounting or attaching the actuator at the backing plate 28, and also includes cam followers 34 that have arcuate slots that receive a respective pin at the backing plate 28 (such as at a mounting stanchion or boss at the backing plate). Thus, when the cam followers 34 are pivoted (via actuation of the motor driving the gear elements), the pins move along the slots to pivot the body 22 and pivot element 30 about the pivot axis at the pivot mounts 32 and relative to the mirror backing plate (and thus relative to the mirror reflective element).

The rotating cam mechanism is used to create mechanical advantage, and to provide linear movement about a fixed point. The fixed axis of rotation (at the pivot mounts 32) creates an angle change for the body that is connected to the cam shaft and fixed point. The angle change is seen with regards to the body connected to the fixed point of rotation, and the cam follower. The actuator optionally includes a detent at each end of cam groove help to lock each follower in place when the actuator pivots the mirror head to the mirror mode orientation or the display mode orientation, which provides added stability while under vibration. The actuator uses two closed cams to create added stability for the mechanism.

As can be seen with reference to FIGS. 10-13, the cam axis and follower axis stay in line with forces. This limits or prevents back drive of the gear train, and takes stresses off of the gear teeth when the actuator and gear teeth are not in motion. Optionally, the motor and gear train may be disposed in the body by the socket element or (and such as shown in FIGS. 4 and 5) the motor can be shifted to a side of the actuator in order to provide a lower profile actuator and to decrease the overall height of the mirror head.

As shown in FIGS. 15-19, the actuator includes a DC motor 24 used in conjunction with the spur gear train 26 to transfer movement with increased torque to the "closed cam" in order to tilt the actuator and to cause the mirror head to pivot upward or downward relative to the pivot element that mounts the mirror head at the mirror mount or stay.

Figure 7:
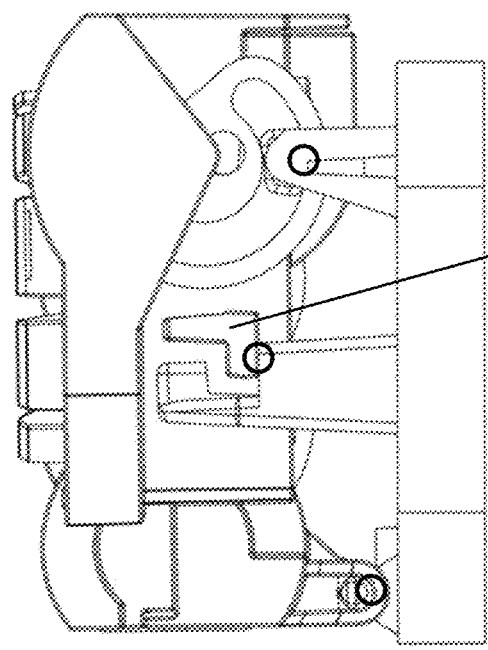
FIGS. 6 and 7 are side elevations of the actuator, showing the stop element stopping pivotal movement of the actuator in either direction.
Figure 6:
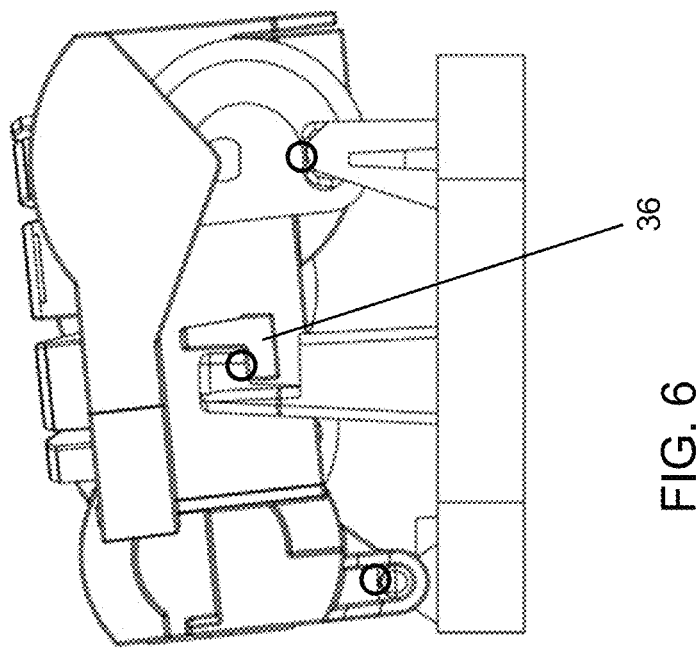
Figure 12:
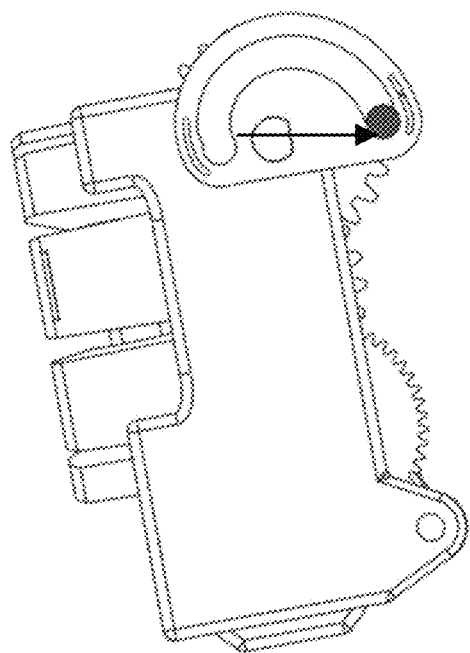
FIGS. 10-13 are side elevation of the actuator showing how the cam axis and follower axis stay in line with forces.
Figure 13:
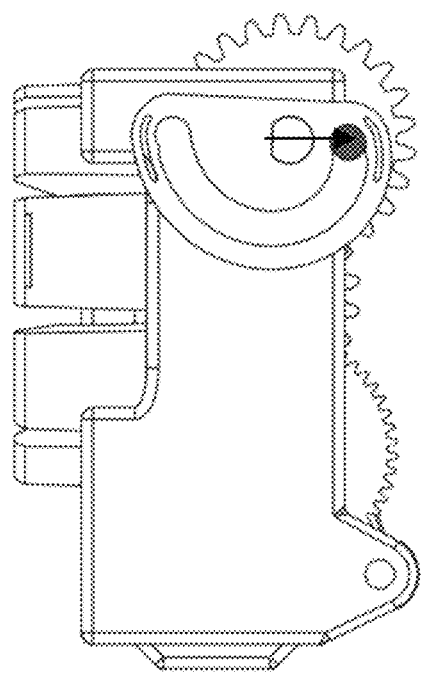
Figure 10:
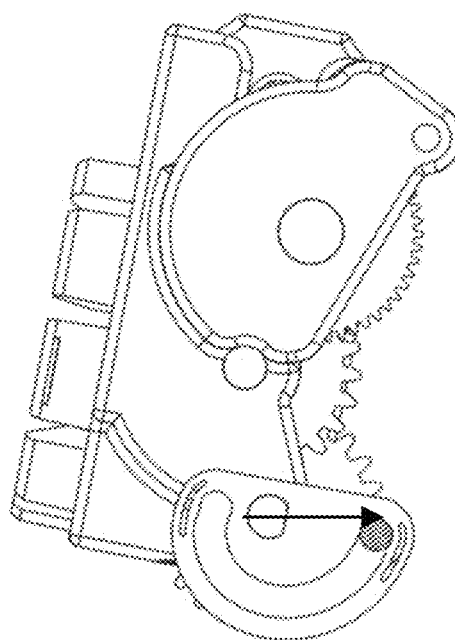
Figure 11:
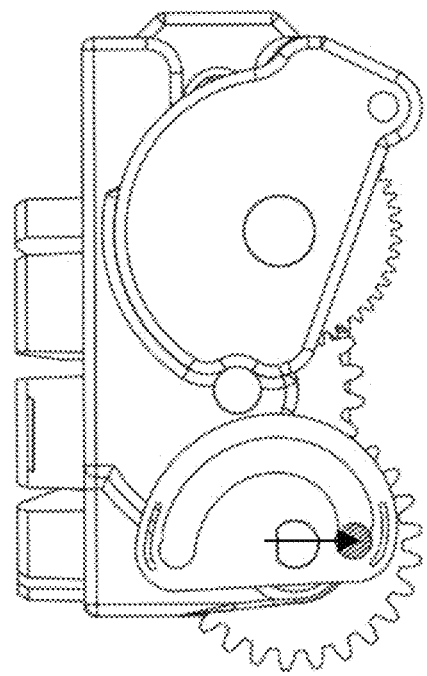
Figure 15:
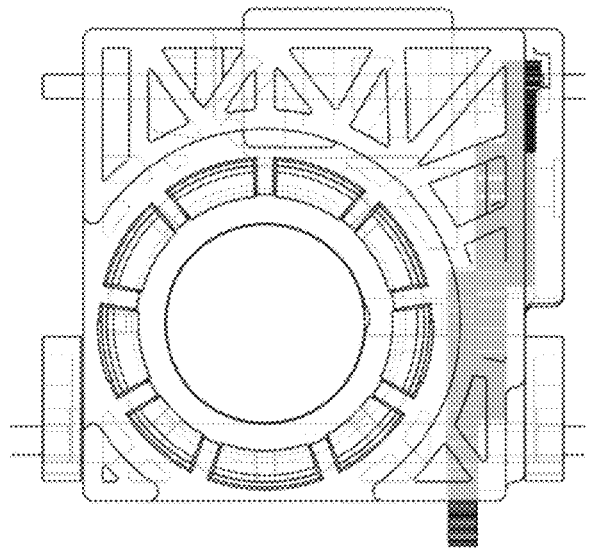
FIG. 15 is a plan view of the actuator.
Figure 14:
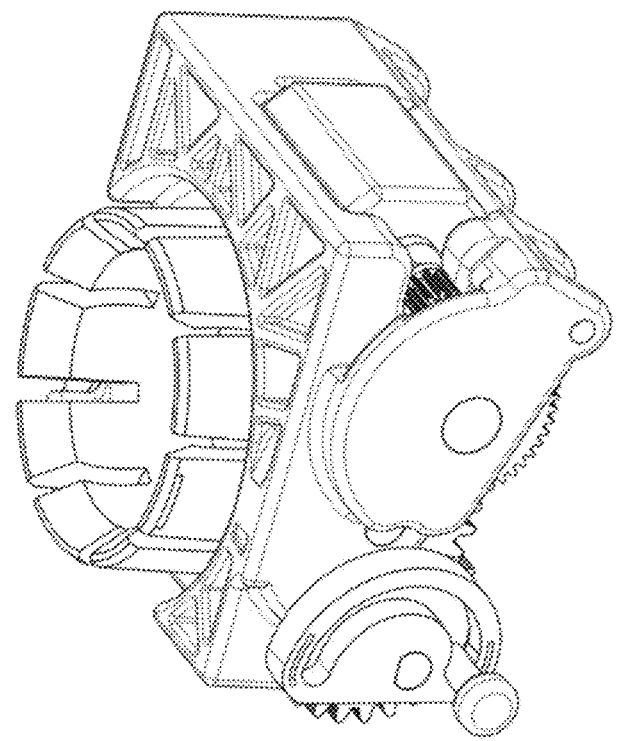
FIG. 14 is a perspective view of the actuator.
Figure 18:
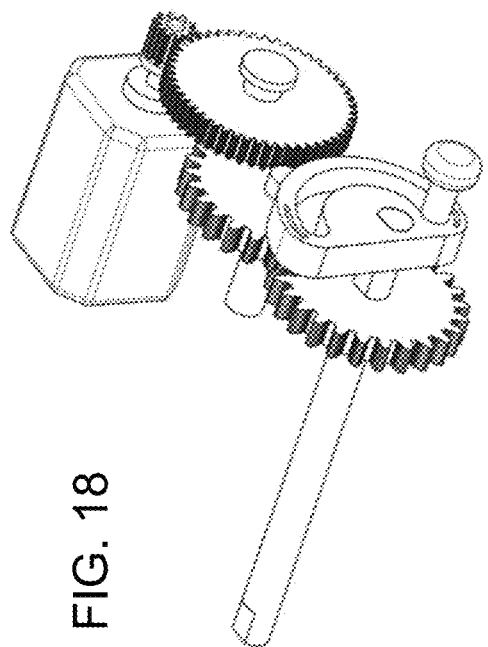
FIGS. 16-19 are views of the motor and gear train of the actuator.
Figure 19:
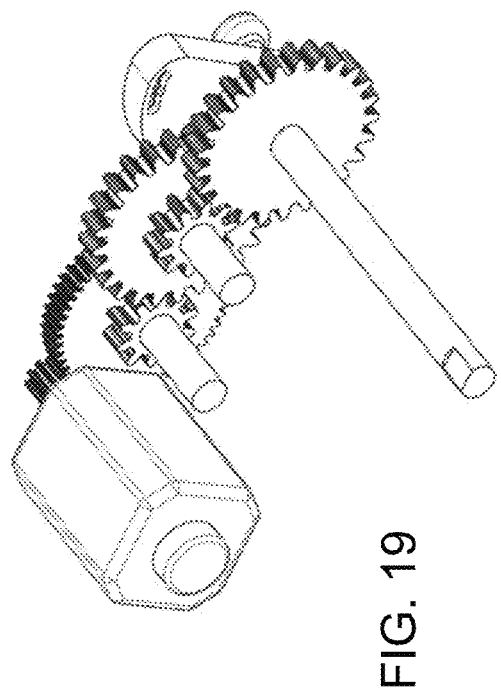
Figure 17:
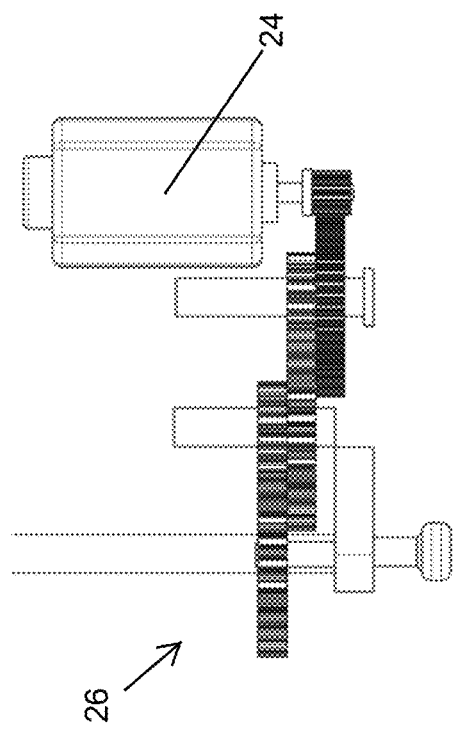
Figure 16:
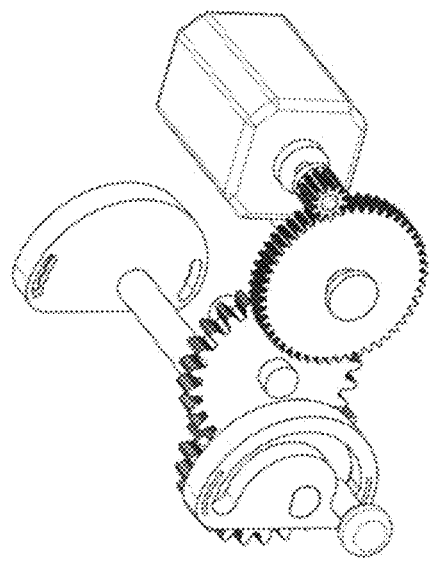
Figure 20:
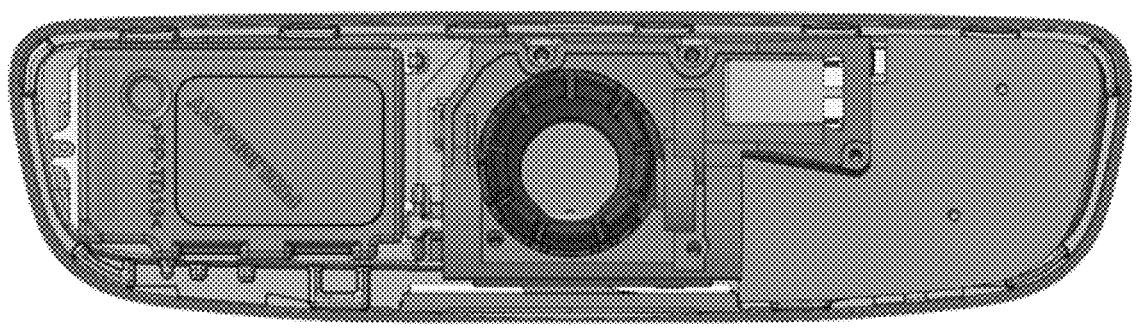
FIG. 20 is a plan view of the actuator attached at a chassis of a mirror reflective element.
Figure 21:
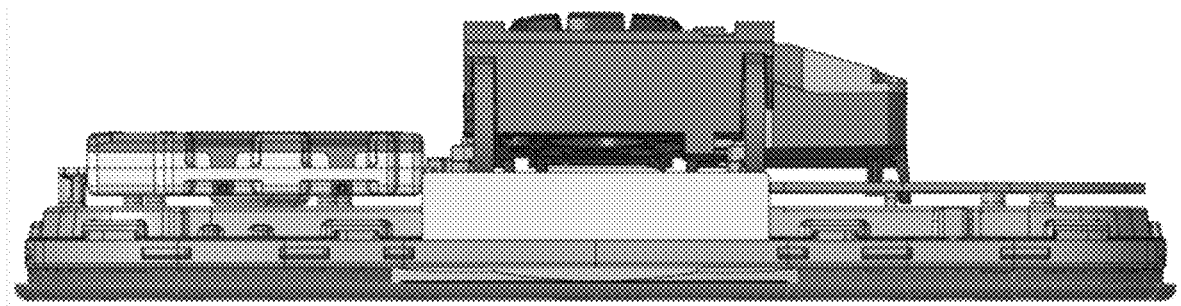
FIGS. 21 and 22 are side views of the actuator and chassis and mirror reflective element of FIG. 20.
Figure 22:
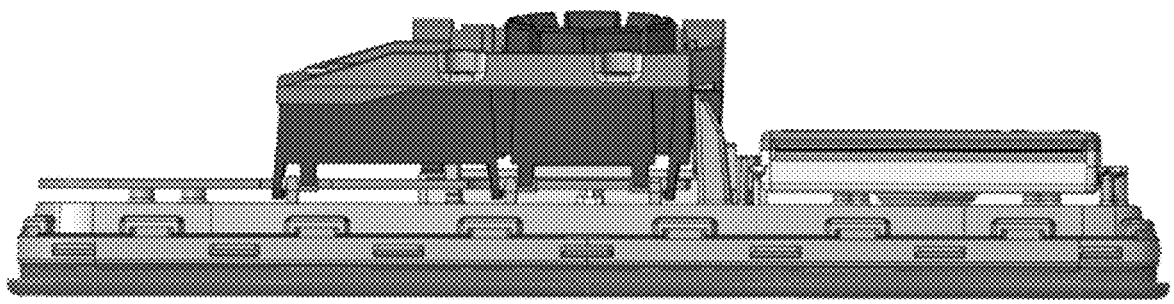
Figure 23:
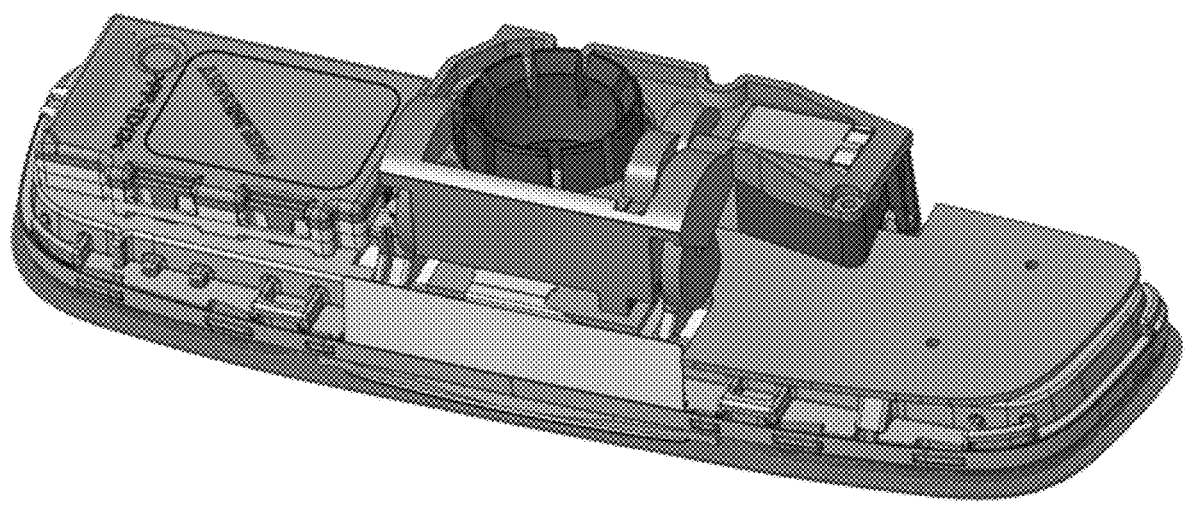
FIG. 23 is a perspective view of the actuator and chassis and mirror reflective element of FIG. 20.
Figure 24:
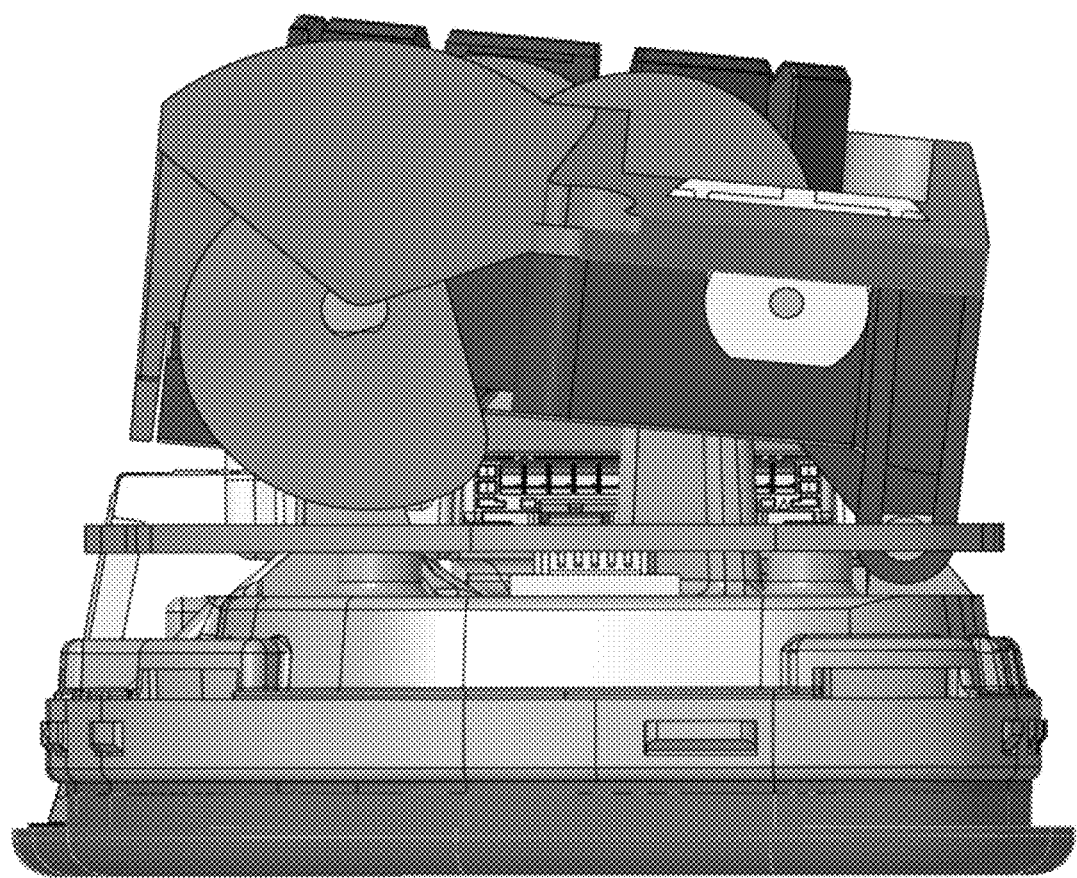
FIG. 24 is an end view of the actuator and chassis and mirror reflective element of FIG. 20.
Figure 25:
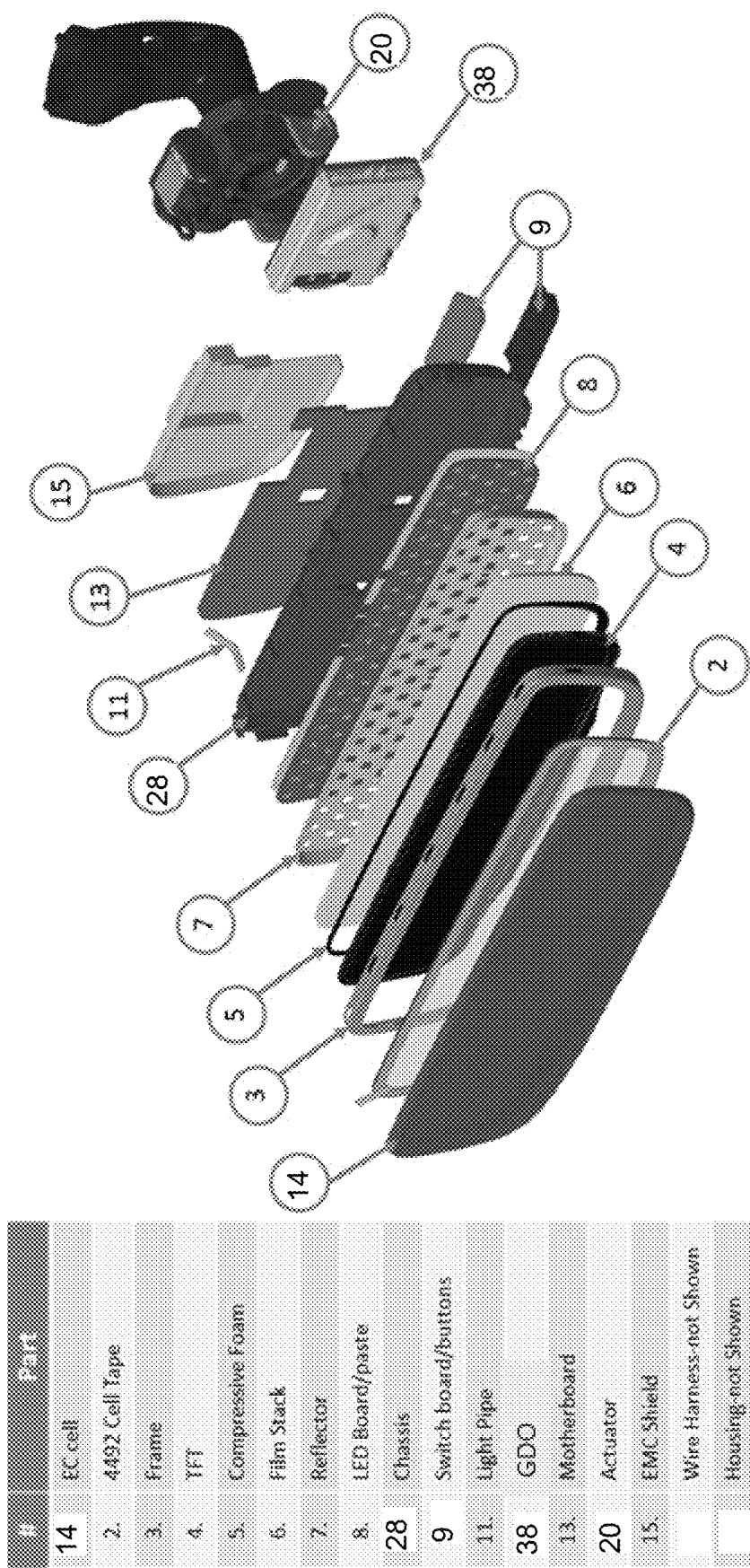
FIG. 25 is an exploded perspective view of the actuator and chassis and mirror reflective element of FIG. 20.
Figure 26:
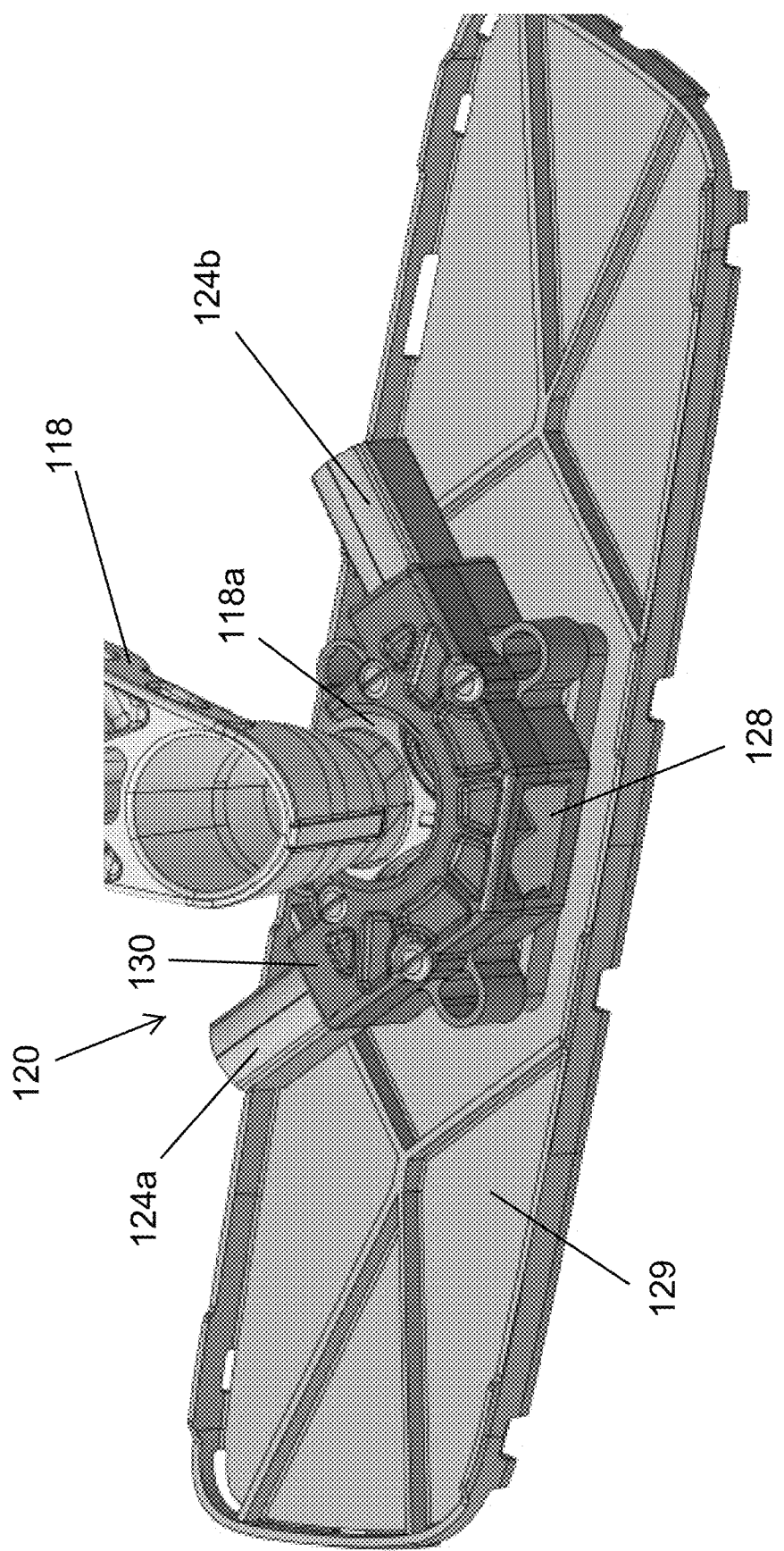
FIG. 26 is a perspective view of another mirror assembly with an actuator to adjust the tilt of the mirror head relative to a support or mounting structure.
Figure 27:
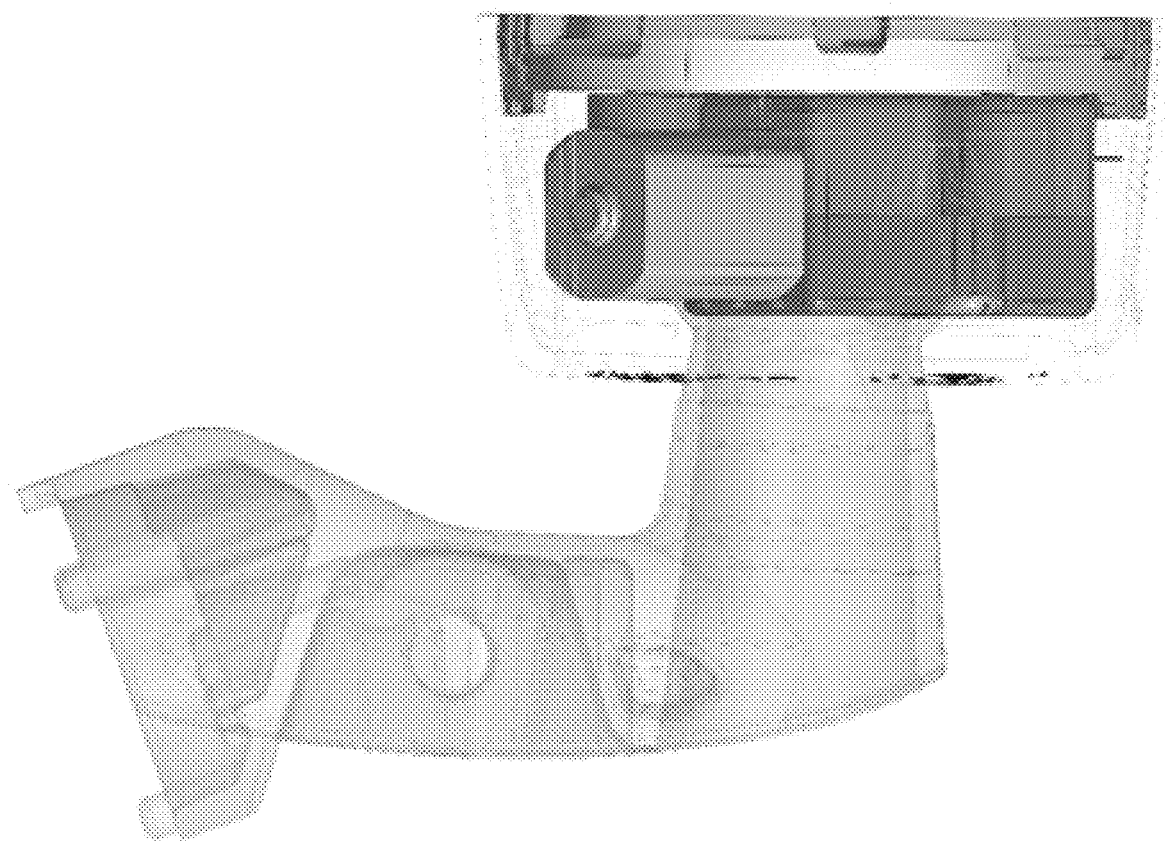
FIG. 27 is a side elevation and partial sectional view of the mirror assembly of FIG. 26.
Figure 28:
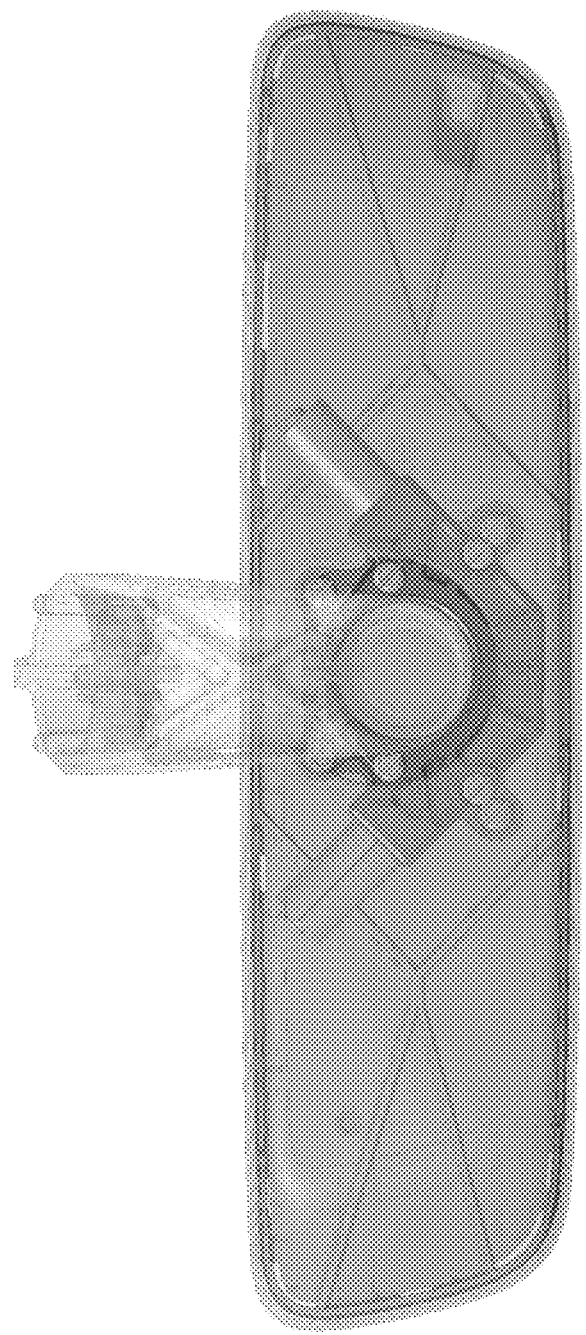
FIGS. 28 and 29 are plan views of the mirror assembly of FIG. 26.
Figure 29:
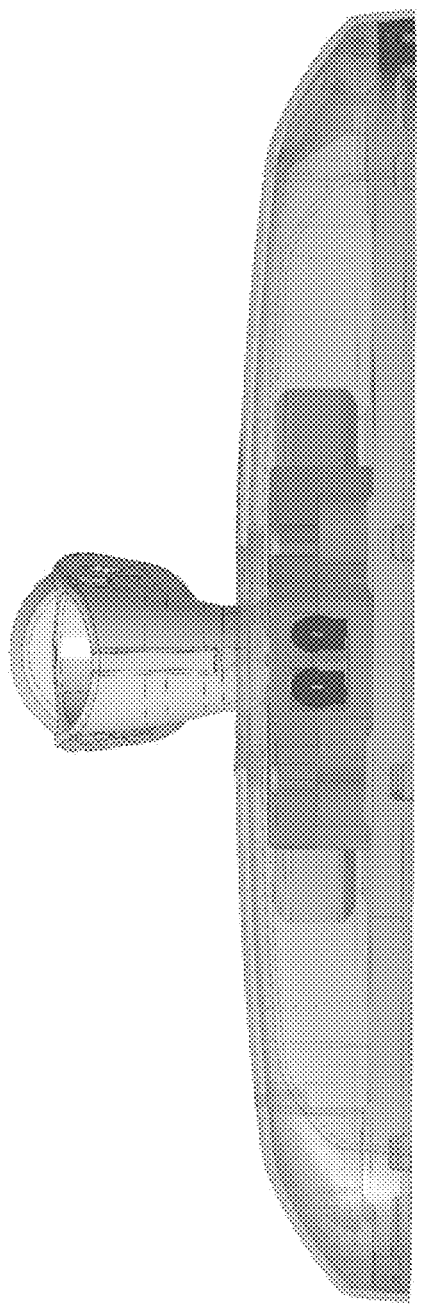

Optionally, and such as shown in FIGS. 6 and 7, the actuator includes travel stops to limit pivotal movement of the actuator in either directions. In the illustrated embodiment, the travel stop 36 is located at a center region of the actuator and creates a load path directly between the mirror assembly and the mirror stay. As shown in FIG. 6, when the actuator pivots in one direction, the travel stop engages a first stop element of the mounting plate to limit pivotal movement in that direction and, when the actuator pivots in the other direction (as shown in FIG. 7), the travel stop engages a second stop element to limit pivotal movement in that direction. The three point loading creates optimal connection and increased vibration stability. Optionally, and desirably, the cam lobes do not reach the end of travel or the end of the arcuate grooves when the travel stop stops pivotal movement. Once the travel stop is hit, friction force on cams increases until the cam can no longer rotate. This offers a very sturdy connection between the actuator and the mirror assembly.

The present invention provides a display system that can display video images across the entire reflective surface of an interior rearview mirror assembly. The display system may include a display device disposed at an upper region of the vehicle's interior cabin (or other location), such that, when the mirror head is tilted or angled or otherwise mechanically adjusted, the mirror reflective element reflects the displayed image across the entire reflective surface for viewing by the driver of the vehicle. Optionally, and desirably, the display system includes a video display screen disposed in the mirror head and viewable (when activated) through the reflective element. For example, when the mirror head is adjusted to a "mirror mode", the driver can view the rearward field of view provided by the reflective element, but when the mirror head is tilted or adjusted (to a "display mode"), the displayed video images (such as derived from image data captured by a rearward viewing camera) are viewable by the driver of the vehicle, with the tilting of the mirror head causing the primary reflection off of the reflective element to be out of the driver's eyes (since it would be aimed up toward the headliner or down into the cabin area instead of out the rear window).

The mirror system includes an electronically operable actuator that is operable to adjust or pivot the mirror head between the mirror mode orientation and the display mode orientation. For example, the mirror actuator may move the mirror head to the display mode orientation responsive to a user input or responsive to the driver shifting the vehicle into a reverse gear, whereby a rear backup camera is actuated and the display displays video images derived from image data captured by the rear backup camera.

The actuator thus performs the rotation of the mirror head like a traditional manual flip-tab/toggle mechanism would. The actuator pivots the mirror head of a full-size-video display inside mirror so the mirror head can be used as an interior rearview mirror (mirror mode) or as a full mirror display screen (display mode). When the user hits a switch or button, the actuator tilts the mirror and the digital display turns on. The tilting action gets the primary reflection out of the driver's eyes as it would be aimed up into the headliner or down into the cabin area instead of out the rear window. The video display screen may span substantially the entire length and width of the reflective element. For example, the video display screen length dimension (lateral dimension across the vehicle when the mirror assembly is installed in the vehicle) may span at least 75 percent of the reflective element length and the video display screen width dimension (vertical dimension when the mirror assembly is installed in the vehicle) may span at least 75 percent of the reflective element width dimension. Optionally, the video display screen length dimension may span at least 95 percent of the reflective element length and the video display screen width dimension may span at least 95 percent of the reflective element width dimension.

The driver thus may adjust the mirror head (via pivoting the mirror head at the pivot joint at the mirror mount or stay) to provide the desired reflective rearward field of view through the rear window of the vehicle. After the mirror head is set in this manner, when the actuator is actuated to pivot the mirror head to the display mode orientation, the mirror head pivots without changing the driver-selected orientation of the socket and ball member pivot joint. Thus, when the actuator is again actuated to pivot the mirror head back to the mirror mode orientation, the mirror reflective element will again be set to the driver's rearward viewing preference.

Optionally, the driver may manually adjust the mirror head between the mirror mode orientation and the display mode orientation, such as by pivoting the mirror head in a normal manner. Optionally, the mirror head may have a toggle or the like that toggles or flips the mirror head between a mirror mode and a display mode (such as a toggle that functions in a similar manner as prismatic mirror toggles that flip a prismatic mirror between day and night orientations).

Optionally, the actuator that provides up/down adjustment of the mirror head, such as for a toggle type of adjustment for known prismatic mirrors, may comprise a micro gearhead motor so as to provide a reduced profile or smaller package size of the actuator. For example, and such as shown in FIGS. 52-56, an actuator 20' comprises a body 22' that houses a motor 24' and gear elements 26', with the body pivotally mounted at the mounting plate or at a base portion 23' attached at the mounting plate of the mirror reflective element. As discussed above, the mounting plate may comprise the backing plate of the mirror reflective element or may comprise a separate mounting plate of the actuator, such that the mounting plate is attachable at the mirror head or backing plate to mount the actuator and mounting plate as a unit in the mirror head. The actuator 20' may operate in a similar manner as the actuator 20, discussed above, such that a detailed discussion of the operation of the actuator 20' need not be discussed further herein.

Similar to the actuator 20, the body 22' of actuator 20' includes a pivot element 30' (such as a socket element) for pivotally mounting or attaching to a pivot element of a mirror mount (such as to a ball member of a mirror mount or mirror stay that is attached at the headliner of the vehicle or at an in-cabin surface of the vehicle windshield). The body 22' of the actuator includes a pivot mount 32' at each side for pivotally mounting or attaching the actuator at the base portion or structure 23' that is attached at the backing plate 28'. The actuator includes cam followers that have arcuate slots that receive a respective pin such that, when the cam followers are pivoted (via actuation of the motor driving the gear elements), the pins move along the slots to pivot the body 22' and pivot element 30' about the pivot axis at the pivot mounts 32' and relative to the mirror backing plate (and thus relative to the mirror reflective element), such as in a similar manner as discussed above.

Figure 56:
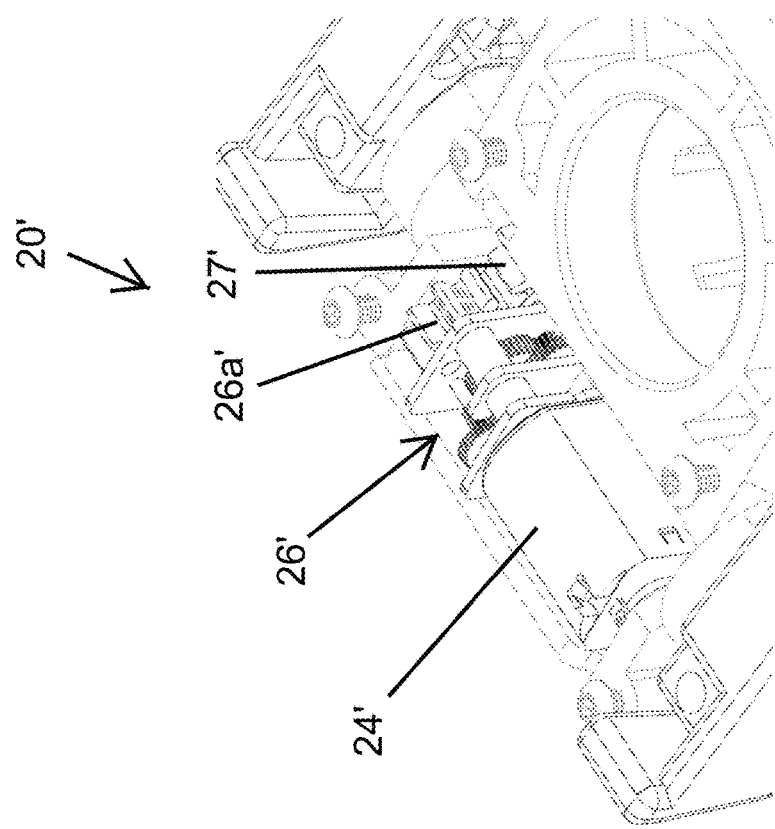
FIG. 56 is a partial perspective view of the actuator of FIG. 52.
Figure 55:
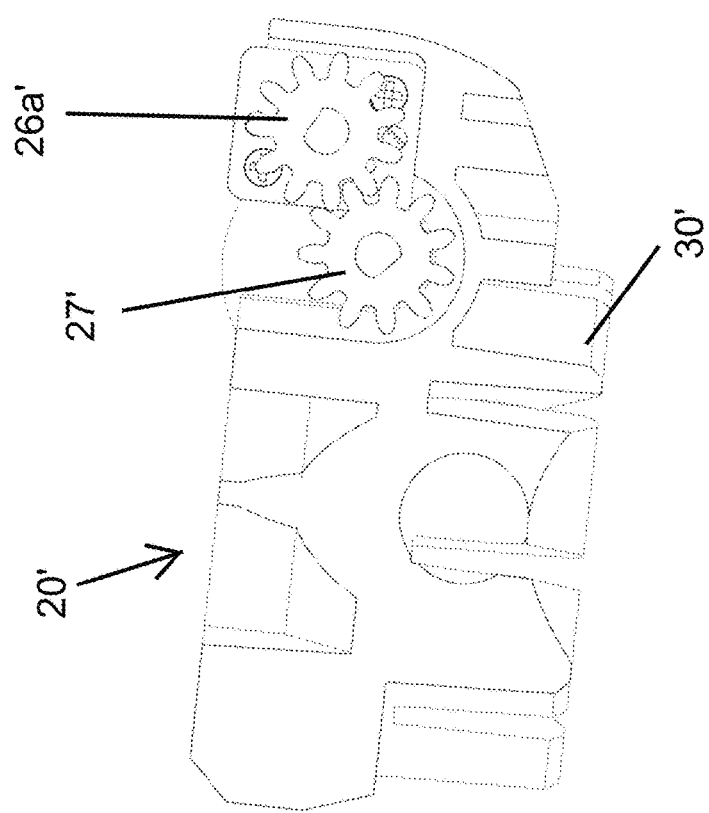
FIG. 55 is a sectional view of the actuator of FIG. 52.

As best shown in FIGS. 55 and 56, the gear elements 26' are packaged generally along the axis of the motor 24' and packaged between the motor and an output gear 26a' that rotatably drives a gear 27' that, when rotated, imparts the pivotal movement of the body 22' and pivot element or socket 30' relative to the base portion and backing plate. The motor comprises a micro gearhead motor and the gears may comprise small metal gears to provide a more robust mechanism and to allow for a smaller area of the actuator being designated for the gear train. The smaller actuator 20', with its reduced profile and smaller space requirements, may provide more styling options for the mirror head.

Thus, the electronic actuator provides actuation (tilt) of the mirror head. Optionally, the actuator system may allow for an electronic fail safe and automatic recovery if the display fails. For example, the system could self-diagnose and position the mirror head back in the mirror mode. The actuator may pivot the mirror head upward or downward to position the mirror head in the orientation for either the mirror mode or the display mode. The mirror head may, for example, pivot upward to be positioned in the display mode, such as for vehicle applications where the vehicle is a convertible or has a large sunroof or moon roof or the like.

The actuator comprises a body portion or housing, with the motor and gears disposed in the housing. In the illustrated embodiments, the pivot element or socket (or optionally a ball member) is integrated into the actuator housing. For example, the pivot element may be molded or formed as part of the actuator housing (such as via an injection molding process that molds the plastic housing and socket).

The actuator (and mirror assembly) is designed to allow a manual toggle assembly to be implemented instead so as to replace the actuator. This allows for potential of easier mirror model updates (such as an update from a manual toggle to an electronic actuator or vice versa).

Optionally, and desirably, the actuator may interface with an electronic switch on the printed circuit board (PCB) in the mirror head for discrete mirror head position (mode) checks. This may be primary or redundant to a memory of the last state or direction the motor was driven (similar to outside mirror powerfold mirrors).

Optionally, the mirror assembly may include a mirror actuator that comprises a lower profile device that has a pair of motors and gears that operate to pivot the mirror head relative to the ball member of the mounting portion or stay that mounts the mirror assembly at an interior portion of a vehicle. For example, and with reference to FIGS. 26-42, a mirror actuator 120 comprises a pair of motors 124a, 124b that rotatably drive respective ball interface gears 125, which include gears 125a, 125b that engage teeth or ridges or grooves formed at a surface of a ball member 118a of the mirror mounting structure or mounting configuration or assembly or stay 118 (that may comprise a single pivot element or stay, as shown, or that may comprise a double pivot mounting arrangement, such as shown in FIG. 1). Thus, a user can manually adjust the mirror head and reflective element 116 to provide a desired rearward view, and the actuator 120 operates to adjust the mirror head relative to the mounting structure or stay 118, such as to pivot the mirror head to a display mode orientation for displaying videos (for viewing by the driver of the vehicle) via the full mirror display of the mirror head.

The actuator 120 includes a base portion 128 that is mounted at an attachment plate 129 of the mirror head and houses or receives the gears 125a, 125b therein. The actuator 120 also includes a cover or housing portion 130 that attaches at the base portion to encase the motors and gears and that provides a socket portion that pivotally mounts and retains the mirror head at the ball member 118a.

Figure 30:
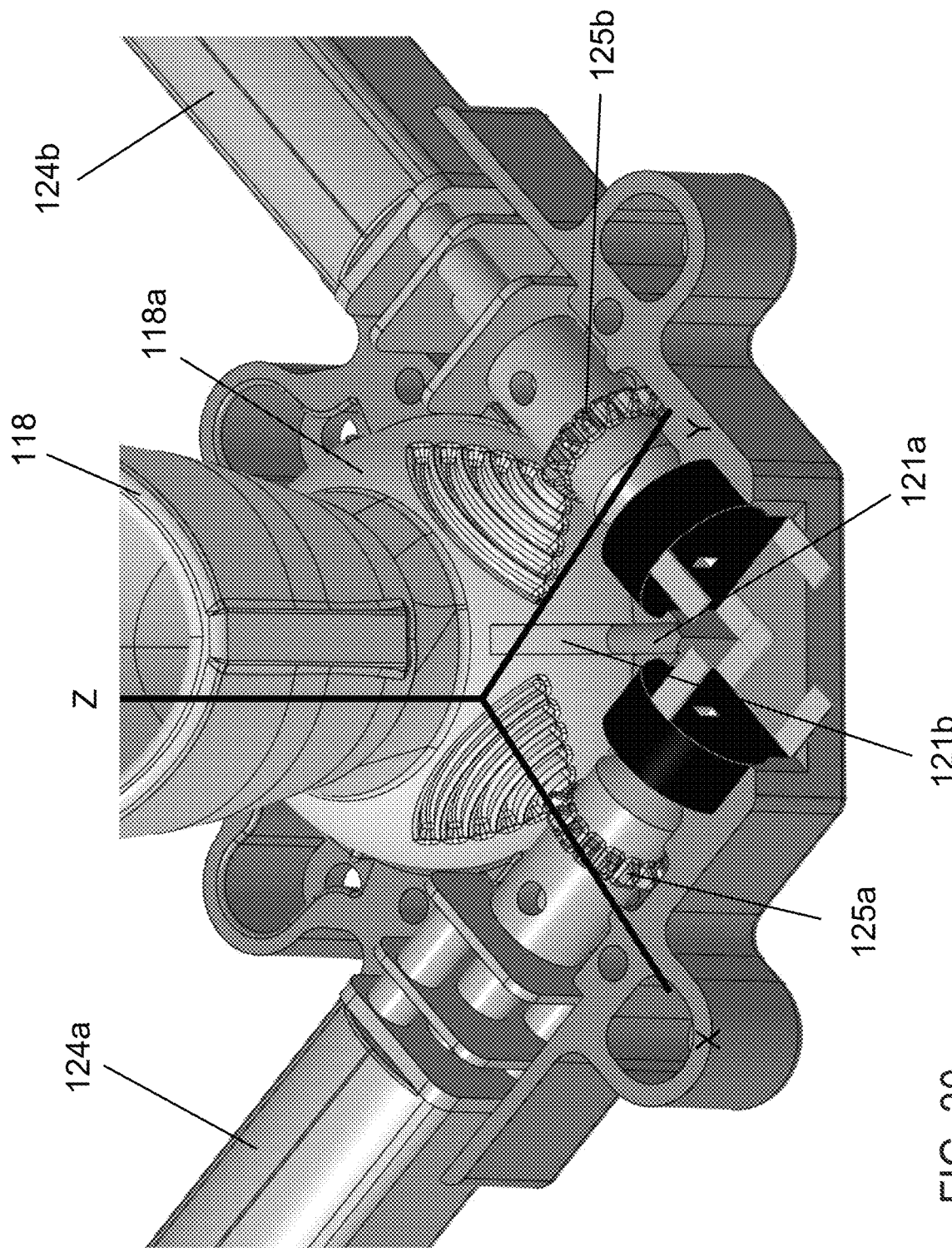
FIG. 30 is a perspective view of the actuator of the mirror assembly of FIG. 26.
Figure 34:
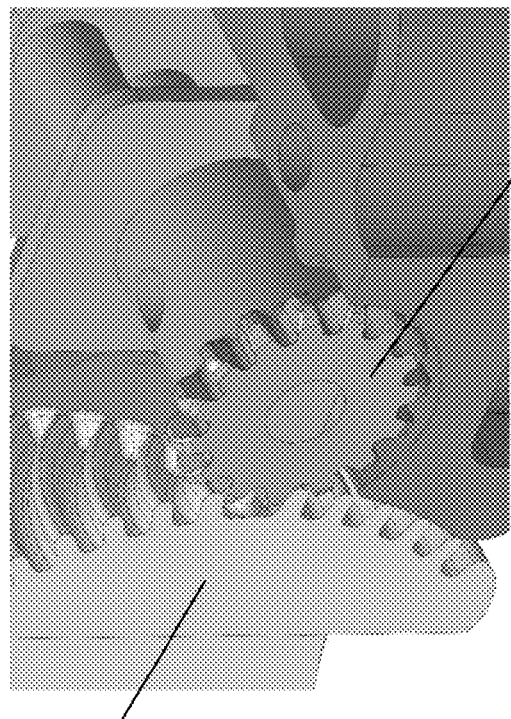
FIGS. 33 and 34 are perspective and partial sectional views of the actuator.

As can be seen with reference to FIG. 30, the mirror head and actuator 120 are locked from rotating relative to the stay 118 about the Z axis (the axis along the stay and generally normal to or angled relative to the mirror back plate) via an anti-rotation feature, which, in the illustrated embodiment, comprises a tab 121a that is received in a slot or channel or groove 121b of the ball member 118a. The mirror head and actuator are allowed to rotate about the X and Y axes (that are normal to one another and generally parallel to the mirror back plate). When the mirror head pivots about the X axis, gear 125b rotates and the gear teeth line up with the slots or grooves in the ball member 118a of the stay 118 and mesh like a set of spur gears. As the mirror head pivots about the X axis, the teeth of gear 125b are allowed to slide along the slots or grooves in the ball member 118a. At any given position, the gear teeth engage and hold the ball, while still allowing rotation around both the X and Y axes.

The arcuate shape of the grooves allow for pivotal movement of the mirror head relative to the ball member about a respective axis, with the two arcuate shaped groove sets being arranged at or centered at orthogonal axes (e.g., the X and Y axes of FIG. 30), to allow for pivoting of the mirror head in several directions. For example, and such as shown in FIGS. 36-41, the mirror head and actuator may pivot in various directions relative to the ball member, responsive to manual pivoting of the mirror head and/or rotational driving of one or both of the gears 125 via the respective motors 124a, 124b. The anti-rotation feature 121a, 121b allows for some play of the tab 121a in the slot 121b, to allow for the adjustment about the X and Y axes while limiting rotation of the mirror head relative to the ball member and stay about the Z axis. The spherically toothed gear provides tooth interfaces that are 90 degrees to each other about the center axis of the ball. The ball includes or is formed with or attached to the mirror base or stay for attaching at the vehicle (such as at the windshield or the like).

Figure 45:
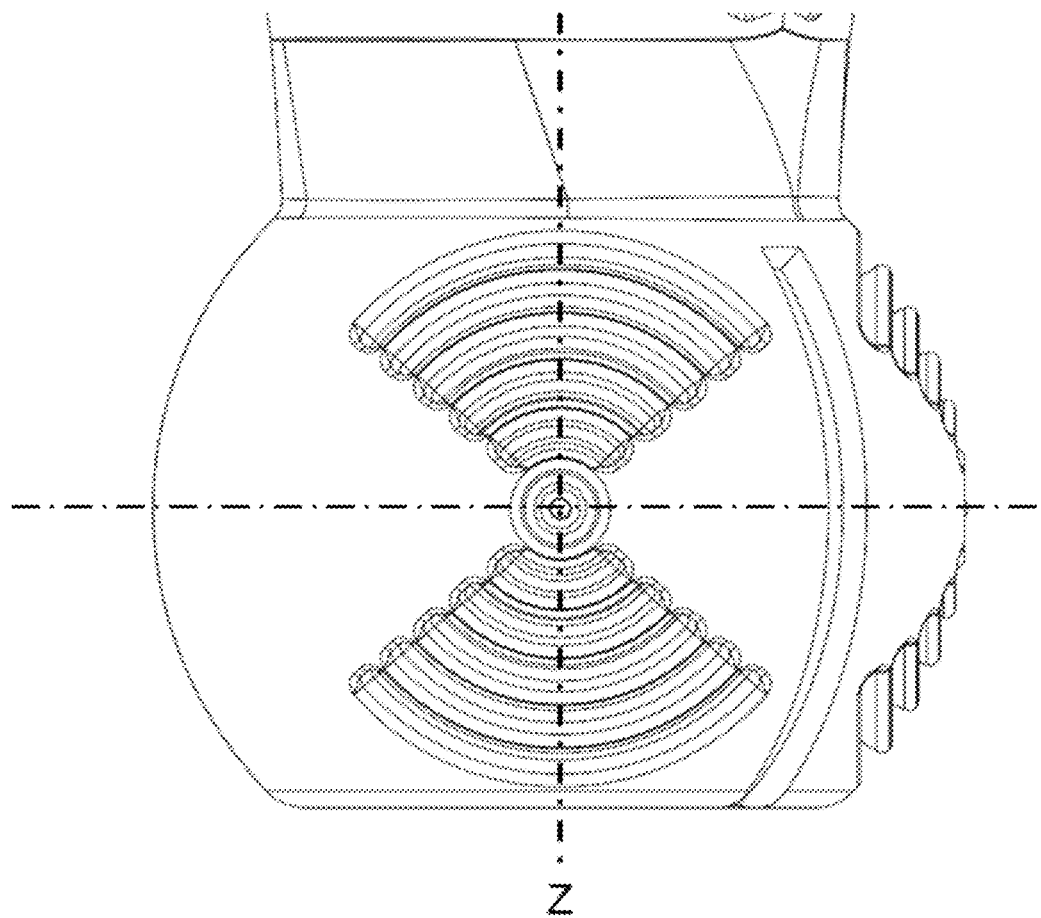
FIG. 45 is an enlarged view of the ball member of the actuator of FIG. 43.
Figure 45A:
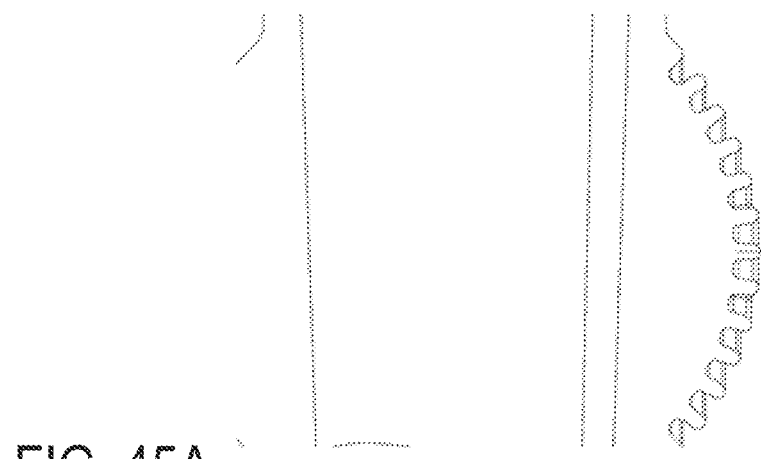
FIG. 45A is a sectional view of the ball member of FIG. 45.

As shown in FIG. 45, the ball at the end of the stay comprises a sphere with two gear interfaces cut into it. The two gear interfaces are positioned orthogonal to each other (about the Z axis) and mirrored about the center line of the ball.

Figure 46:
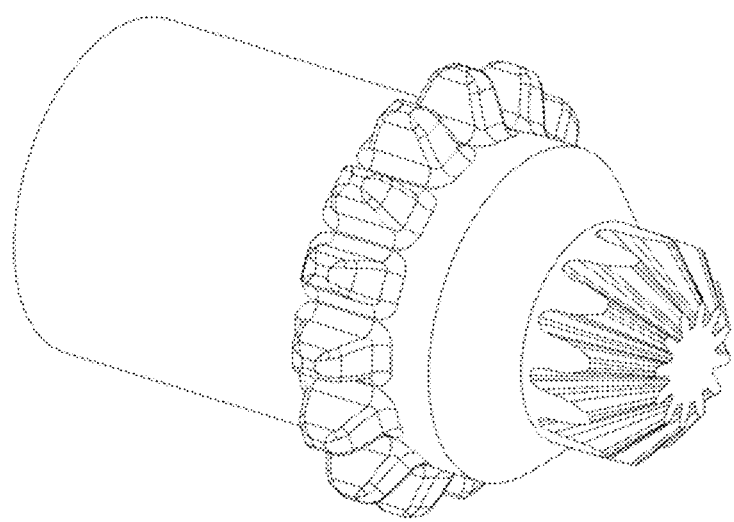
FIG. 46 is a perspective view of the ball interface gear of the actuator.
Figure 47:
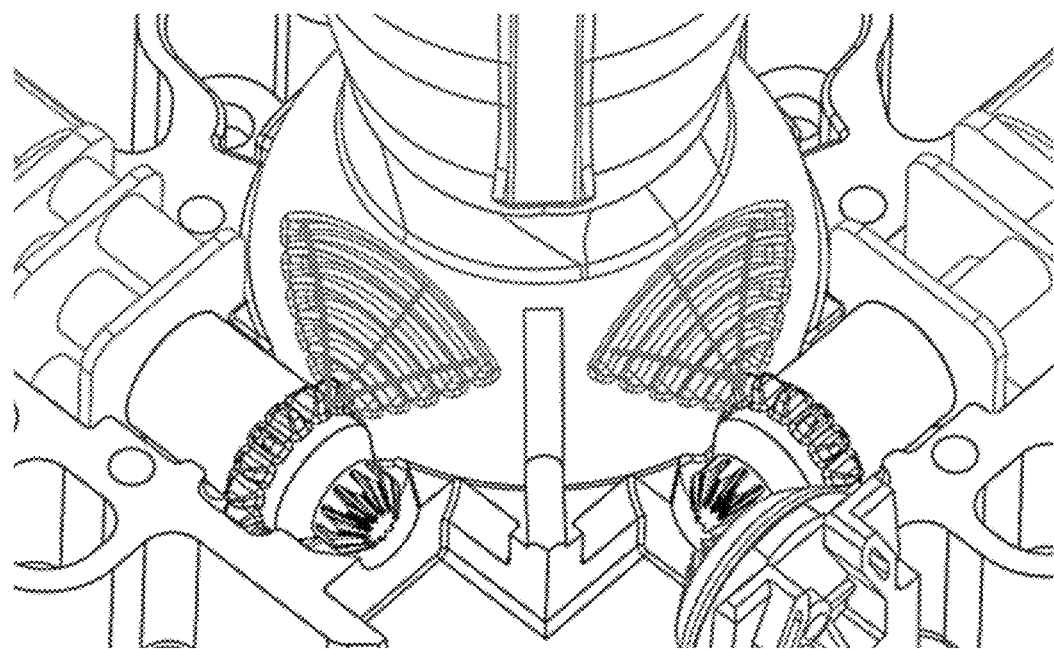
FIG. 47 is another perspective view of the ball and gears of the actuator.
Figure 48:
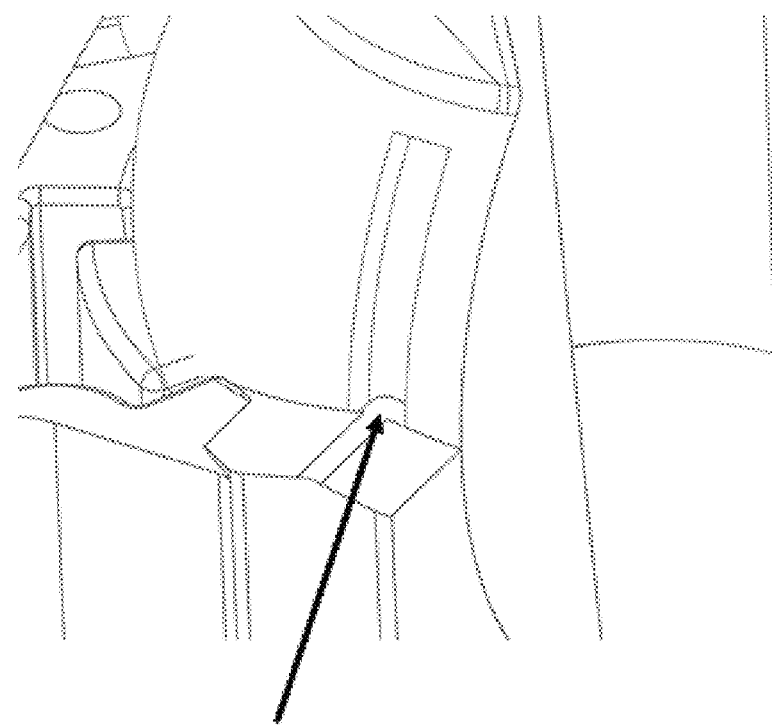
FIG. 48 is an enlarged perspective view of the anti-rotation feature of the actuator.

As shown in FIG. 46, the ball interface gears include a spur gear 125a, 125b with tapered and rounded edges, in order to help facilitate the movement of the ball/stay. This allows for a more consistent connection between the stay and gear due to the curved nature of the teeth on the ball.

In the assembly, the interface gear is positioned at the midline of the ball. When just one motor rotates its gear, the currently rotating interface gear moves linearly across the ball teeth. The ball/stay rotates by pivoting about the center point of the teeth on the other side, and the teeth of the ball slide along the non-rotating interface gear. When two motors rotate the respective gears, both interface gears move up/down the teeth of the ball. The path followed by the gearing is an arc, instead of the straight line followed in other spur gear setups.

In order to keep the ball end of the stay from rotating in an undesired fashion, the anti-rotation feature is provided. If the ball were allowed to rotate about the Z axis, the gear interfaces would come out of alignment and potentially allow the mirror head to be positioned at an incorrect angle within the vehicle. There are two features in the lower housing of the actuator that prevent rotation in the Z axis. The ball has two slots 121b located 180 degrees to each other located on the mirror plane for the ball. The lower housing has two cylindrical posts that ride in the slots of the ball. These posts are located at the midline of the ball and allow for an unhindered rotation around all but the Z axis. The two posts are used to create symmetric forces about the ball so that the ball movement is as smooth as possible and to help with wear prevention.

Figure 33:
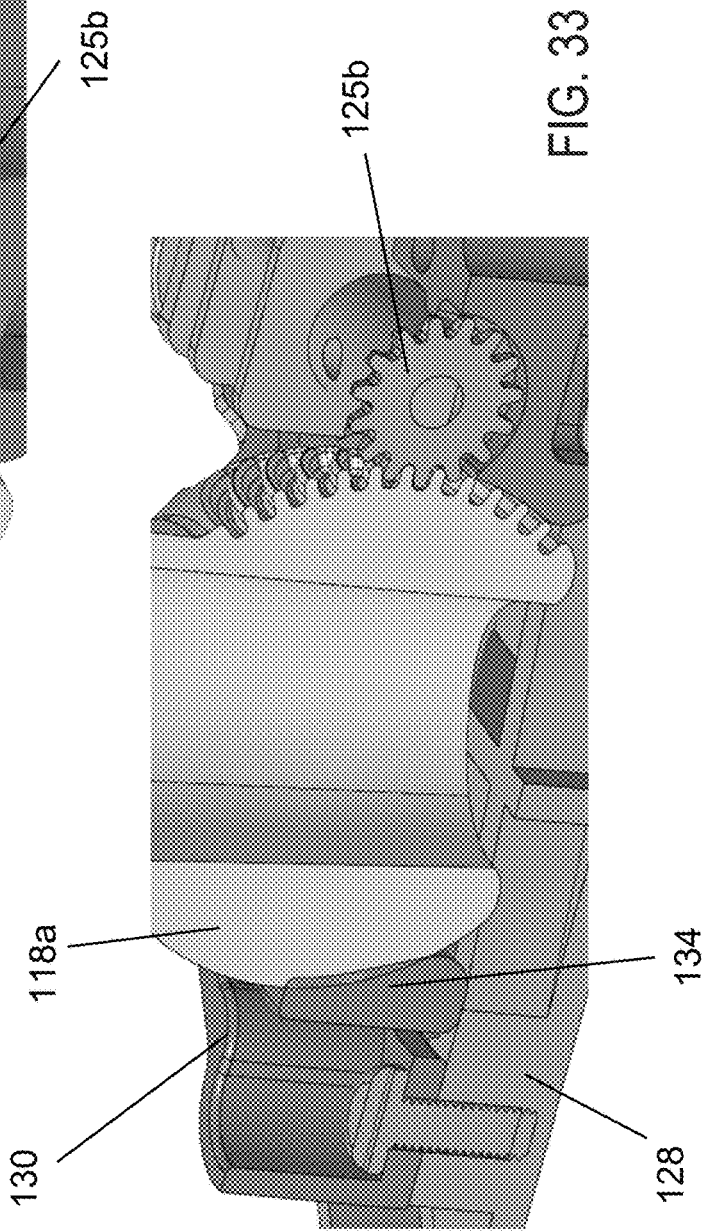
Figure 36:
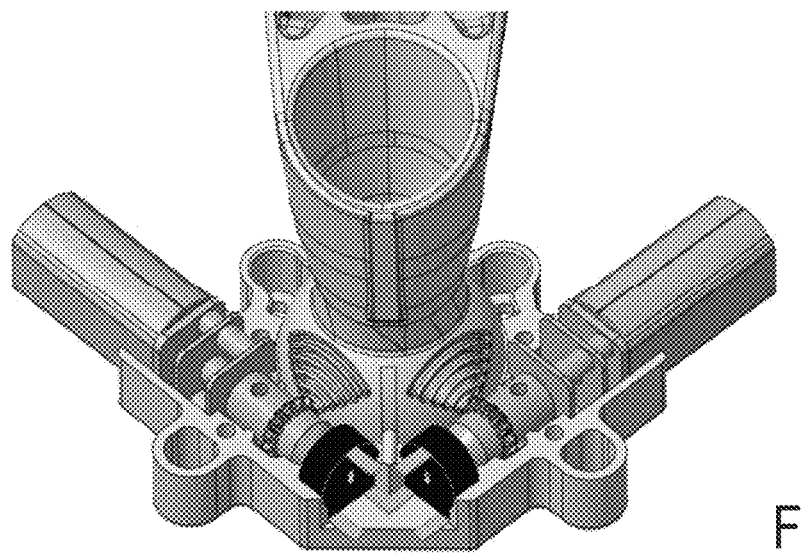
Figure 37:
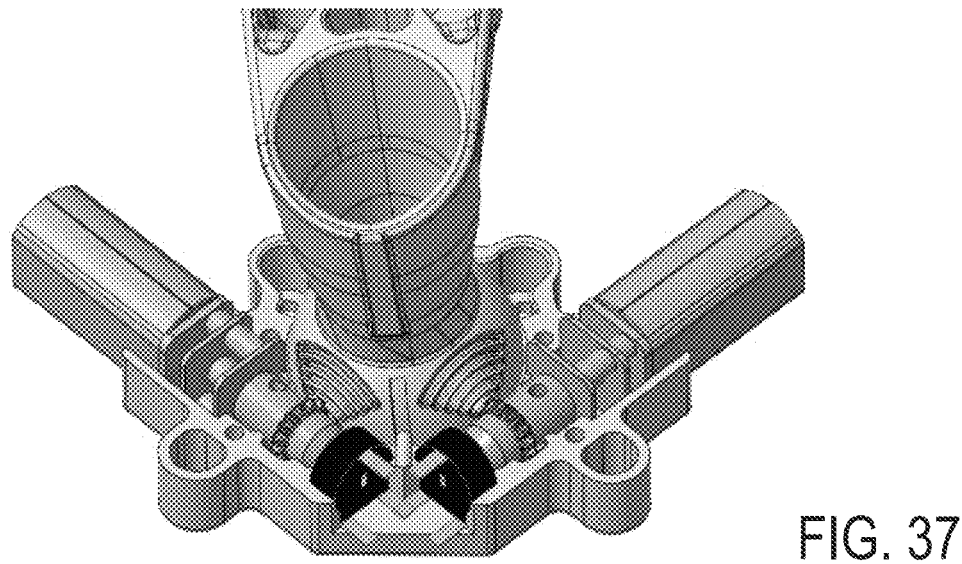
Figure 38:
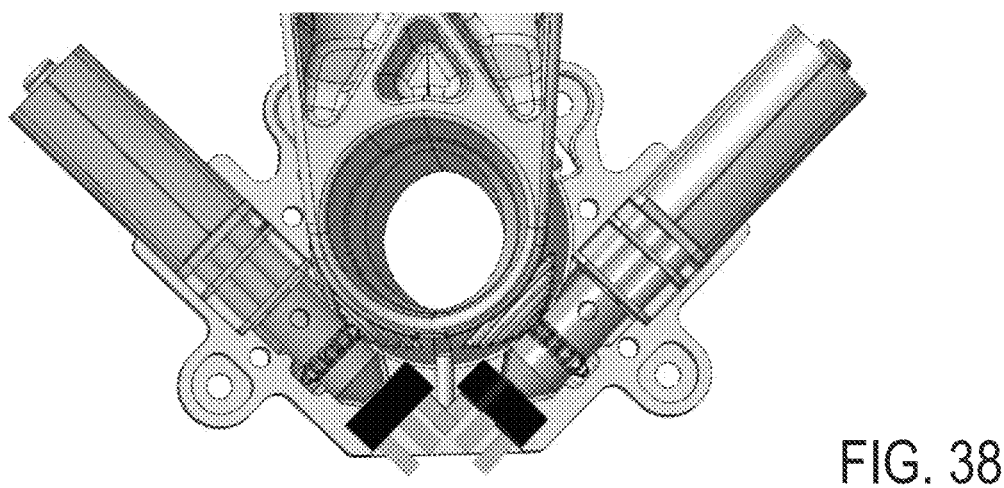
Figure 39:
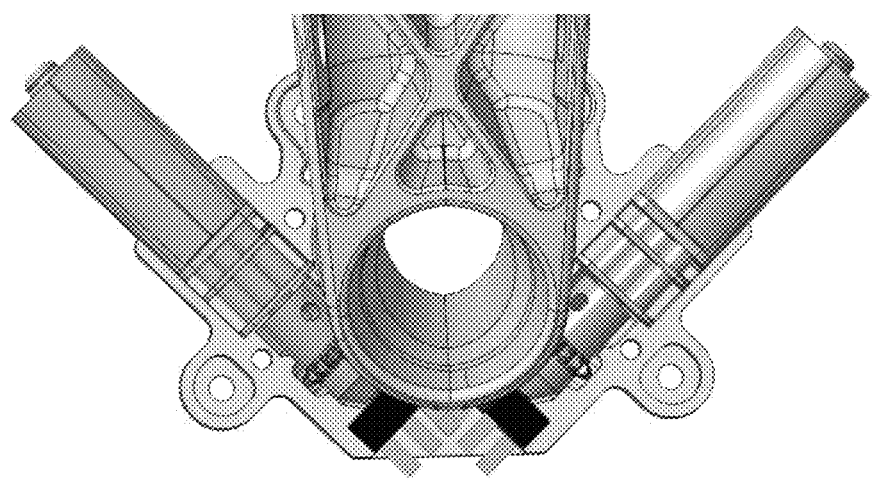
Figure 40:
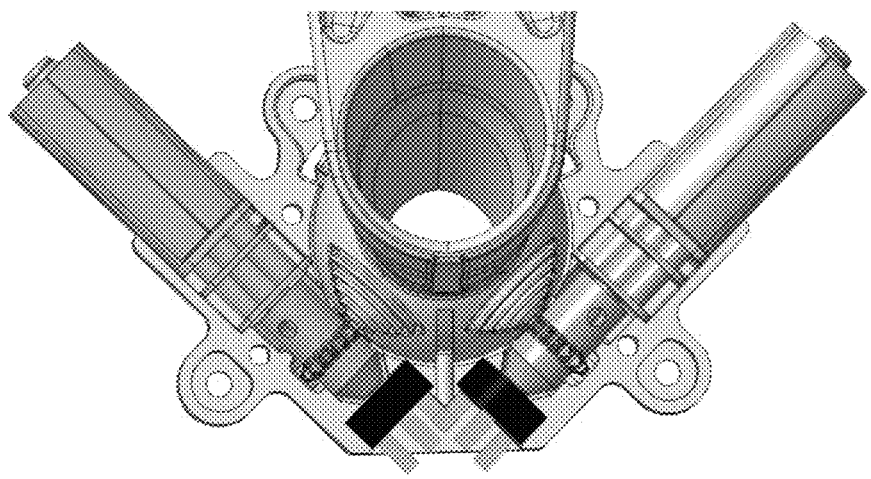
Figure 41:
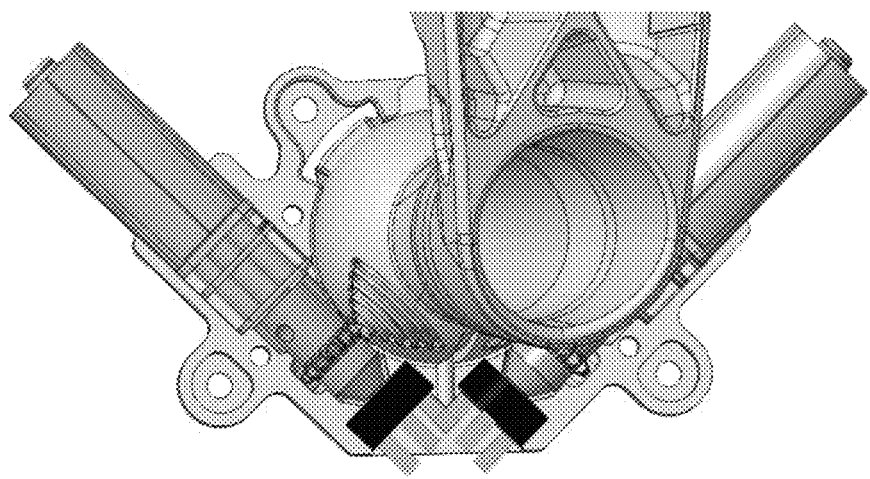
FIG. 41 is another perspective view of the actuator, shown with a housing and attachment portion disposed thereat.
Figure 42:
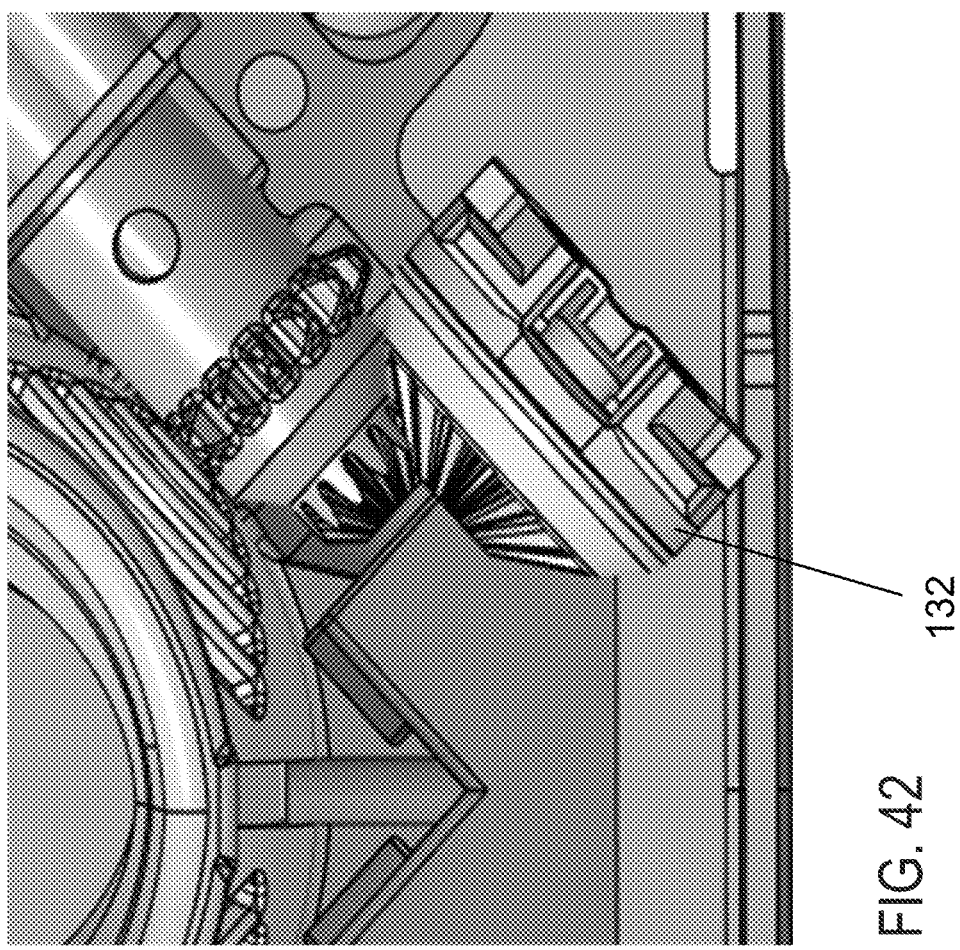
FIG. 42 is a perspective view of an actuator, shown with an optional position detecting mechanism.
Figure 43:
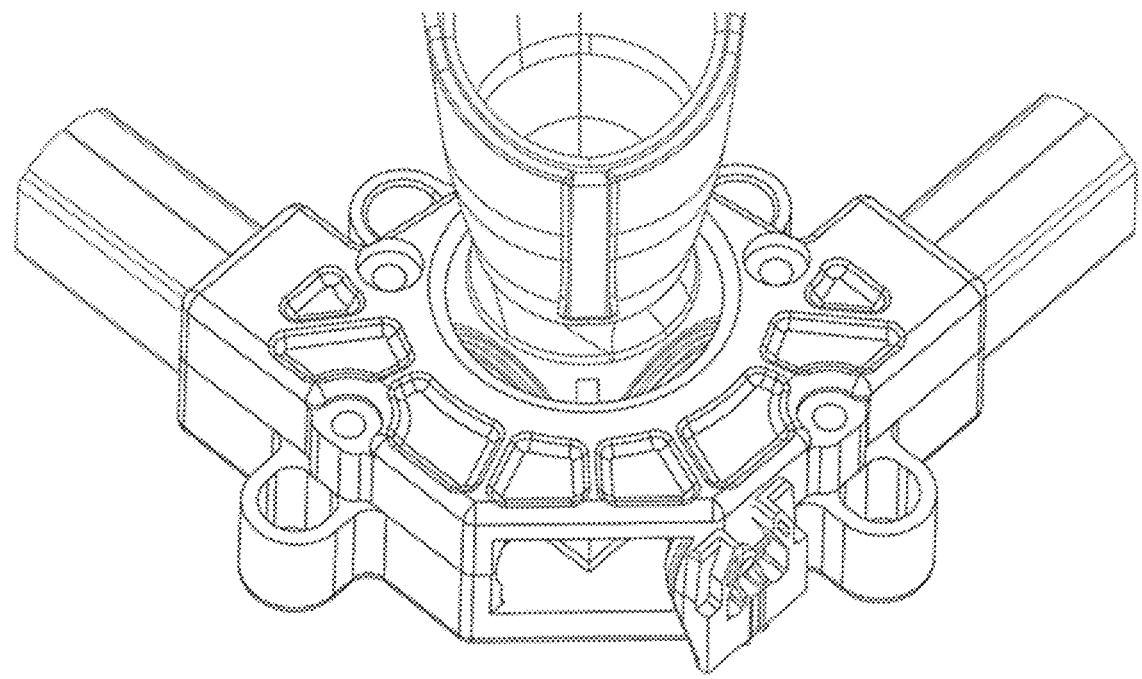
FIG. 43 is a perspective view of another actuator of the present invention, shown with a memory feature.
Figure 44:
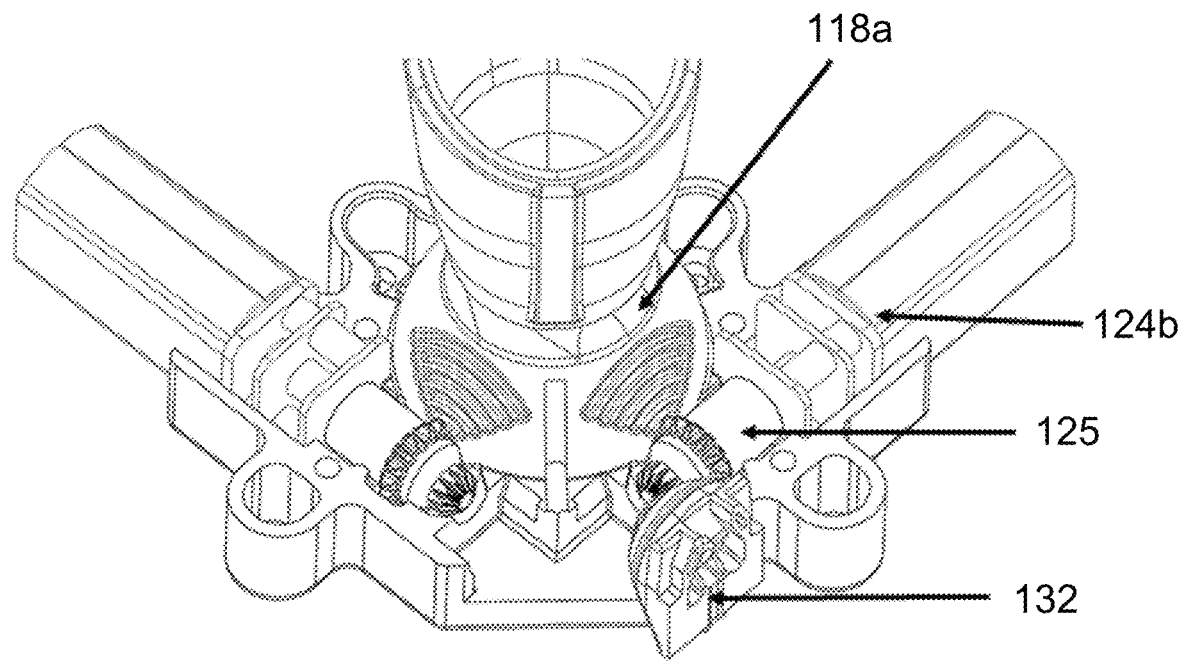
FIG. 44 is another perspective of the actuator of FIG. 43, with the upper housing portion removed.
Figure 49:
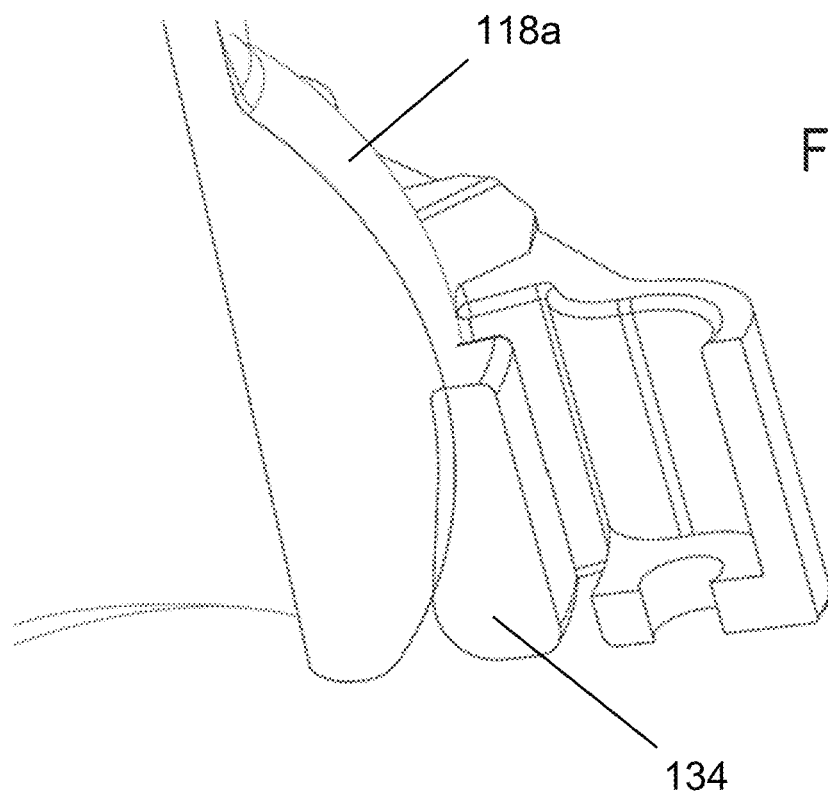
FIG. 49 is a perspective view of stabilizing fingers or elements of the actuator.

The actuator may also include a torque increasing element or stability enhancer. For example, and such as can be seen in FIGS. 33 and 49, the lower housing may include pedals or fingers 134 that have an interference fit with the ball. This creates an increased friction force on the ball and helps with actuator stability in its static state.

The gears 125 are attached to rotary potentiometers that can accurately measure the position of the mirror head relative to the stay given the direct connection between the gears and the ball member. The position can be memorized after a manual (or actuator) adjustment, and return to that position a later time. Thus, a user or driver can set the orientation of the mirror head to provide a desired rearward field of view for the mirror function and may save that position or orientation. The actuator may automatically pivot a selected or preset amount to pivot from the saved mirror function or mirror mode orientation to a display mode orientation (where the mirror head is pivoted downward and more toward the driver's head region to provide more direct viewing of the display of the mirror), such as when the display is actuated to display video images. Optionally, the driver may store the mirror mode orientation in memory and may set the mirror head to the display mode orientation and may store that orientation in memory as well, whereby the actuator may pivot to either of the stored orientations responsive to a respective user input or triggering event or the like.

The gear geometry of the actuator provides increased connection between the gears and the ball member of the stay, which also provides improved stability and precision and decreased free play. The slot or groove geometry in the ball member more accurately follows correct travel. The actuator provides improved housings and added fingers to decrease free play and increase ball torque. The actuator may comprise two anti-rotation fingers or tabs with about 0.5 mm interference with the groove or channel in the ball member. The actuator may comprise CNC parts to allow for manual adjustment, such that the mirror head can be adjusted by hand and its driver-selected position stored in memory.

The actuator 120 thus provides a smaller overall package size, and offers a memory function and manual adjustment. The actuator also functions to move the mirror head relative to the ball instead of adjusting the mirror head relative to the socket. The actuator may provide improved vibration performance, and the pivot distance from the ball to the reflective element does not change when the mirror head is adjusted. The actuator provides a lower profile actuator, which in turn allows for better aesthetics housing, since the housing does not need to accommodate a changing pivot distance.

The memory function may comprise any suitable device that stores the gear position of both gears 125a, 125b when a particular mirror head adjustment is made. For example, the memory function may comprise a rotary wiper or a potentiometer and a gear element that rotates with each gear 125a, 125b and stores the degree of rotation for the desired or set position. Optionally, for example, the memory feature may comprise a geared memory pod 132 that engages the end of one of the ball interface gears (see FIGS. 42-44, 47 and 51). Although shown as having one memory pod at one of the ball interface gears, the actuator would include a memory pod at the end of each of the ball interface gears, whereby the two memory pods would determine and save the various set positions of the actuator. The geared memory pod (rotary potentiometer) thus can be directly connected to the ball interface gear. Having a direct connection between the memory and the gear that drives the ball prevents the possibility of the memory getting out of sync with the rest of the actuator. This also removes some play or looseness from the system and leads to more accurate positioning. A direct drive actuation also removes the need for a clutch mechanism. This also reduces overall actuator noise. Although shown as having one memory pod at one of the ball interface gears, the actuator would include a memory pod at the end of each of the ball interface gears, whereby the two memory pods would determine and save the various set positions of the actuator. The gear elements may comprise plastic elements or metallic elements (such as aluminum or steel or the like), and a dry lubricant may be applied at the gears to reduce wear and noise during operation of the actuator.

The actuator may include a worm drive with a clutch that allows for manual adjustment of the mirror head, such as via manual efforts of around 1 Nm or thereabouts (or maybe more). The ball member may comprise any suitable ball member size, such as about 30 mm diameter (or more or less depending on the particular application and mirror head weight).

Thus, the actuator comprises a compact or low profile actuator that is a modular design that allows for use in various mirror styles. The actuator positions the mirror head via electrical or manual adjustment, and includes memory that is directly connected to movement mechanism (to avoid getting lost or unsynchronized). The mirror can be adjusted manually and the position can be stored using the memory. Once stored, the position can be returned to when desired through button press or other means. The direct drive memory provides a more accurate memory storage and setting. Also, the actuator does not include clutching (so there is no ratcheting noise, and more accurate positioning). The actuator uses a gear train connected directly to the motor(s) in order to reduce package size.

Figure 50:
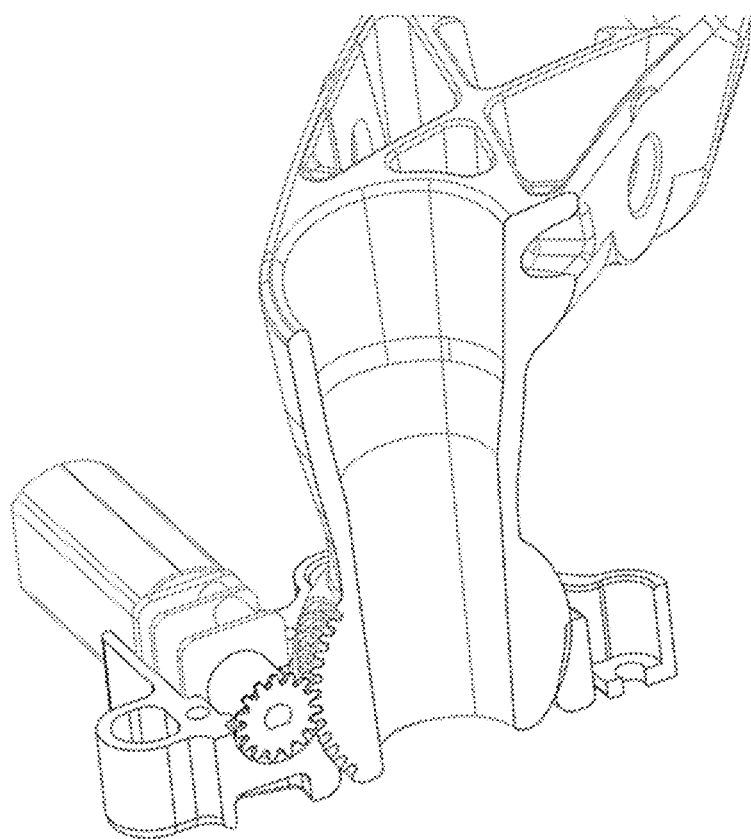
FIG. 50 is a perspective partial sectional view of the actuator.
Figure 51:
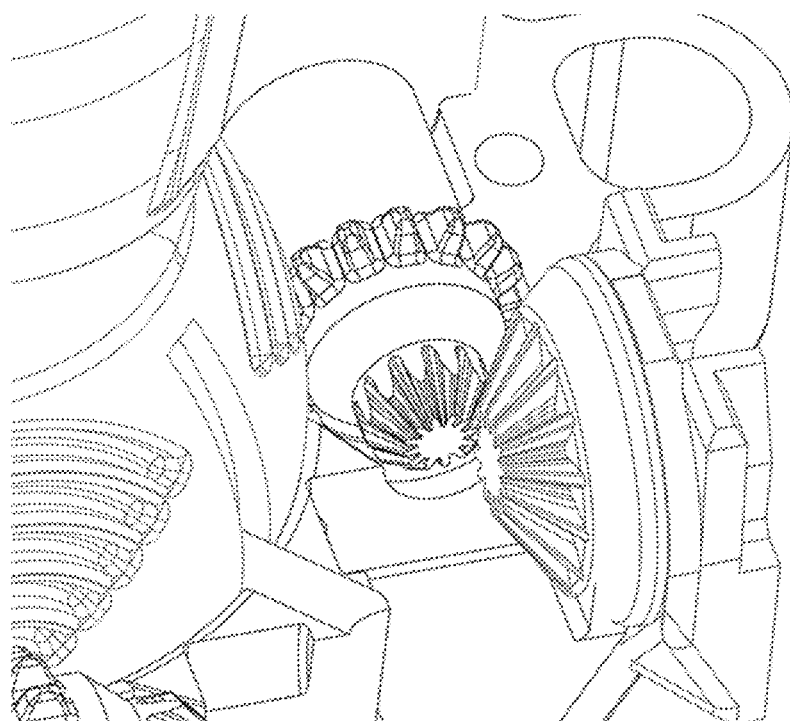
FIG. 51 is a perspective view of the actuator showing the geared memory pod.
Figure 52:
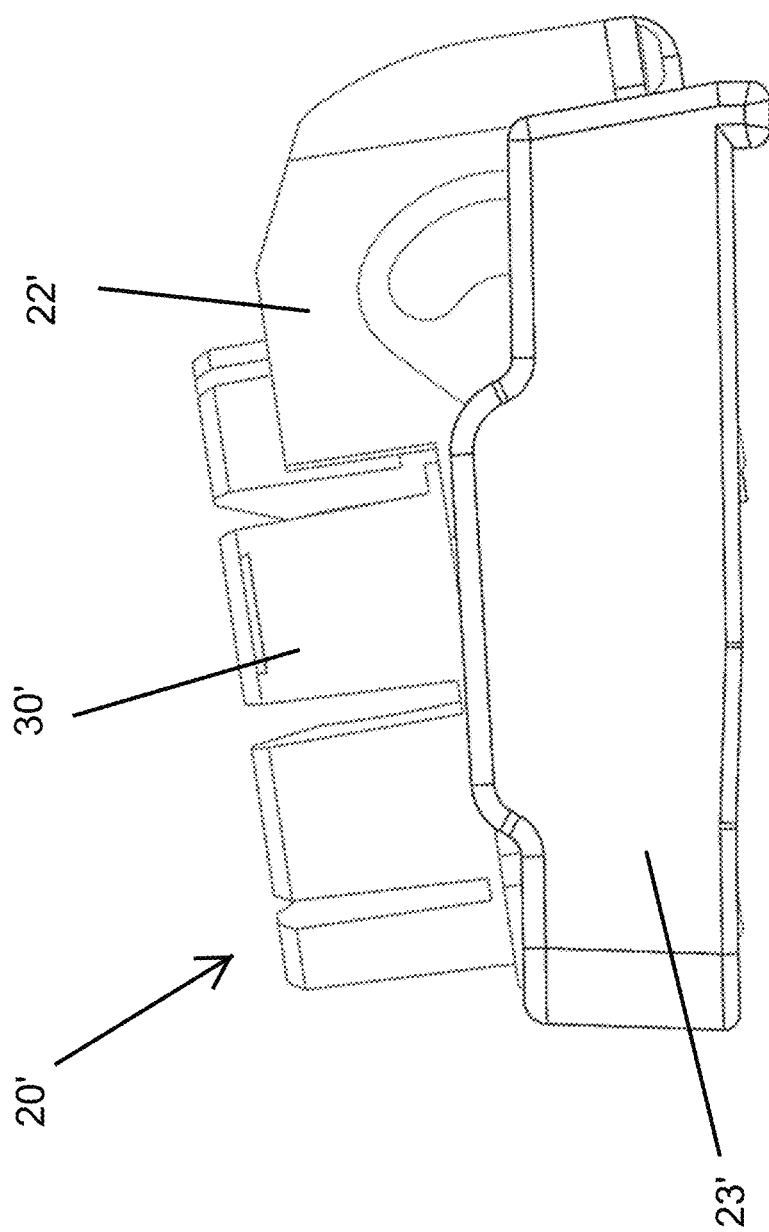
FIG. 52 is a side elevation of another actuator of the mirror assembly of the present invention, with the actuator operable to toggle or vertically adjust the rearward field of view of the mirror reflective element.
Figure 54:
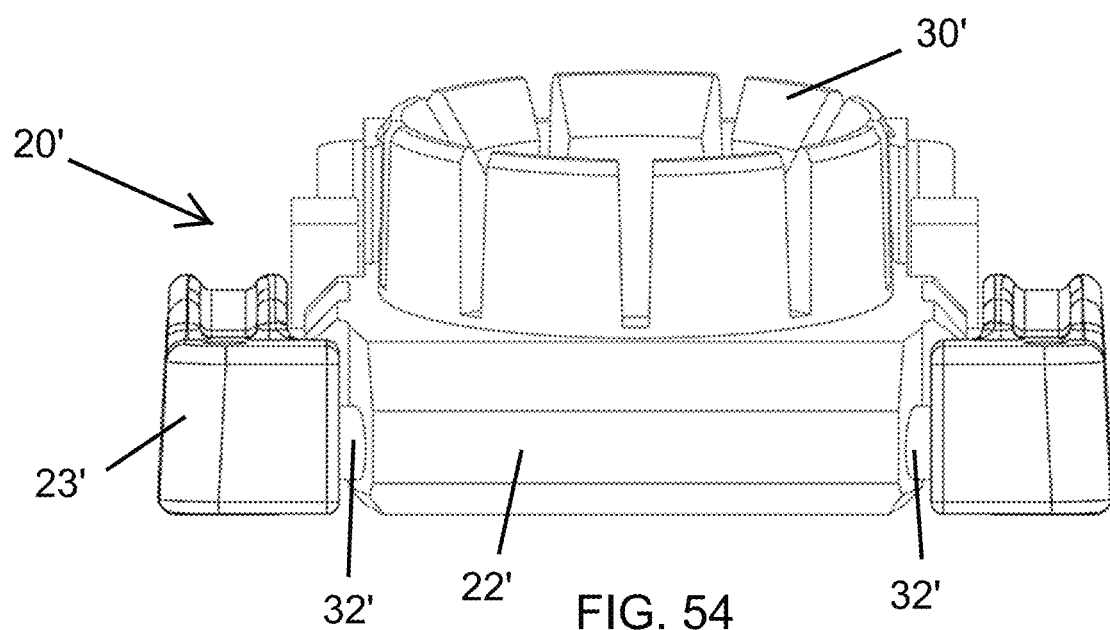
FIG. 54 is an end elevation of the actuator of FIG. 52.
Figure 53:
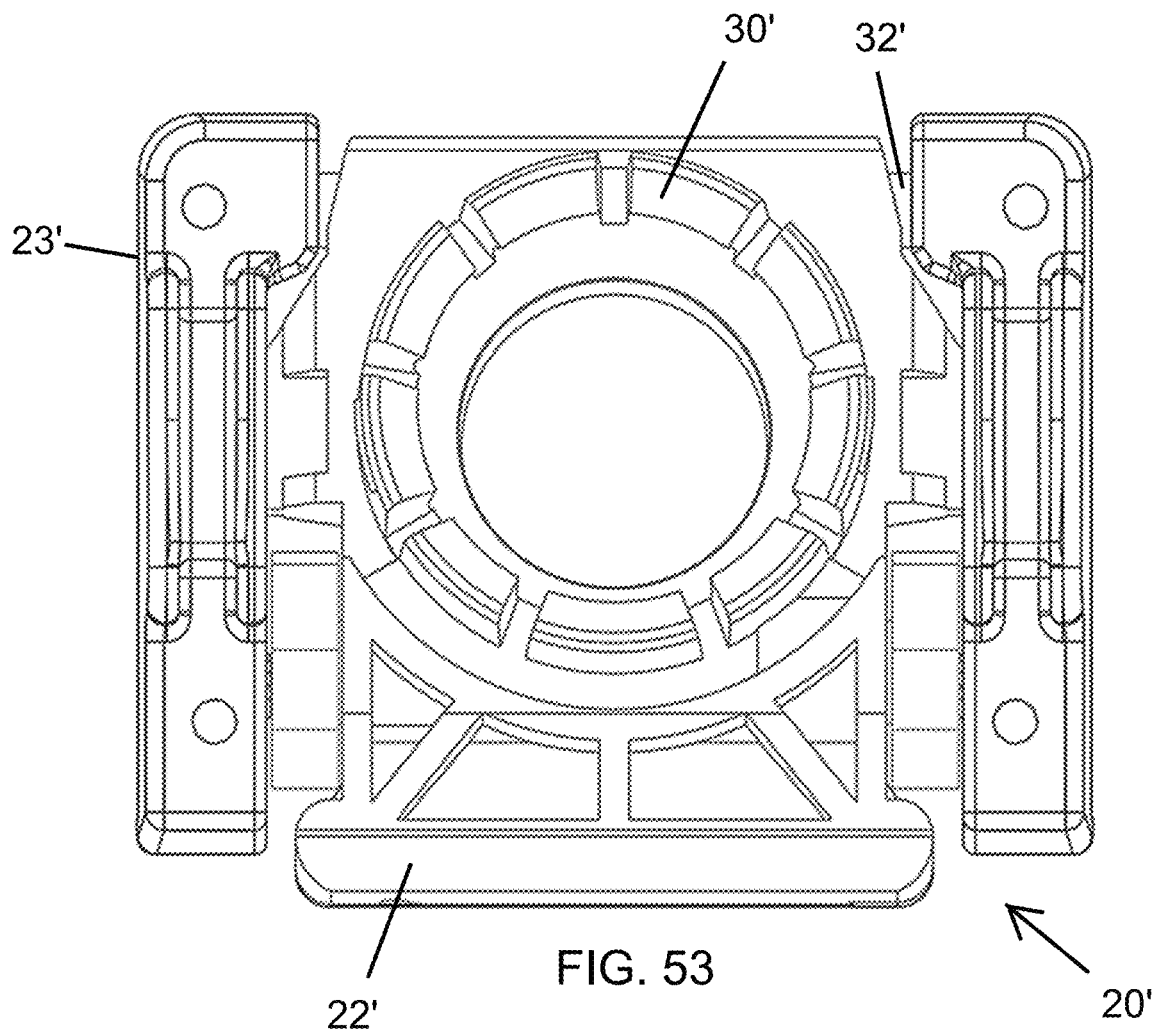
FIG. 53 is a plan view of the actuator of FIG. 52.

Optionally, and such as shown in FIG. 50, the actuator is designed to allow the mirror wiring to pass through the stay to the vehicle (for connection with a vehicle wire harness). This aids in wire protection and offers a more visually appealing mirror. This also prevents the wiring from getting into the actuator gearing.

In the illustrated embodiments, the motors are oriented approximately 45 degrees from the up/down and in/out axes of rotation, with both motors driven to provide a straight up/down or in/out movement. The actuator comprises a manual adjustment means or mechanism that allows a user to manually adjust the mirror head. The manual adjustment mechanism may comprise a clutch mechanism or back driving of the gears and motors when the mirror head is manually adjusted.

The display device is operable to display video images (such as derived from image data captured by one or more cameras of the vehicle, such as one or more cameras having rearward and/or sideward exterior fields of view and/or one or more cameras having interior fields of view in the cabin of the vehicle) when the mirror head is in its display mode orientation. The display device or module may utilize aspects of the modules described in International Publication No. WO 2016/178190 and/or U.S. Publication No. US-2014-0285666, which are all hereby incorporated herein by reference in their entireties.

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 7,224,324; 7,253,723; 7,255,451 and/or 8,154,418, and/or International Publication Nos. WO 2012/051500; WO 2010/124064; WO 2011/044312; WO 2013/071070 and/or WO 2013/126719, which are hereby incorporated herein by reference in their entireties.

Figure 57:
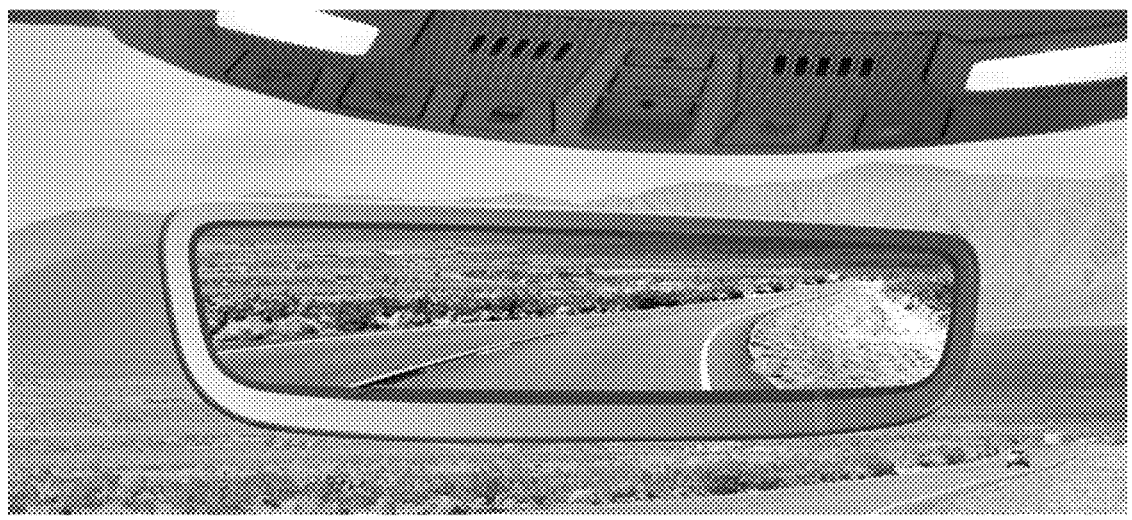
FIGS. 57-59 are views of mirror assemblies with full screen video displays and with optional user inputs.
Figure 58:
Figure 59:

Optionally, for example, an interior rearview mirror assembly with a full screen display may not include any user inputs or buttons or sensors, such as shown in FIG. 57. Optionally, the interior mirror and display assembly may include touch sensors or buttons (such as capacitive touch sensors or buttons) disposed along a lower portion of the mirror bezel, such as shown in FIG. 58, or along a widened lower portion of the bezel (such as shown in FIG. 59). Optionally, a single touch sensor or button or user input may be provided at the mirror, and may be customized for the particular vehicle or application or the like, such as shown in FIGS. 72-76.

Figure 60:
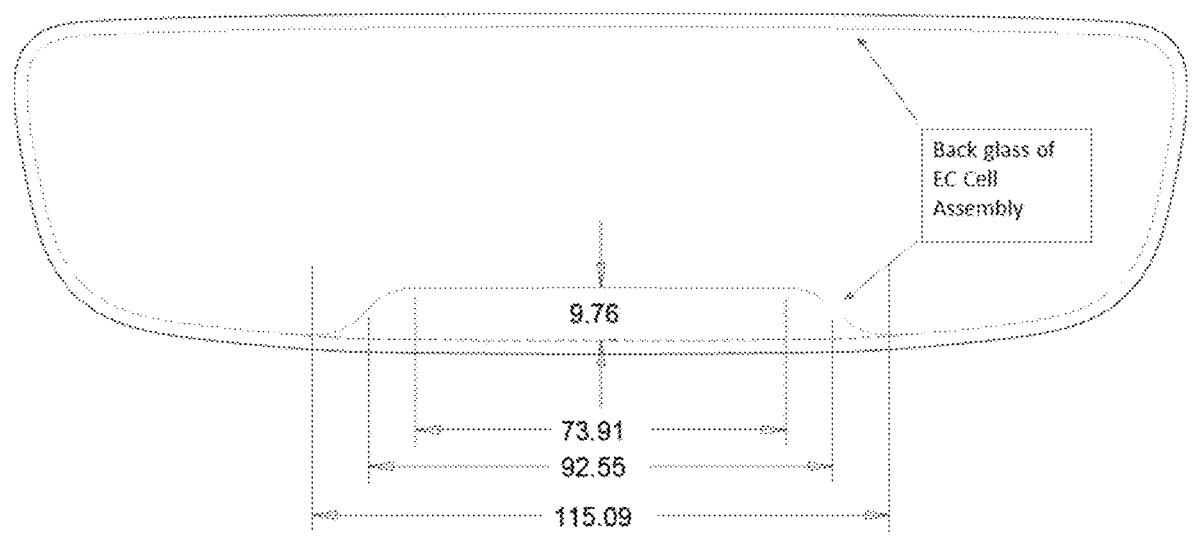
FIG. 60 is a plan view showing optional dimensions for the location of a touch sensor of the mirror assembly.

Optionally, and desirably, the touch sensor is disposed behind the mirror reflective element and with 10 mm above the lower perimeter edge of the rear substrate (such as shown in FIG. 60). The touch sensor may be disposed in such a 10 mm band and kept from the plastic housing and disposed inboard of (or above) the radiused perimeter edge (such as a rounded or curved or radiused edge having about a 2.8 mm radius or 2.5 mm radius or thereabouts).

Optionally, the touch sensor may comprise an HSS™ touch recognition sensor, such as available from AlSentis® of Holland, Mich. The touch sensor may be packaged in front of a stainless steel chassis (see FIG. 68). The mirror may utilize an FPC board (flexible printed circuit board) for the touch sensor assembly. Optionally, the touch ASIC may be populated on the touch sensor assembly. Optionally, an I2C communication to the main PCB may communicate touch, communicate glare information (from a glare sensor) and may communicate the touch sensor assembly status. The touch sensor assembly may include back light touch buttons with edge lit LEDs. The "touch" confirmation may be displayed in the TFT display above the sensor or button.

Optionally, a less sensitive or reduced sensitivity analog glare sensor may be used on the touch sensor assembly. Such a glare sensor may function sufficiently if the applique in front of the sensor is ablated. The system may use the same analog sensor for ambient light sensing.

Figure 61:
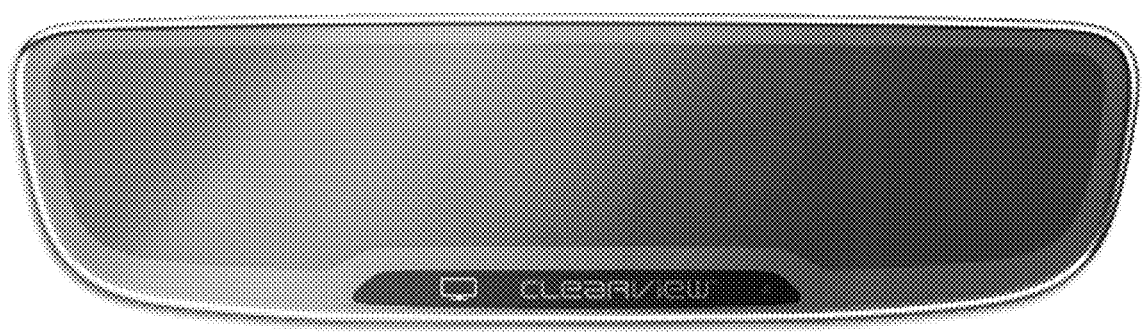
FIGS. 61 and 62 are plan views showing the mirror in its mirror mode (FIG. 61) and in its display mode (FIG. 62)
Figure 62:

As shown in FIGS. 61 and 62, the mirror may function in a mirror mode (FIG. 61), where the display is deactivated and the driver views rearward via reflection at the mirror reflector of the reflective element, or the mirror may function in a display mode (FIG. 62), where the display is activated and the driver views the displayed images at the mirror reflective element. The changes between mirror mode and display mode may be responsive to a user input, and the mirror head may automatically pivot (via an actuator of the mirror assembly) to the appropriate orientation for the selected mode, such as described above. The images displayed may be derived from image data captured by a rearward viewing camera of the vehicle, such as a rear backup camera, and may provide the field of view similar to what is provided by the mirror reflector when the mirror is in its mirror mode (such as by utilizing aspects of the systems described in International Publication No. WO 2017/191558, which is hereby incorporated herein by reference in its entirety).

Figure 63:
FIG. 63 is a perspective view of another mirror assembly with user inputs.
Figure 64:
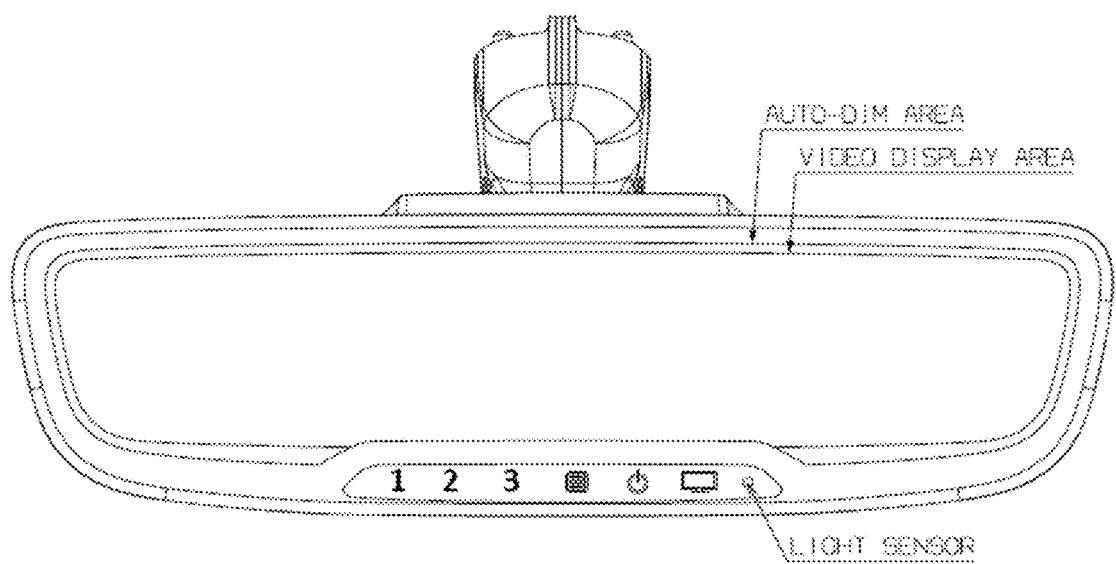
FIG. 64 is a plan view of another mirror assembly with user inputs similar to that of FIG. 63.

Optionally, the user inputs may comprise reconfigurable user inputs or touch sensors that provide different features for the mirror, depending on the particular application of the mirror assembly. For example, and such as shown in FIGS. 63 and 64, a mirror assembly may provide a garage door opening function (with three buttons or inputs or sensors for controlling garage door openers, a menu or information button or input or sensor, a power button or input or sensor (such as for turning on or off the EC function of the mirror or a light or the like of the mirror), and a video display on/off button or input or sensor (for manually switching between the mirror mode and display mode). As shown in FIG. 64, the mirror and sensor system may include a glare light sensor for sensing glare light from rearward of the vehicle.

Figure 65:
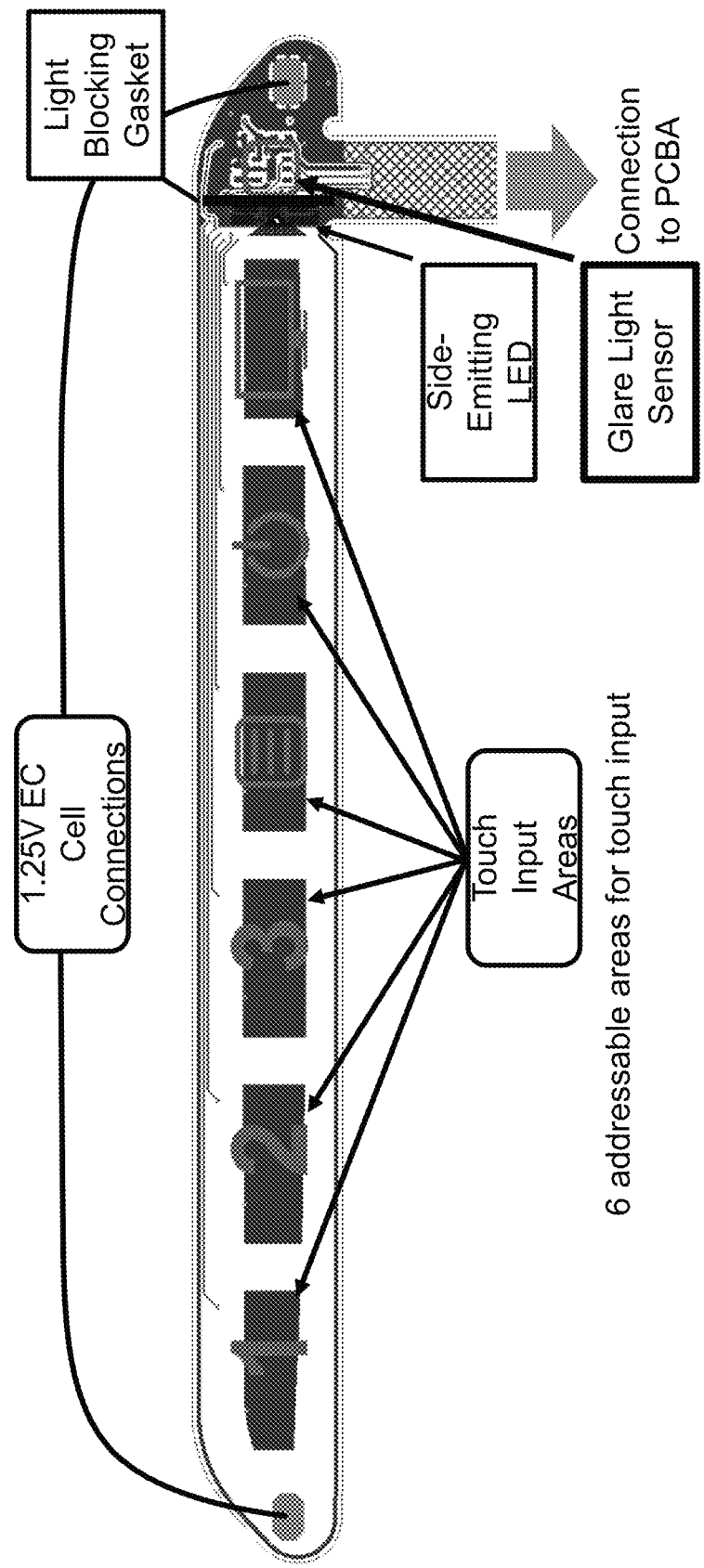
FIGS. 65-67 are plan views of reconfigurable user input touch sensors suitable for use in the mirror assemblies of the present invention.
Figure 66:
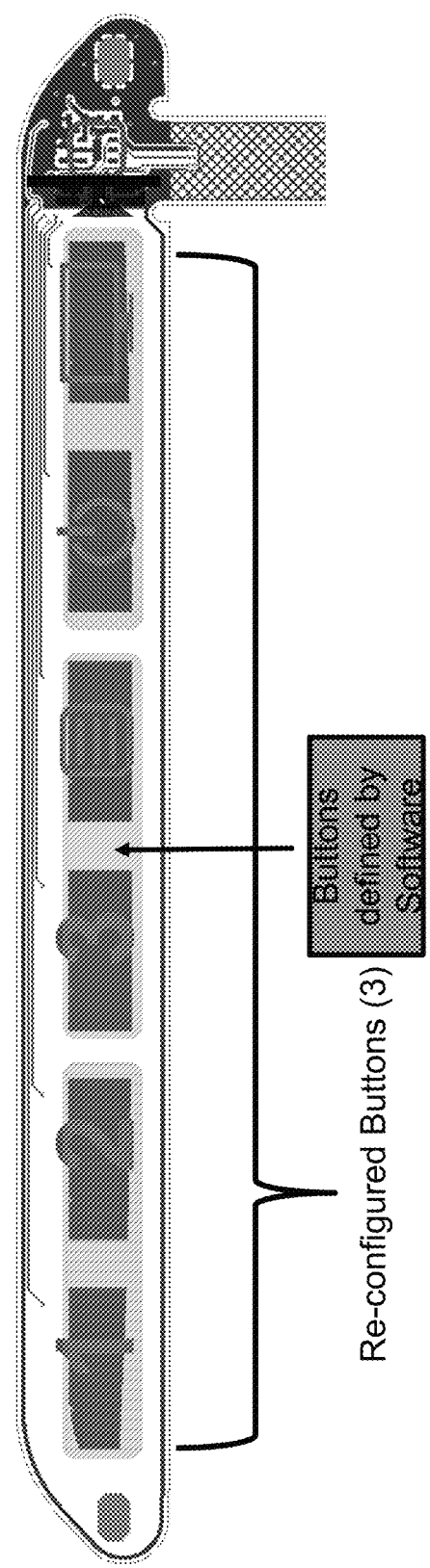
Figure 67:
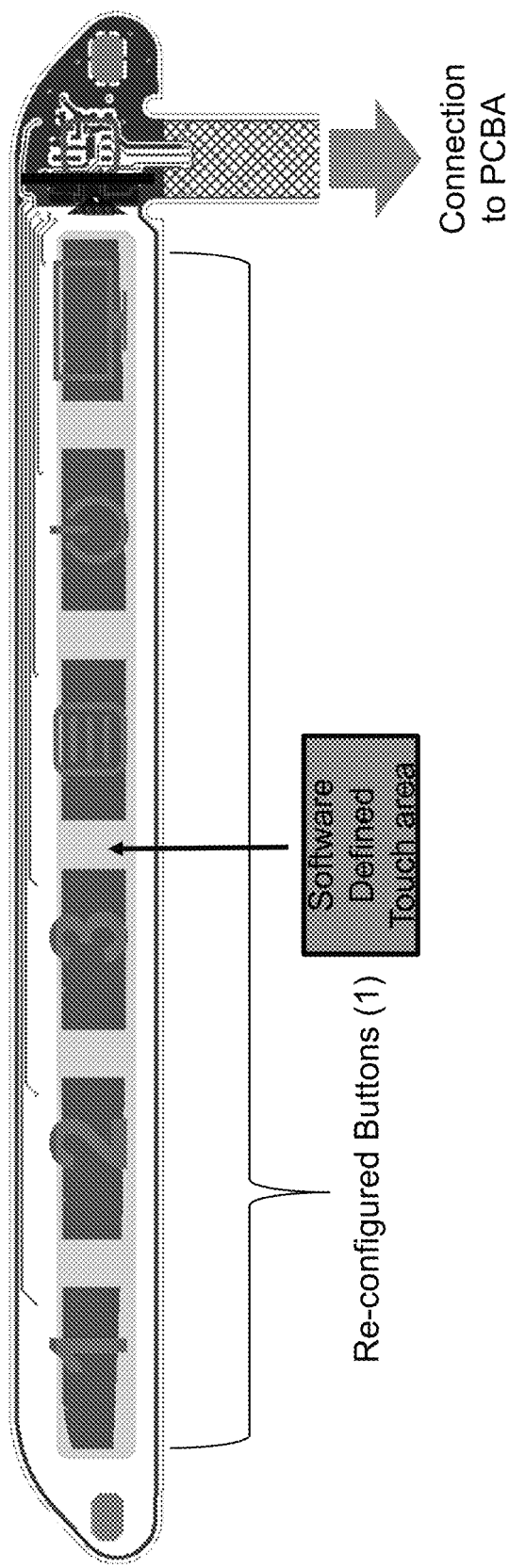

As shown in FIG. 65, the sensor input may comprise a strip with circuitry established thereat to provide multiple touch input areas, each individually accessed by circuitry of the system. The strip may include the glare light sensor for the mirror and a side light emitting LED to backlight or illuminate the icons or indicia or text at the touch input areas. The strip or assembly may also include circuitry for driving the dimming of the electrochromic mirror cell, such as responsive to the glare light sensor and an ambient light sensor, with the EC cell connections shown at opposite ends of the strip or assembly. Optionally, and as can be seen in FIG. 66, the inputs are reconfigurable to provide different inputs or buttons. For example, and such as shown in FIG. 66, inputs 1 and 2 are actuated together, while input 3 and the menu input are actuated together and the two power inputs are actuated together. This allows the system to provide larger input or touch areas for particular inputs, with the appropriate applique or reconfigurable display element at the touch inputs providing the appropriate information or icons for viewing by the user so the user knows what the various buttons control. The reconfigurable button design can change during manufacturing assembly, or in the vehicle. The system may have less buttons in certain modes. Also, by using software to make changes, there is more flexibility to supply to different OEMs. Optionally, and such as shown in FIG. 67, a larger area may be provided for a single touch area, which can be made more sensitive and helps the driver more easily find and activate or deactivate the display feature.

Thus, the FPC includes circuitry that provides a combined touch sensor assembly and an EC drive voltage provider, and backlighting feature (backlighting the inputs) and a glare light sensor for the EC drive circuitry. These are all provided in a single strip or element or assembly. As can be seen with reference to FIGS. 65, 66 and 67, the multiple pads of the user inputs are individually addressable and are reconfigurable such that each pad may represent a particular input or two or more pads may provide a common particular input (for example, the FPC of FIG. 65 is programmed so each input pad is individually addressed so as to provide six different functions, while the FPC of FIG. 66 is programed so each adjacent pair of input pads are addressed together so as to provide three different functions, and the FPC of FIG. 67 is programmed so all of the input pads are addressed together as a single user input). The input reconfiguration is done via software, which reprograms how the inputs are accessed so that two or more of the inputs could operate together. The FPC is shown in FIGS. 65-67 without the overlay or applique. The shown FPC may comprise a universal input element or assembly for a variety of vehicle applications, and then the software may be adjusted to provide the desired outputs of the sensors for a particular vehicle application (and the universal FPC assembly may be programmed for the desired application and may be married with an appropriate or selected applique).

Figure 68:
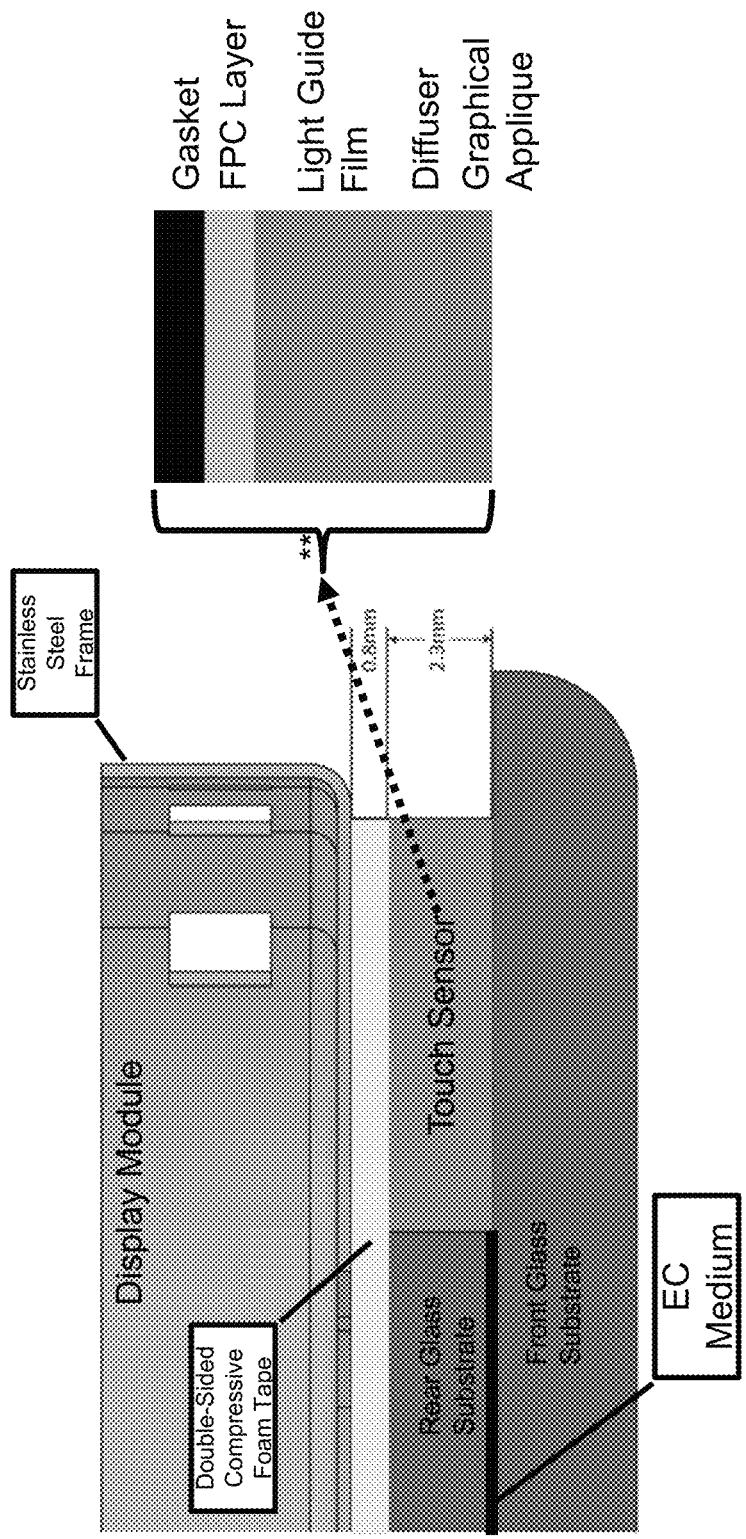
FIG. 68 is a partial sectional view of a portion of a mirror reflective element and chassis and touch sensor of the mirror assembly, shown with an applique disposed at the touch sensor.

As shown in FIG. 68, the touch sensors may be disposed at an overhang region where the front glass substrate extends beyond the rear glass substrate. The touch sensor strip comprises a gasket, a flexible printed circuit (FPC) layer (with circuitry established thereat), a light guide film, a diffuser and a graphical applique. The graphical applique is selected to indicate the selected touch features provided by the touch sensors (as may be programmed via software for the particular application). Optionally, optically clear adhesive may be used to laminate one or more layers together. The graphical applique may have partial adhesive applied to adhere and seal against the rear surface of the front glass substrate.

Figure 69:
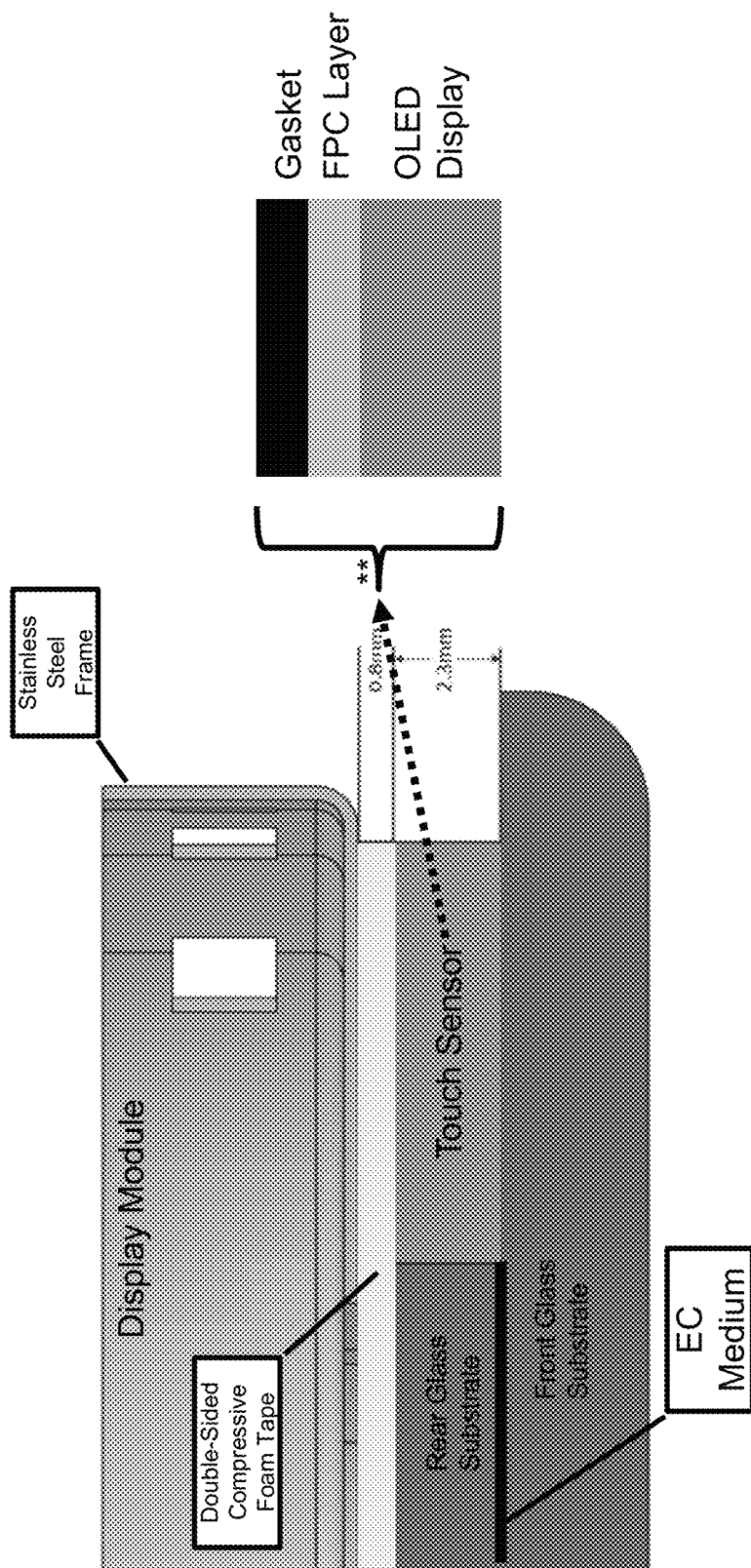
FIG. 69 is a partial sectional view of a portion of a mirror reflective element and chassis and touch sensor of the mirror assembly, shown with an OLED display at the touch sensor.
Figure 71:
FIGS. 71-76 are views of various mirror assemblies of the present invention, with selected appliques for the particular application of the respective mirror assembly.
Figure 72:
Figure 73:
Figure 74:
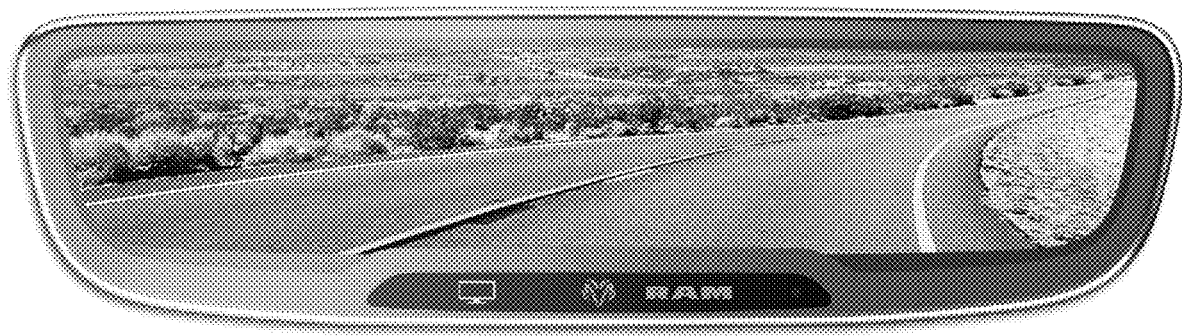
Figure 75:
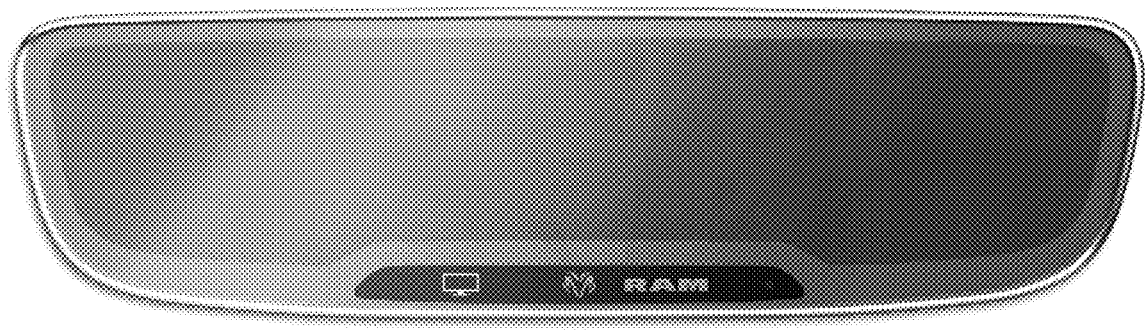
Figure 76:

Optionally, and as shown in FIG. 69, the touch sensor may have an OLED display disposed in front of the FPC layer (replacing the light guide film, diffuser and graphical applique of FIG. 68). The OLED (organic light emitting diode) display comprises a pixelated reconfigurable display, such that the touch interface is an active changeable display, and can be programmed or modified to display the appropriate or selected icons at the touch region, depending on the particular application and function of the FPC layer and touch sensors. With such a configuration, the user inputs may be adjusted to provide various functions, such as responsive to actuation of a particular one of the inputs, whereby the OLED changes its displayed information or icons to correspond to the then current function of the user inputs. For example, the input assembly may initially have all of the inputs accessible together to provide a single input for actuating the video display. Once the video display is activated, the inputs may provide different functions, such as for dimming the display or zooming in or out or the like, whereby the OLED display changes to display different icons at the user input assembly.

As discussed above, the mirror may use selected ones of a variety of graphical overlays to provide the desired appearance for the mirror assembly. The touch sensor construction allows for easily changing the graphical applique layer. The reconfigurable buttons will maintain optimization for manufacturing and user interface to the touch buttons. As shown in FIGS. 70-76, different appliques may display or show different vehicle manufacturers or different vehicle styles or product lines, and optionally, various custom appliques may be offered for customizing or personalizing the appearance of the mirror assembly. The icons or words or brand/model information shown at the applique may be colored or printed to provide the desired appearance when backlit or when illuminated via ambient light.

Figure 77:
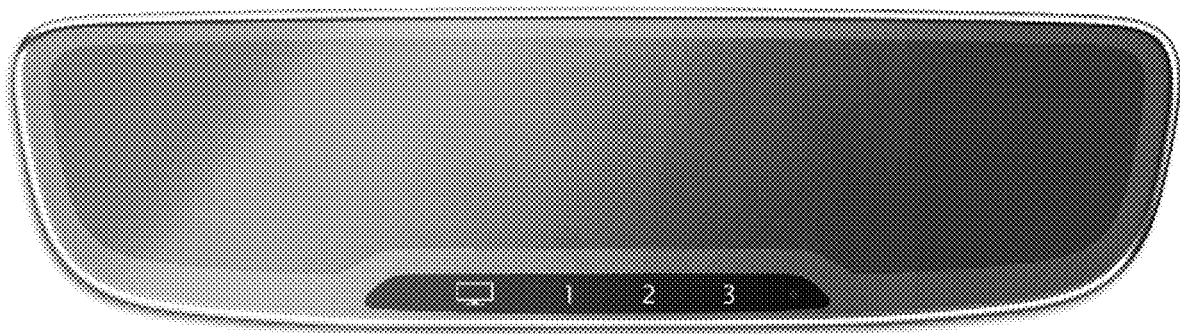
FIGS. 77 and 78 are plan views of another mirror assembly, showing display options to assist the user in using the user inputs or touch sensors of the mirror assembly.
Figure 78:
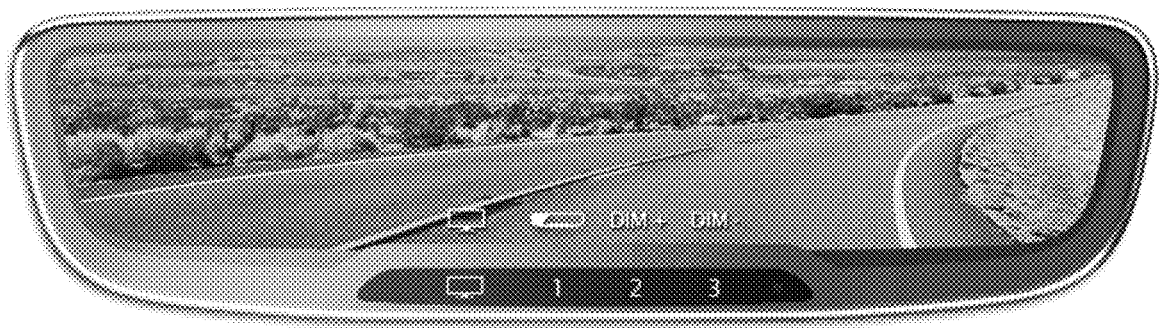

Optionally, the display screen may operate to show additional information or menu options, such as above respective buttons or icons of the touch input area. For example, and such as can be seen with reference to FIGS. 77 and 78, the LCD video display is activated (FIG. 78) to show menu options, so as to provide the user with cognitive awareness of what the inputs control or adjust. Thus, a user may touch the on/off input for turning on the display, and then, with the "DIM+" and "DIM−" displayed above inputs 2 and 3, the user can dim the displayed images by pressing or touching input 3 one or more times to achieve the desired brightness of the displayed images. The display backlight may be turned on near the menu area instead of the entire area. The display may be used for instructions about the user inputs or about other vehicle systems or features. Optionally, actuation of one of the user inputs may cause the user inputs to be changed (via software) to provide different functions or features.

Figure 79:
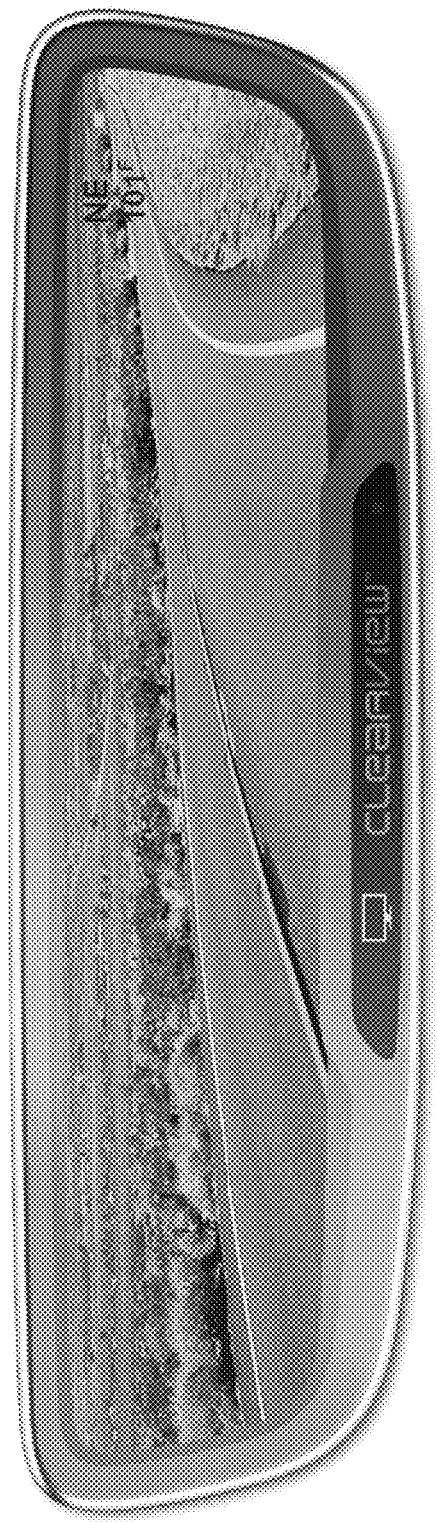
FIG. 79 is a plan view of another mirror assembly, showing a compass display provided by the display screen of the mirror assembly.

Optionally, and such as shown in FIG. 79, the video display may also operate to display compass information or temperature information or the like (and that information may be displayed when the mirror is in the mirror mode or the camera mode). For example, optional vehicle Information that may be displayed by the mirror display includes compass information, temperature information, tire pressure information, caution messages (such as low oil, low fuel, and/or the like), infotainment messages and/or traffic sign detection information and/or the like. Optionally, the information display can change color based on video content or it can be opaque or partially transparent, or the displayed information can change size based on user preferences or can be located specifically for right-hand drive vehicles or left-hand drive vehicles.

Figure 80:
FIG. 80 is a perspective view of a mirror head with a full mirror display and user inputs in accordance with an aspect of the present invention.
Figure 81:
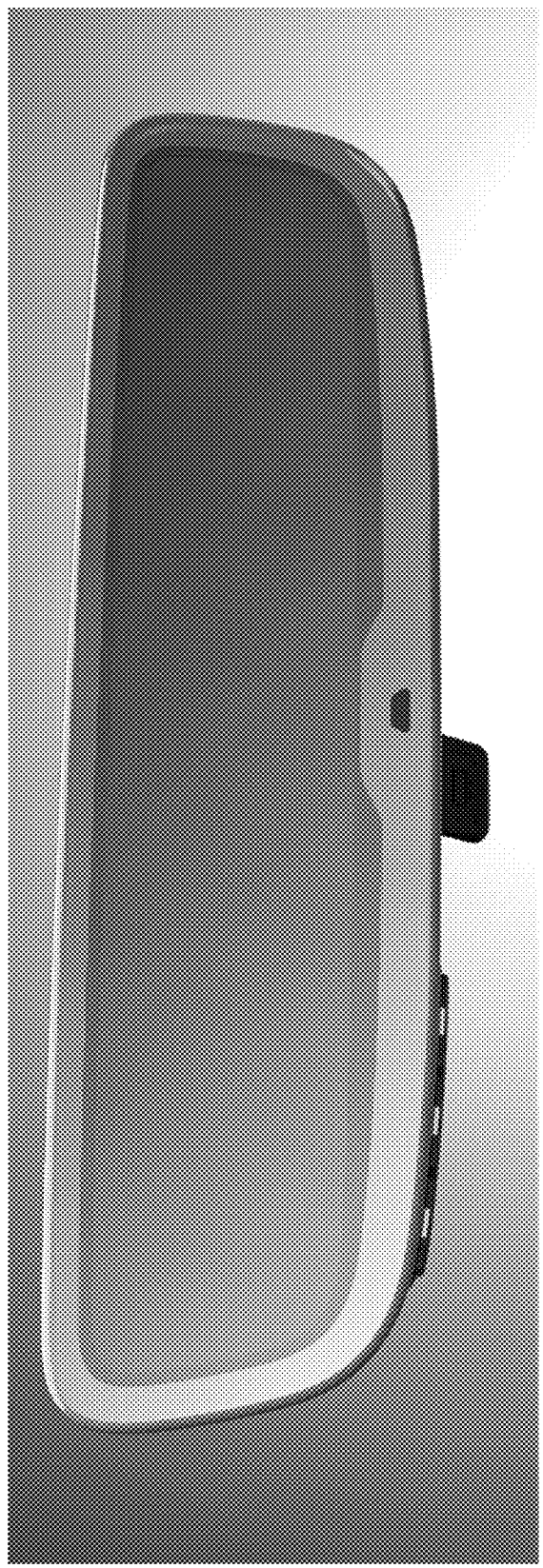
FIGS. 81-84 are views of another mirror head with a full mirror display and user inputs.
Figure 82:
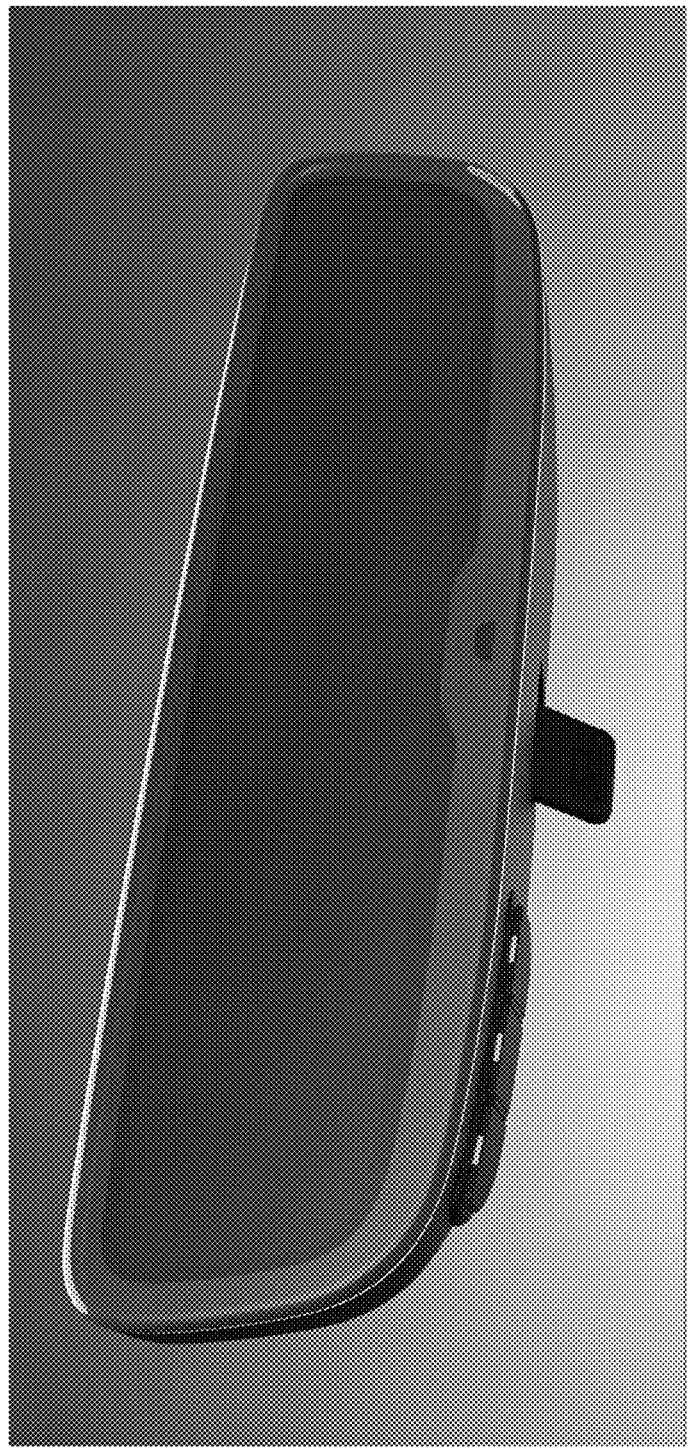
Figure 83:
Figure 84:
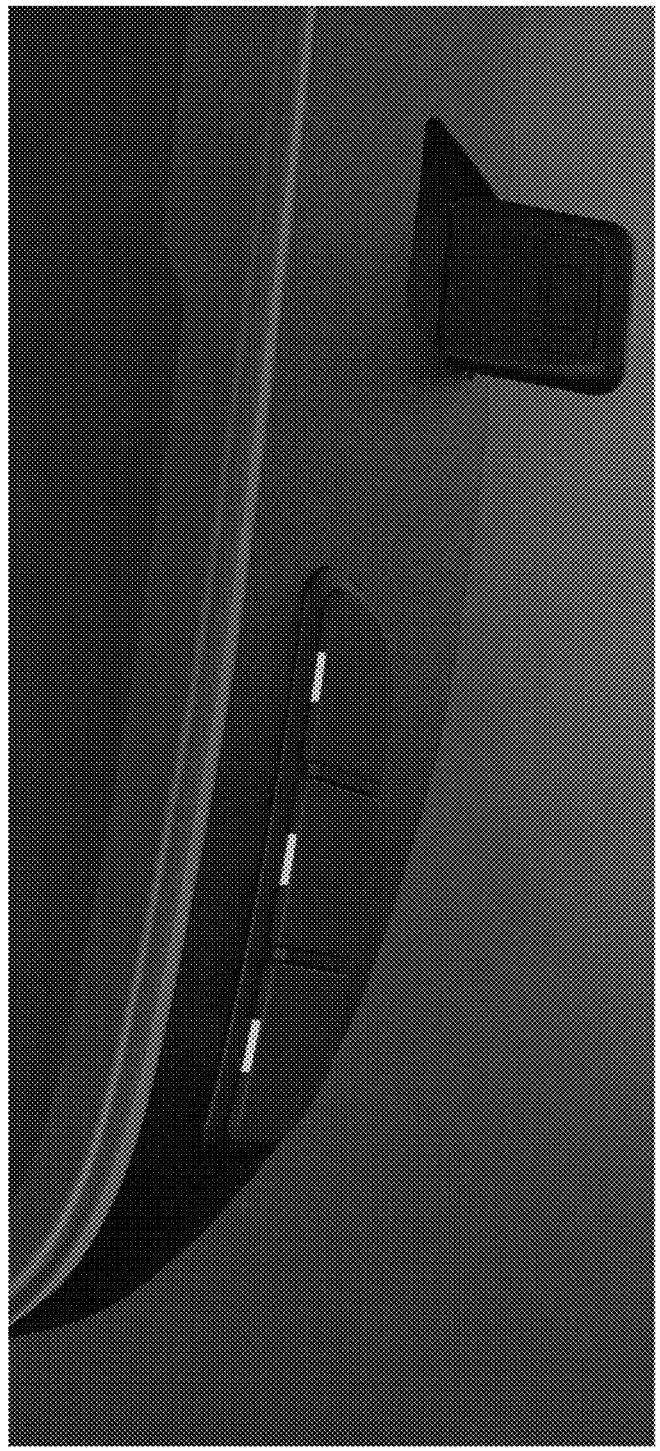

Optionally, the mirror head may include user actuatable buttons at the mirror casing instead of touch sensors at the reflective element. For example, and such as shown in FIG. 80, the mirror head may include buttons along the lower region of the mirror casing, such as at the bottom-left underside of the mirror head. As shown in FIG. 80, the mirror head may include a logo or brand icon or artwork or the like shown in a window area at the lower region of the reflective element. The glare sensor may be disposed within the logo applique window and behind the glass substrate of the reflective element. If the mirror reflective element comprises an electrochromic mirror reflective element, the electrification or electrical connection to the element and/or electrochromic driver circuitry may be integrated into the sensor and logo backlight assembly.

Optionally, and such as shown in FIGS. 81-84, the mirror head may include buttons along the lower region of the mirror casing, such as at the bottom-left underside of the mirror head, and may have a glare sensor disposed at the bottom center region of the reflective element and behind the glass substrate of the reflective element (where a window or light transmissive region may be micro-ablated in a perimeter band or chrome band around the periphery of the reflective element). If the mirror reflective element comprises an electrochromic mirror reflective element, the electrification or electrical connection to the element and/or electrochromic driver circuitry may be integrated into the sensor assembly.

Figure 85:
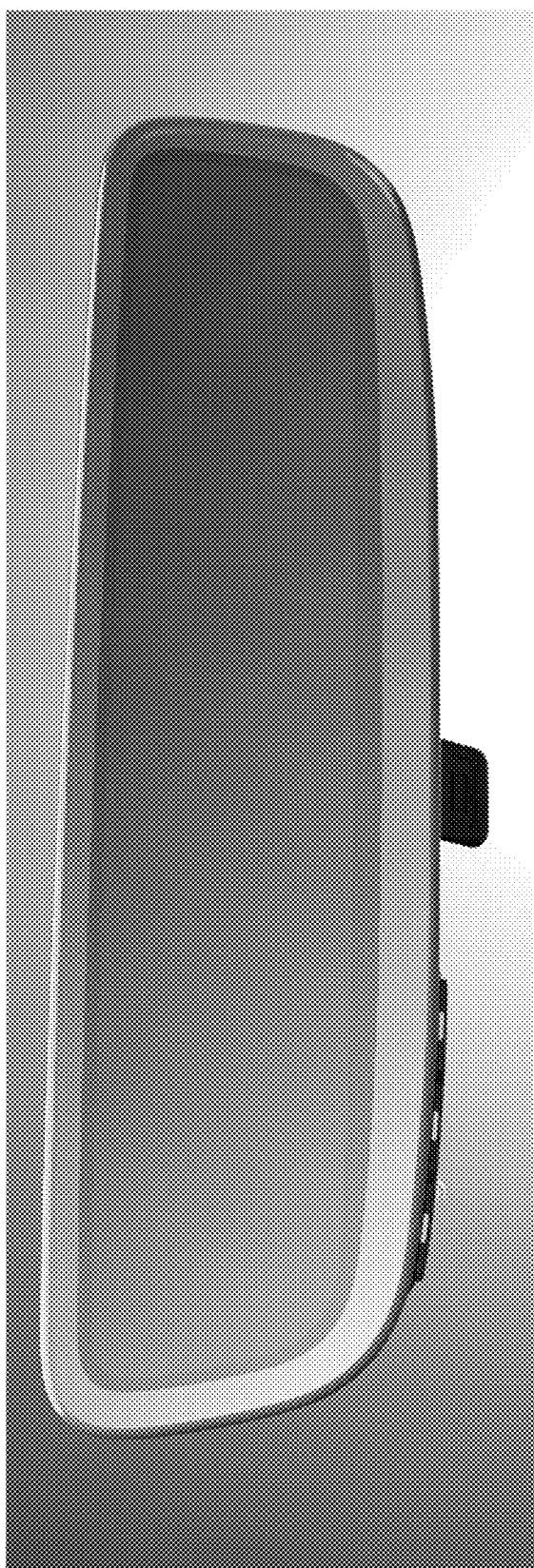
FIG. 85 is a perspective view of another mirror head with a full mirror display and user inputs.

Optionally, and such as shown in FIG. 85, the mirror head may include buttons along the lower region of the mirror casing, such as at the bottom-left underside of the mirror head, and may have a glare sensor disposed at the bottom region of the mirror near the buttons (with a light guide to redirect the glare light about 90 degrees). If the mirror reflective element comprises an electrochromic mirror reflective element, the electrification or electrical connection to the element and/or electrochromic driver circuitry may be at a printed circuit board (such as the PCB at which the buttons/switches are disposed), with wire jumpers from the PCB soldered to electrochromic cell tabs.

Figure 86:
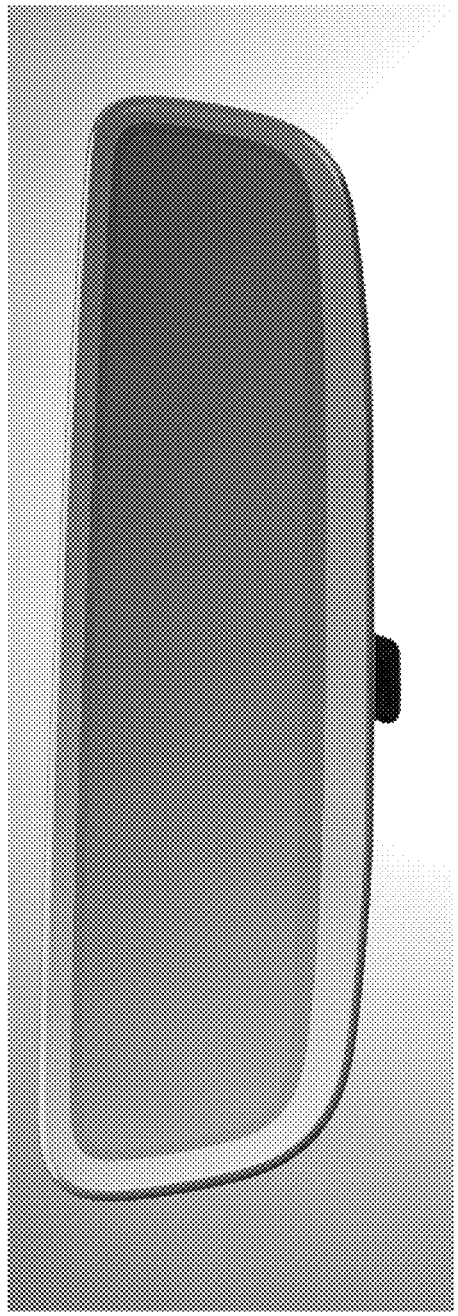
FIG. 86 is a perspective view of another mirror head with a full mirror display, and with user inputs provided over a LIN bus of the vehicle, such as from a centerstack display of the vehicle.
Figure 87:
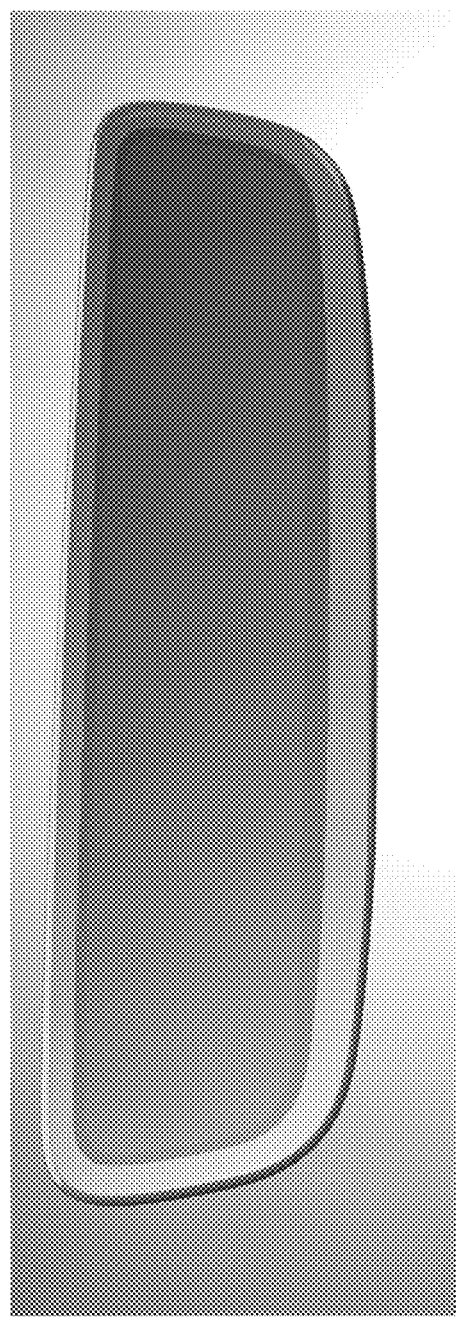
FIG. 87 is a perspective view of another mirror head with a full mirror display, and with user inputs and actuator control provided over a LIN bus of the vehicle, such as from a centerstack display of the vehicle.

Optionally, and such as shown in FIG. 86, the mirror head may not have buttons or inputs thereat, whereby the user inputs or button inputs may be disposed elsewhere in the vehicle (such as at a vehicle centerstack display), and the signals provided via actuation of the buttons or inputs may be provided to the mirror head via a LIN bus or other vehicle communication network. Optionally, and such as shown in FIG. 87, the mirror head may include an actuator of the types described above (no manual toggle), and the user inputs and actuator control may be provided to the mirror head via a LIN bus or other vehicle communication network. For example, a user may adjust the mirror head orientation via actuation of an actuator control at a center stack display of the vehicle.

Figure 88:
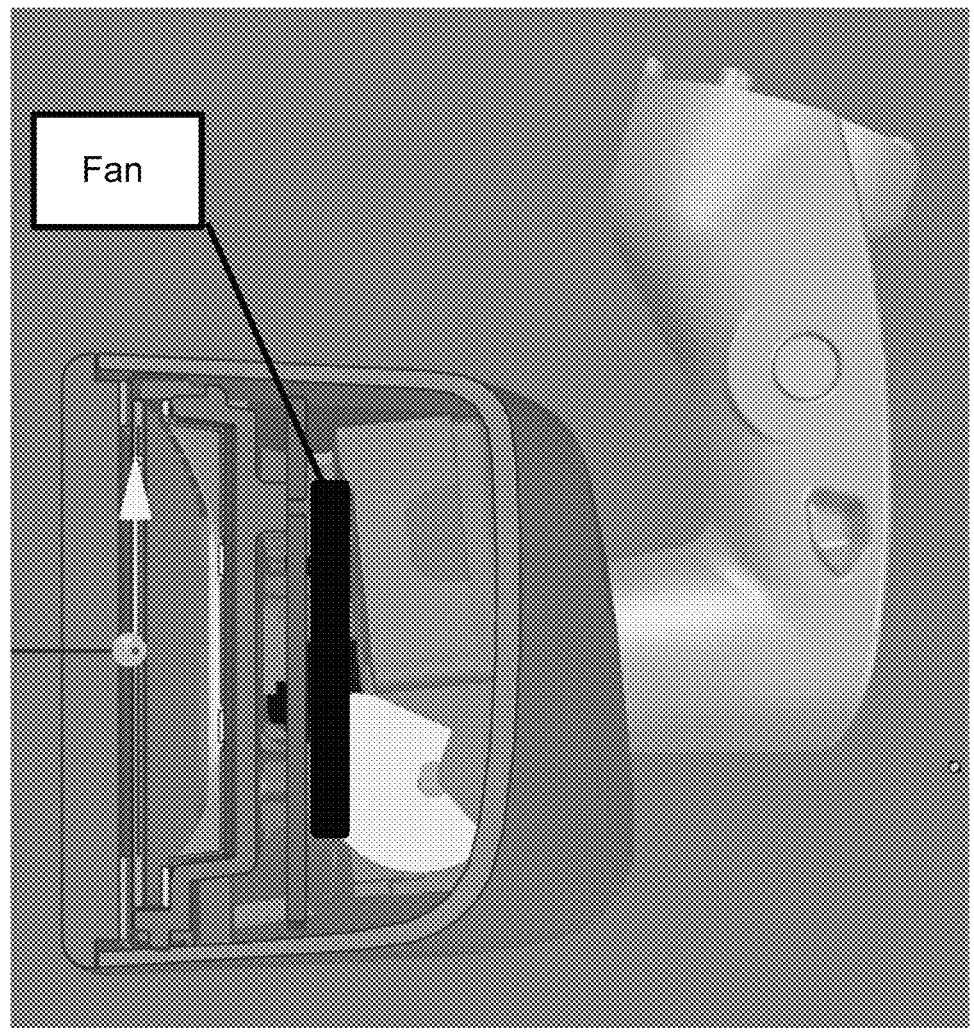
FIG. 88 is a sectional view of a mirror assembly with a display screen disposed in the mirror head, shown with a fan disposed in the mirror head to assist in circulating air in the mirror head to cool the circuitry during operation of the display screen.

Optionally, due to the heat generated by the circuitry and LEDs during operation of the video display, the mirror assembly preferably includes means for cooling the air inside the mirror head. For example, and such as shown in FIG. 88, thermally conductive filler material may be applied during molding of plastic housing. Such filler material may comprise a thermally conductive injection moldable resin, such as commercially available from Celanese, which manufactures injection moldable resins named "COOLPOLY". Covestro manufactures "Makrolon TC8030" thermally conductive polycarbonate. Sabic manufactures a line of thermally conductive plastics with the "KONDUIT" branding. Other suitable materials may be used. The use of such materials helps to increase the effective area for thermal radiation of the mirror's internal heat. In addition, a fan (FIG. 88) may be disposed inside the at least partially sealed mirror housing and can re-distribute or circulate the high heat from the LED backlight more quickly towards the plastic housing's internal surface. Use of such a fan improves upon the naturally conducted thermal transfer to the mirror housing. The fan may circulate air within the enclosed mirror head to enhance cooling as the air is circulated to the thermally conductive plastic.

Figure 89:
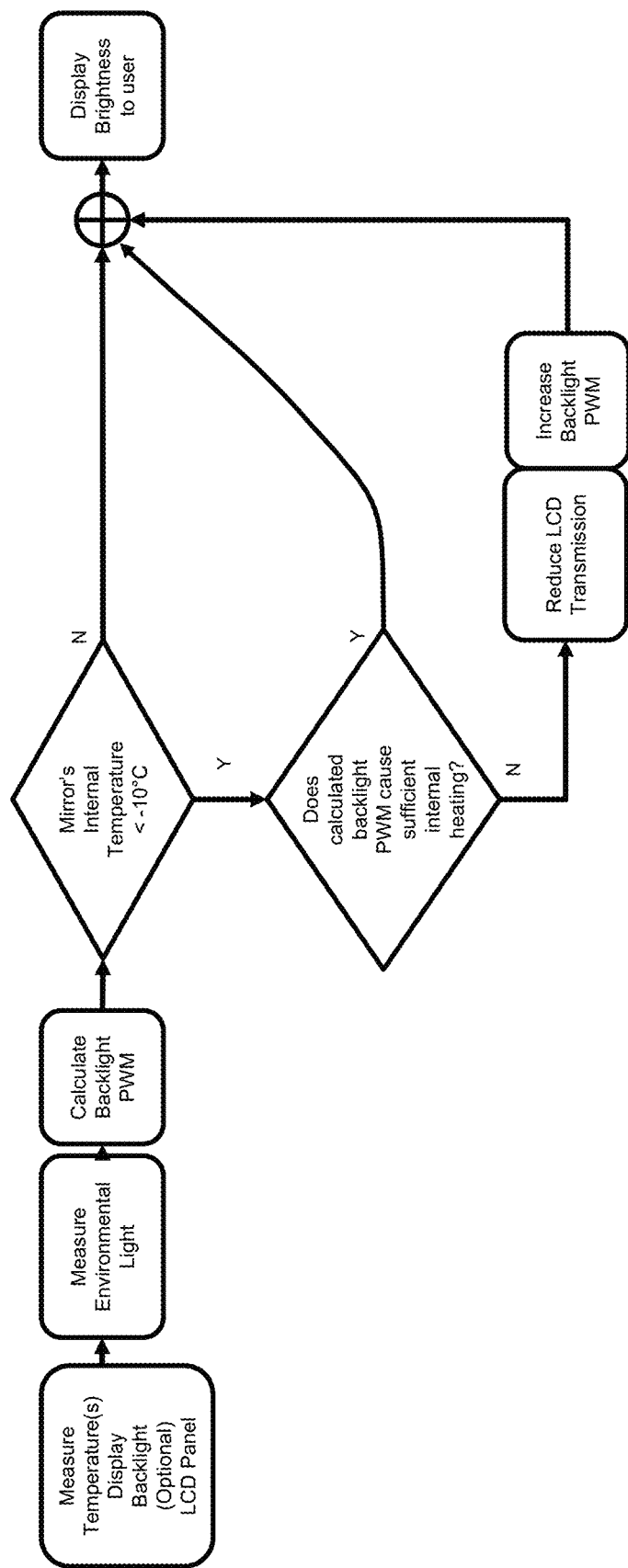
FIG. 89 is a block diagram of the software algorithm that controls intensity of the display and transmission of display responsive to ambient light and temperature.
Figure 90:
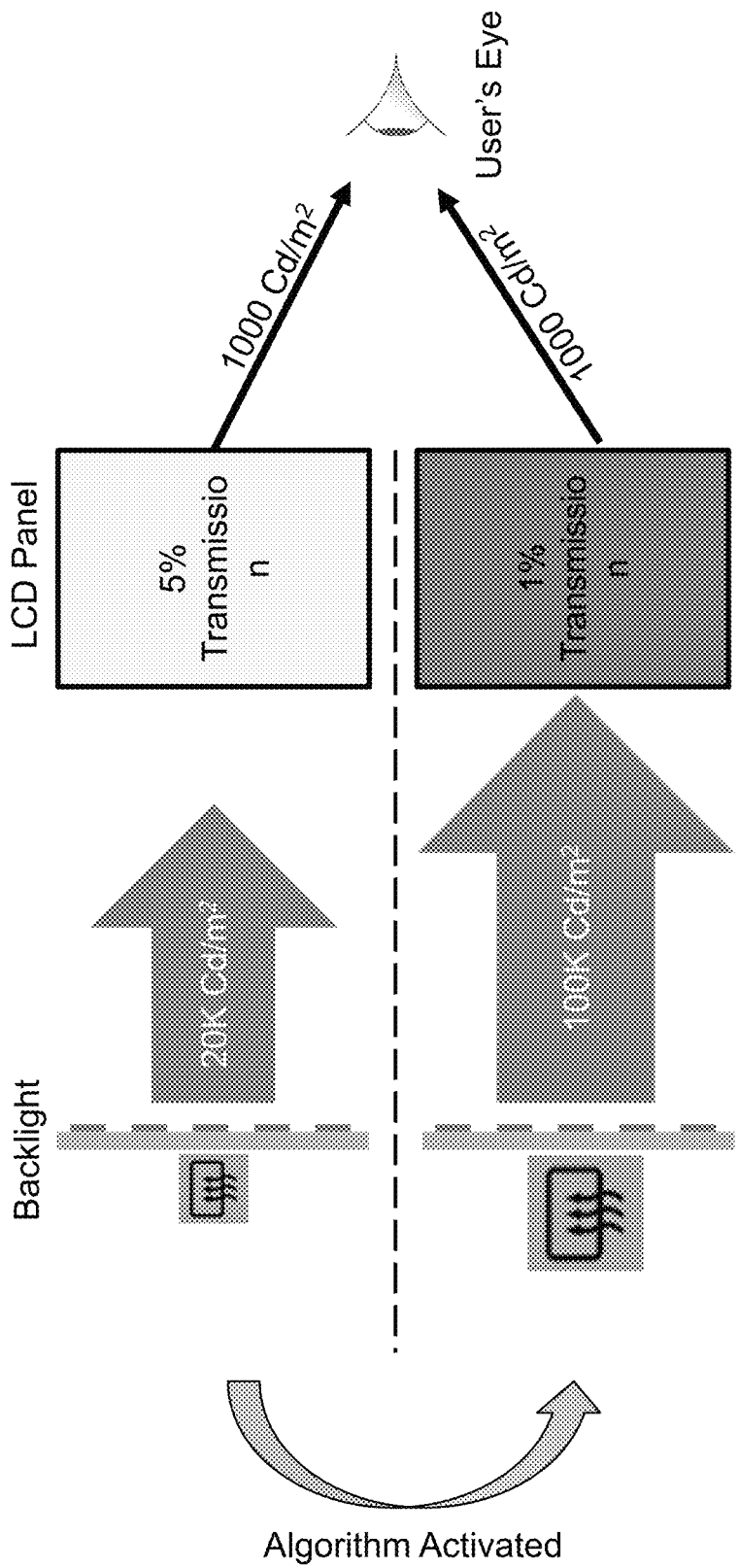
FIG. 90 is a diagram showing the effect of the display via operation of the software algorithm of FIG. 89.
Figure 91:
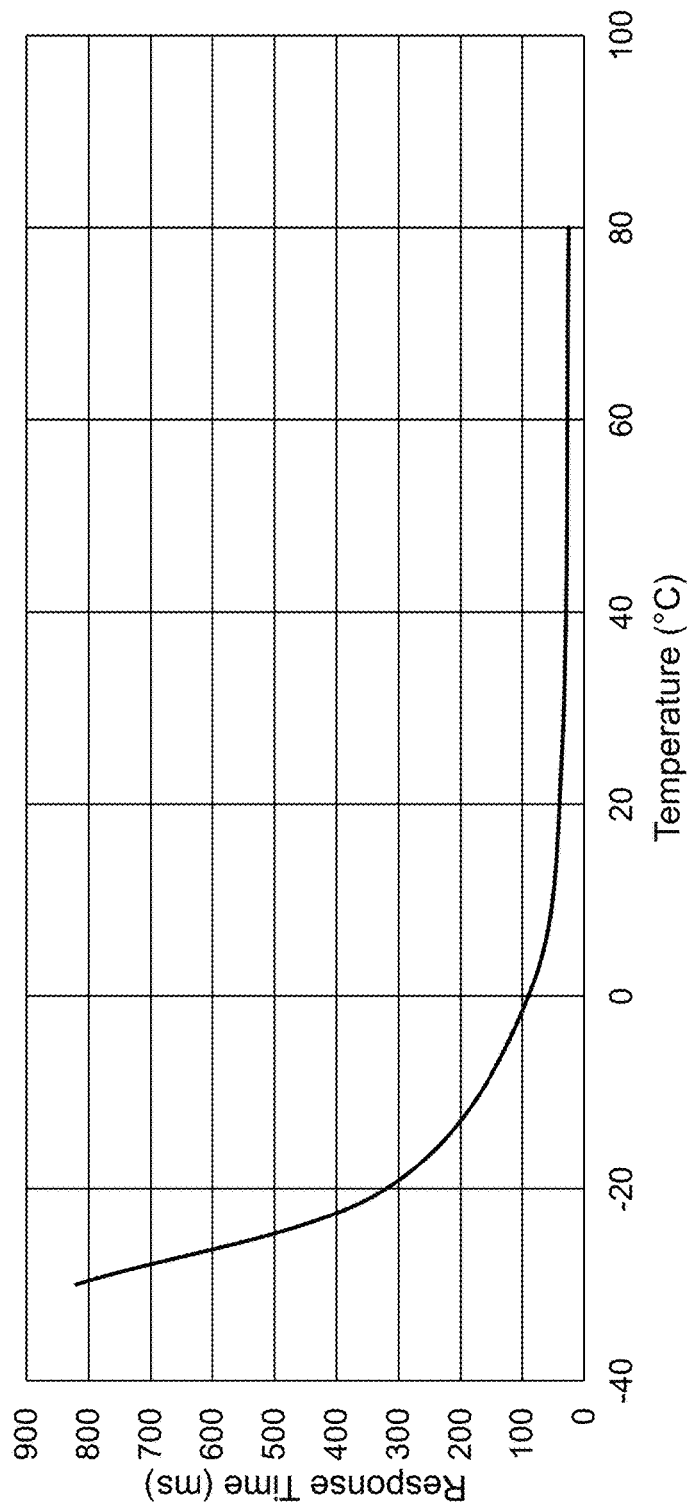
FIG. 91 is a graph showing LCD response time versus temperature.
Figure 92:
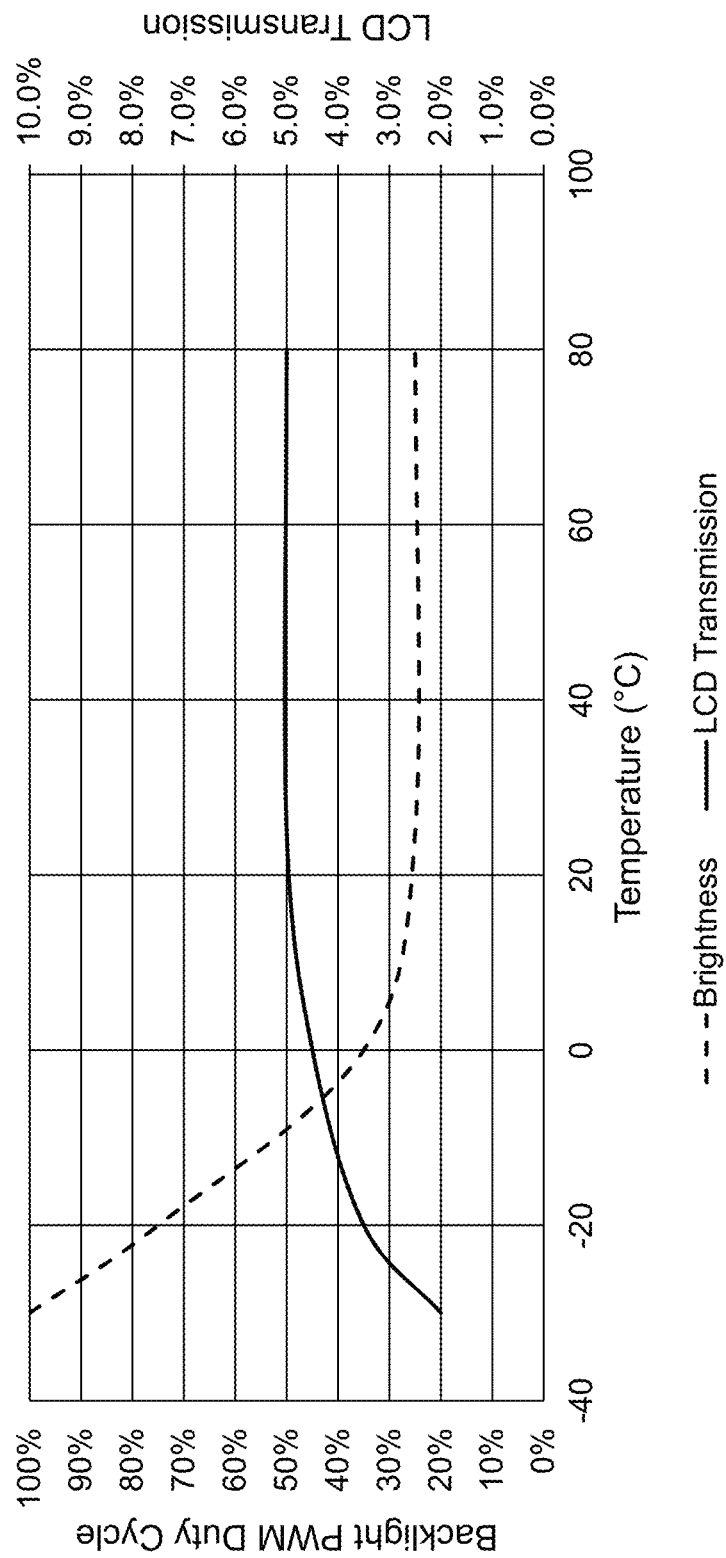
FIG. 92 is a graph showing use of the backlight for self-heating.

LCD displays have known performance changes over temperature, in which the response time slows down as the temperature decreases. Response time is the time required for the LCD pixel to transition from fully black to fully white. During night conditions, the display backlight is reduced, so that the user is not annoyed by an overly bright display. However, when initially using the display at colder nighttime conditions, the backlight during night time use would not be sufficient enough to self-heat the display. Thus, the transmission of the display may be reduced so that the backlighting may be increased (without blinding or bothering a person viewing the mirror display). This improvement would allow the backlight to be increased to a level where the internal heating could be effective. By reducing the transmission of the LCD at cold temperatures, the display backlight can be correspondingly increased. Such corresponding control of the backlight and the display screen can be achieved by an algorithm such as that shown in FIG. 89. The algorithm may operate continuously while the display is active. As the mirror's internal temperature increases (as may be determined via a thermistor in the mirror head), the amount of temperature compensation will dynamically change both LCD transmission and backlight. The increased backlight current will cause the LCD display's temperature to increase, and also will reduce the response time. Since the LCD transmission can be reduced and the backlight increased, the user of the display would be unable to detect the changes (see FIG. 90). The system would dynamically change both the backlight and transmission as the LCD's temperature changed over time. The LCD's temperature could be monitored by a silicon diode on the LCD glass panel, or as a secondary effect of another LCD monitoring circuit. FIG. 91 shows the LCD response time as it varies at different temperatures (particularly colder temperatures below 20 degrees C.). FIG. 92 shows the percentage of a PWM duty cycle of the backlighting device as it varies at different temperatures (particularly colder temperatures below 20 degrees C.).

Various methods may be used to modify transmission of the LCD screen. For example, the system may reduce the maximum of RGB signal to the LCD panel, where (R, G, B) signals may be reduced from (255, 255, 255) to (200, 200, 200) or thereabouts. Optionally, the system may modify LCD panel voltages, such as, for example, change the voltage from +/−8 V to +/−6 V or thereabouts.

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication No. US-2006-0050018, and/or International Publication No. WO 2004/058540, which are all hereby incorporated herein by reference in their entireties. The display may be viewable through the reflective element when the display is activated to display information.

Optionally, a camera and/or a non-image sensor may be disposed in the vehicle that views or senses through the windshield of the vehicle or through the rear window of the vehicle. Optionally, the windshield and/or rear window may include a clear portion (non-tinted) to enhance viewing or sensing by the camera/sensor (such as by utilizing aspects of the systems described in U.S. Publication No. US-2017-0355312, which is hereby incorporated herein by reference in its entirety). The basic concept is to allow as much light to get to the camera as possible. Often, for example, rear windows are tinted so as to have a dark tint that is typically impregnated into the glass, which hinders mounting the rearward viewing camera inside the rear window. By having a small portion or window within the window that did not have this tint, this mounting position could be better utilized. Also, by having the camera here, it could be kept free of contamination and water droplets as it would be cleaned by the rear window wiper/sprayer system.

Figure 94:
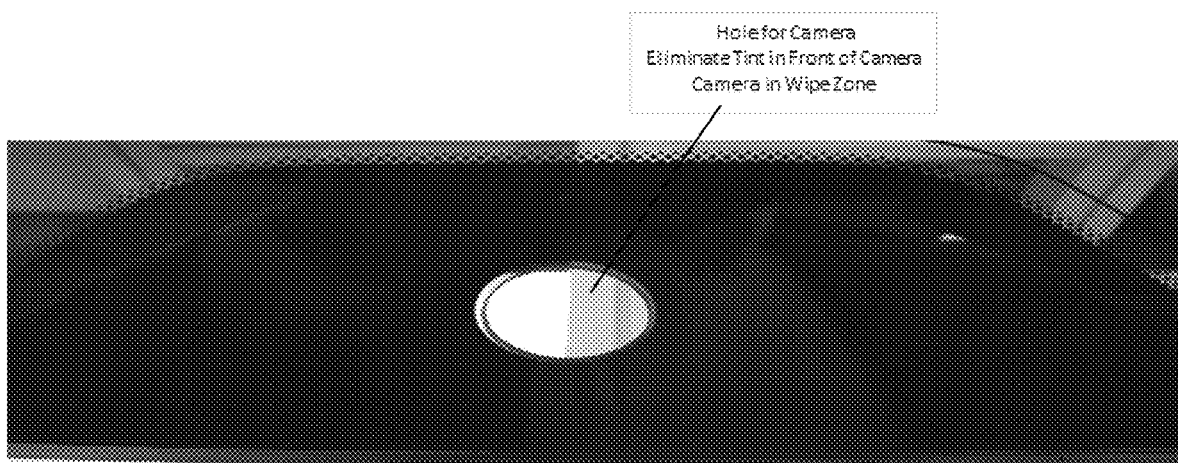
FIG. 94 is an enlarged view of a portion of the rear window, with a clear element disposed at the aperture for the rear camera to view through the clear element.
Figure 93:
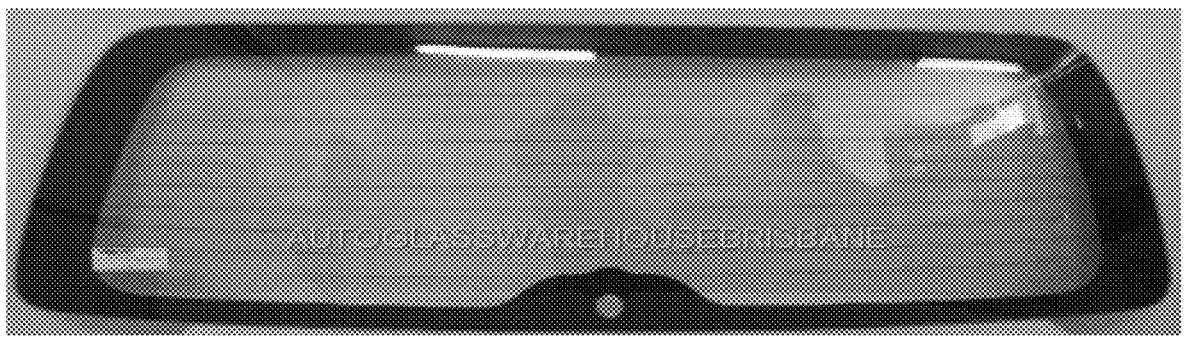
FIG. 93 is a view of a rear window of a vehicle, with an aperture formed through the window for a rear camera to view through in accordance with the present invention.

For example, and such as shown in FIGS. 93 and 94, a rear window of a vehicle includes a perimeter opaque or light absorbing layer or frit layer with a heater grid. The camera may be disposed at an upper or lower central region of the window panel and behind the perimeter frit layer, with an aperture formed through the frit layer where the camera is disposed. The glass of the window panel is also preferably substantially untinted at the aperture, such that the camera views through substantially transparent or clear glass.

Thus, the camera may be located inside the vehicle at the rear window so that the camera is in a wipe zone of a rear wiper and is not subjected to the outside environment, such as snow, ice, mud, salt and/or the like. The rear window has the privacy tint eliminated in front of the camera to reduce or minimize signal to noise degradation of the camera signal. If the privacy tint is not eliminated, then optionally a hole may be formed in the rear window similar to a wiper blade hole. The tradeoff is the signal to noise ratio is degraded with the camera located on the inside of the vehicle and looking through the tinted glass of the rear window. By cutting a hole in the rear window and sealing the hole with a clear lens, the window tinting is removed in front of the camera and thus does not degrade the camera performance. FIGS. 93 and 94 show a concept based on a hole in the rear window in the wiper zone, with FIG. 93 showing a rear window with the wiper hole at an upper central region of the window panel.

Also, in order to optimize camera performance (and thus display performance), the rear camera may operate to capture image data at different frame rates depending on the ambient light levels at the vehicle. For example, in order to optimize day time image performance the camera may capture and output 60 FPS for the video display (which provides improved daytime images and minimizes any visual lag in the display that is viewed by the driver of the vehicle). Optionally, for example, in order to improve night time performance at low lighting conditions, the camera may capture and output 30 FPS for an improved signal to noise ratio (which provides improved nighttime images and provides additional exposure time for camera light gathering). The system may include an algorithm that automatically switches from 30 FPS to 60 FPS and from 60 FPS to 30 FPS based on ambient lighting conditions (as may be determined via image processing of captured image data or via a separate ambient light sensor at the vehicle).

Changes and modifications to the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head accommodating a reflective element:
   wherein the reflective element comprises a glass substrate having a surface thereof coated with a transflective mirror reflector;
   a mounting structure configured to attach at an interior portion of a vehicle equipped with the vehicular interior rearview mirror assembly;
   wherein the mirror head is pivotally attached at the mounting structure via a pivot joint, and wherein the pivot joint comprises (i) a ball element of the mounting structure and (ii) a socket element at the mirror head;
   a display device disposed within the mirror head, wherein the display device comprises a video display screen that, when actuated, displays video images viewable through the transflective mirror reflector of the reflective element;
   wherein, with the mounting structure attached at the interior portion of the vehicle, the displayed video images are derived from image data captured by a camera of the vehicle viewing exterior the vehicle;
   wherein, when the video display screen is not actuated, the transflective mirror reflector renders presence of the video display screen covert;
   wherein the reflective element has a length dimension and a width dimension, and wherein the video display screen has a length dimension and a width dimension, and wherein the length dimension of the video display screen is at least 75 percent of the length dimension of the reflective element, and wherein the width dimension of the video display screen is at least 75 percent of the width dimension of the reflective element;

an actuator disposed within the mirror head;

wherein the actuator comprises (i) an actuator base attached at a rear portion of the reflective element, (ii) an actuator body pivotally attached at the actuator base, and (iii) an electrically operable motor;

wherein the socket element is disposed at the actuator body and pivots with the actuator body relative to the actuator base;

wherein, with the mounting structure attached at the interior portion of the vehicle, and when the electrically operable motor is electrically operated, the actuator body pivots relative to the actuator base to pivot the mirror head relative to the socket element of the pivot joint, and wherein pivotal movement of the mirror head relative to the socket element of the pivot joint adjusts the reflective element between a mirror mode orientation and a display mode orientation;

wherein, with the mounting structure attached at the interior portion of the vehicle, and when the reflective element is in the mirror mode orientation, the video display screen is actuated to display video images that are viewable through the transflective mirror reflector of the reflective element by a driver of the vehicle:

wherein, with the mounting structure attached at the interior portion of the vehicle, and when the reflective element is in the mirror mode orientation, the video display screen is not actuated; and wherein, with the mounting structure attached at the interior portion of the vehicle, and when the reflective element is in the mirror mode orientation, the mirror head is manually adjustable via pivoting the mirror head and the socket element relative to the ball element of the mounting structure to position the reflective element to provide a rearward view to the driver of the vehicle.

2. The vehicular interior rearview mirror assembly of claim 1, wherein the actuator body comprises a cam that engages a guide element of the actuator base, and wherein the electrically operable motor, when electrically operated, rotates the cam whereby movement of the cam relative to the guide element pivots the actuator body relative to the actuator base.

3. The vehicular interior rearview mirror assembly of claim 2, wherein the cam comprises an arcuate slot and the guide element comprises a guide pin, and wherein the arcuate slot receives the guide pin, and wherein the electrically operable motor, when electrically operated, rotates the cam whereby the guide pin moves along the arcuate slot to pivot the actuator body relative to the actuator base.

4. The vehicular interior rearview mirror assembly of claim 3, wherein the actuator body is pivotable relative to the actuator base about a pivot axis at a first end of the actuator body, and wherein the cam is at a second end of the actuator body opposite from the first end of the actuator body.

5. The vehicular interior rearview mirror assembly of claim 4, wherein the actuator body comprises a pair of cams, each at opposite sides of the second end of the actuator body, and each engaging a respective guide element of the actuator base.

6. The vehicular interior rearview mirror assembly of claim 3, wherein the arcuate slot is flattened at each end to provide a detent to hold the reflective element at the respective mirror mode orientation and display mode orientation.

7. The vehicular interior rearview mirror assembly of claim 1, wherein the actuator comprises a first travel stop that limits pivotal movement of the actuator body relative to the actuator base when the reflective element is pivoted to the mirror mode orientation, and wherein the actuator comprises a second travel stop that limits pivotal movement of the actuator body relative to the actuator base when the reflective element is pivoted to the mirror mode orientation.

8. The vehicular interior rearview mirror assembly of claim 7, wherein the actuator body comprises a stop element that protrudes from a side of the actuator body, and wherein the first travel stop comprises a first stop surface of the actuator base and the second travel stop comprises a second stop surface of the actuator base, and wherein the stop element engages the first travel stop when the reflective element is pivoted to the mirror mode orientation, and wherein the stop element engages the second travel stop when the reflective element is pivoted to the display mode orientation.

9. The vehicular interior rearview mirror assembly of claim 1, wherein the electrically operable motor of the actuator is electrically operated to pivot the reflective element toward the display mode orientation responsive to the vehicle shifting to a reverse gear.

10. The vehicular interior rearview mirror assembly of claim 1, wherein the length dimension of the video display screen is at least 95 percent of the length dimension of the reflective element, and wherein the width dimension of the video display screen is at least 95 percent of the width dimension of the reflective element.

11. The vehicular interior rearview mirror assembly of claim 1, wherein the reflective element comprises an electrochromic reflective element comprising a front glass substrate having first and second surfaces and a rear glass substrate having third and fourth surfaces, with an electrochromic medium disposed between the second surface of the front glass substrate and the third surface of the rear glass substrate and bounded by a perimeter seal, and wherein the glass substrate comprises the rear glass substrate, and wherein the transflective mirror reflector is coated at the third surface of the rear glass substrate and in contact with the electrochromic medium.

12. The vehicular interior rearview mirror assembly of claim 1, wherein the reflective element comprises a prismatic reflective element.

13. The vehicular interior rearview mirror assembly of claim 1, wherein the mirror head comprises a touch sensor disposed behind the reflective element, and wherein the touch sensor is actuated responsive to proximity of a user's finger at a front surface of the reflective element.

14. The vehicular interior rearview mirror assembly of claim 1, wherein the mirror head comprises a plurality of touch sensors disposed behind the reflective element, wherein each of the touch sensors is actuated responsive to proximity of a user's finger at a front surface of the reflective element to the respective touch sensor.

15. The vehicular interior rearview mirror assembly of claim 14, wherein each of the touch sensors, when actuated, provides a control output for a respective function.

16. The vehicular interior rearview mirror assembly of claim 15, wherein the control output of each of the touch sensors is reconfigurable for a plurality of functions.

17. A vehicular interior rearview mirror assembly, the vehicular interior rearview mirror assembly comprising:

a mirror head accommodating an electrochromic reflective element;

wherein the electrochromic reflective element comprises a front glass substrate having first and second surfaces and a rear glass substrate having third and fourth surfaces, with an electrochromic medium disposed between the second surface of the front glass substrate and the third surface of the rear glass substrate and bounded by a perimeter seal, and wherein the electrochromic reflective element comprises a transflective mirror reflector coated at the third surface of the rear glass substrate and in contact with the electrochromic medium;

a mounting structure configured to attach at an interior portion of a vehicle equipped with the vehicular interior rearview mirror assembly;

wherein the mirror head is pivotally attached at the mounting structure via a pivot joint, and wherein the pivot joint comprises (i) a ball element of the mounting structure and (ii) a socket element at the mirror head;

a display device disposed within the mirror head, wherein the display device comprises a video display screen that, when actuated, displays video images viewable through the transflective mirror reflector of the electrochromic reflective element;

wherein, with the mounting structure attached at the interior portion of the vehicle, the displayed video images are derived from image data captured by a camera of the vehicle viewing exterior the vehicle;

wherein, when the video display screen is not actuated, the transflective mirror reflector renders presence of the video display screen covert;

wherein the electrochromic reflective element has a length dimension and a width dimension, and wherein the video display screen has a length dimension and a width dimension, and wherein the length dimension of the video display screen is at least 75 percent of the length dimension of the electrochromic reflective element, and wherein the width dimension of the video display screen is at least 75 percent of the width dimension of the electrochromic reflective element;

an actuator disposed within the mirror head;

wherein the actuator comprises (i) an actuator base attached at a rear portion of the electrochromic reflective element, (ii) an actuator body pivotally attached at the actuator base, and (iii) an electrically operable motor;

wherein the socket element is disposed at the actuator body and pivots with the actuator body relative to the actuator base;

wherein the actuator body is pivotable relative to the actuator base about a pivot axis at a first end of the actuator body, and wherein a cam is at a second end of the actuator body opposite from the first end of the actuator body, and wherein the cam engages a guide element of the actuator base;

wherein the electrically operable motor, when electrically operated, rotates the cam whereby movement of the cam relative to the guide element pivots the actuator body relative to the actuator base;

wherein, with the mounting structure attached at the interior portion of the vehicle, and when the electrically operable motor is electrically operated, the actuator body pivots relative to the actuator base to pivot the mirror head relative to the socket element of the pivot joint, and wherein pivotal movement of the mirror head relative to the socket element of the pivot joint adjusts the electrochromic reflective element between a mirror mode orientation and a display mode orientation;

wherein, with the mounting structure attached at the interior portion of the vehicle, and when the electrochromic reflective element is in the display mode orientation, the video display screen is actuated to display video images that are viewable through the transflective mirror reflector of the electrochromic reflective element by a driver of the vehicle;

wherein, with the mounting structure attached at the interior portion of the vehicle, and when the electrochromic reflective element is in the mirror mode orientation, the video display screen is not actuated; and wherein, with the mounting structure attached at the interior portion of the vehicle, and when the electrochromic reflective element is in the mirror mode orientation, the mirror head is manually adjustable via pivoting the mirror head and the socket element relative to the ball element of the mounting structure to position the electrochromic reflective element to provide a rearward view to the driver of the vehicle.

18. The vehicular interior rearview mirror assembly of claim 17, wherein the cam comprises an arcuate slot and the guide element comprises a guide pin, and wherein the arcuate slot receives the guide pin, and wherein the electrically operable motor, when electrically operated, rotates the cam whereby the guide pin moves along the arcuate slot to pivot the actuator body relative to the actuator base.

19. The vehicular interior rearview mirror assembly of claim 18, wherein the arcuate slot is flattened at each end to provide a detent to hold the electrochromic reflective element at the respective mirror mode orientation and display mode orientation.

20. The vehicular interior rearview mirror assembly of claim 17, wherein the actuator body comprises a pair of cams, each at opposite sides of the second end of the actuator body, and each engaging a respective guide element of the actuator base.

21. The vehicular interior rearview mirror assembly of claim 17, wherein the actuator comprises a first travel stop that limits pivotal movement of the actuator body relative to the actuator base when the electrochromic reflective element is pivoted to the mirror mode orientation, and wherein the actuator comprises a second travel stop that limits pivotal movement of the actuator body relative to the actuator base when the electrochromic reflective element is pivoted to the mirror mode orientation.

22. The vehicular interior rearview mirror assembly of claim 21, wherein the actuator body comprises a stop element that protrudes from a side of the actuator body, and wherein the first travel stop comprises a first stop surface of the actuator base and the second travel stop comprises a second stop surface of the actuator base, and wherein the stop element engages the first travel stop when the electrochromic reflective element is pivoted to the mirror mode orientation, and wherein the stop element engages the second travel stop when the electrochromic reflective element is pivoted to the display mode orientation.

23. The vehicular interior rearview mirror assembly of claim 17, wherein the electrically operable motor of the actuator is electrically operated to pivot the electrochromic reflective element toward the display mode orientation responsive to the vehicle shifting to a reverse gear.

24. The vehicular interior rearview mirror assembly of claim 17, wherein the length dimension of the video display screen is at least 95 percent of the length dimension of the electrochromic reflective element, and wherein the width dimension of the video display screen is at least 95 percent of the width dimension of the electrochromic reflective element.

25. A vehicular interior rearview mirror assembly, the vehicular interior rearview mirror assembly comprising:

a mirror head accommodating an electrochromic reflective element;

wherein the electrochromic reflective element comprises a front glass substrate having first and second surfaces and a rear glass substrate having third and fourth surfaces, with an electrochromic medium disposed between the second surface of the front glass substrate and the third surface of the rear glass substrate and bounded by a perimeter seal, and wherein the electrochromic reflective element comprises a transflective mirror reflector coated at the third surface of the rear glass substrate and in contact with the electrochromic medium;

a mounting structure configured to attach at an interior portion of a vehicle equipped with the vehicular interior rearview mirror assembly;

wherein the mirror head is pivotally attached at the mounting structure via a pivot joint, and wherein the pivot joint comprises (i) a ball element of the mounting structure and (ii) a socket element at the mirror head:

a display device disposed within the mirror head, wherein the display device comprises a video display screen that, when actuated, displays video images viewable through the transflective mirror reflector of the electrochromic reflective element;

wherein, with the mounting structure attached at the interior portion of the vehicle, the displayed video images are derived from image data captured by a camera of the vehicle viewing exterior the vehicle;

wherein, when the video display screen is not actuated, the transflective mirror reflector renders presence of the video display screen covert;

wherein the electrochromic reflective element has a length dimension and a width dimension, and wherein the video display screen has a length dimension and a width dimension, and wherein the length dimension of the video display screen is at least 75 percent of the length dimension of the electrochromic reflective element, and wherein the width dimension of the video display screen is at least 75 percent of the width dimension of the electrochromic reflective element;

an actuator disposed within the mirror head;

wherein the actuator comprises (i) an actuator base attached at a rear portion of the electrochromic reflective element, (ii) an actuator body pivotally attached at the actuator base, and (iii) an electrically operable motor:

wherein the socket element is disposed at the actuator body and pivots with the actuator body relative to the actuator base;

wherein the actuator body is pivotable relative to the actuator base about a pivot axis at a first end of the actuator body;

wherein, with the mounting structure attached at the interior portion of the vehicle, and when the electrically operable motor is electrically operated, the actuator body pivots relative to the actuator base to pivot the mirror head relative to the socket element of the pivot joint, and wherein pivotal movement of the mirror head relative to the socket element of the pivot joint adjusts the electrochromic reflective element between a mirror mode orientation and a display mode orientation;

wherein the actuator comprises a first travel stop that limits pivotal movement of the actuator body relative to the actuator base when the electrochromic reflective element is pivoted to the mirror mode orientation, and wherein the first travel stop provides a first load path between the actuator base and the actuator body when the electrochromic reflective element is at the mirror mode orientation;

wherein the actuator comprises a second travel stop that limits pivotal movement of the actuator body relative to the actuator base when the electrochromic reflective element is pivoted to the mirror mode orientation, and wherein the second travel stop provides a second load path between the actuator base and the actuator body when the electrochromic reflective element is at the display mode orientation;

wherein, with the mounting structure attached at the interior portion of the vehicle, and when the electrochromic reflective element is in the display mode orientation, the video display screen is actuated to display video images that are viewable through the transflective mirror reflector of the electrochromic reflective element by a driver of the vehicle;

wherein, with the mounting structure attached at the interior portion of the vehicle, and when the electrochromic reflective element is in the mirror mode orientation, the video display screen is not actuated; and wherein, with the mounting structure attached at the interior portion of the vehicle, and when the electrochromic reflective element is in the mirror mode orientation, the mirror head is manually adjustable via pivoting the mirror head and the socket element relative to the ball element of the mounting structure to position the electrochromic reflective element to provide a rearward view to the driver of the vehicle.

26. The vehicular interior rearview mirror assembly of claim 25, wherein the actuator body comprises a cam at a second end of the actuator body opposite from the first end of the actuator body, and wherein the cam engages a guide element of the actuator base, and wherein the electrically operable motor, when electrically operated, rotates the cam whereby movement of the cam relative to the guide element pivots the actuator body relative to the actuator base.

27. The vehicular interior rearview mirror assembly of claim 26, wherein the cam comprises an arcuate slot and the guide element comprises a guide pin, and wherein the arcuate slot receives the guide pin, and wherein the electrically operable motor, when electrically operated, rotates the cam whereby the guide pin moves along the arcuate slot to pivot the actuator body relative to the actuator base.

28. The vehicular interior rearview mirror assembly of claim 27, wherein the first travel stop limits pivotal movement of the actuator body relative to the actuator base before the guide pin reaches a first end of the arcuate slot, and wherein the second travel stop limits pivotal movement of the actuator body relative to the actuator base before the guide pin reaches a second end of the arcuate slot.

29. The vehicular interior rearview mirror assembly of claim 26, wherein the actuator body comprises a pair of cams, each at opposite sides of the second end of the actuator body, and each engaging a respective guide element of the actuator base.

30. The vehicular interior rearview mirror assembly of claim 25, wherein the actuator body comprises a stop element that protrudes from a side of the actuator body, and wherein the first travel stop comprises a first stop surface of the actuator base and the second travel stop comprises a second stop surface of the actuator base, and wherein the stop element engages the first travel stop when the electrochromic reflective element is pivoted to the mirror mode orientation, and wherein the stop element engages the second travel stop when the electrochromic reflective element is pivoted to the display mode orientation.

* * * * *

UNITED STATES PATENT AND TRADEMARK OFFICE
CERTIFICATE OF CORRECTION

| | |
|---|---|
| PATENT NO. | : 11,292,389 B2 |
| APPLICATION NO. | : 16/949635 |
| DATED | : April 5, 2022 |
| INVENTOR(S) | : Anthony J. LaCross et al. |

It is certified that error appears in the above-identified patent and that said Letters Patent is hereby corrected as shown below:

On the Title Page

Item (54), and In the Specification, Column 1, Lines 1-3, should read:
--VEHICULAR INTERIOR REARVIEW MIRROR ASSEMBLY WITH DISPLAY AND TILT MECHANISM--

In the Claims

Column 19
Line 23, Claim 1, "mirror mode orientation" should be --display mode orientation--
Line 26, Claim 1, "vehicle:" should be --vehicle;--

Column 23
Line 25, Claim 25, "head:" should be --head;--
Line 52, Claim 25, "motor:" should be --motor;--

Signed and Sealed this
Twenty-fourth Day of May, 2022

*Katherine Kelly Vidal*

Katherine Kelly Vidal
*Director of the United States Patent and Trademark Office*